(12) United States Patent
Fukushima et al.

(10) Patent No.: US 7,229,357 B2
(45) Date of Patent: Jun. 12, 2007

(54) FLYWHEEL ASSEMBLY

(75) Inventors: Hirotaka Fukushima, Hirakata (JP);
Hiroyoshi Tsuruta, Kadoma (JP);
Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 11/226,409

(22) Filed: Sep. 15, 2005

(65) Prior Publication Data

US 2006/0006044 A1    Jan. 12, 2006

Related U.S. Application Data

(62) Division of application No. 10/685,736, filed on Oct. 16, 2003, now abandoned.

(30) Foreign Application Priority Data

| Oct. 22, 2002 | (JP) | ............................. | 2002-307250 |
| Oct. 22, 2002 | (JP) | ............................. | 2002-307251 |
| Dec. 3, 2002 | (JP) | ............................. | 2002-351589 |
| Jun. 6, 2003 | (JP) | ............................. | 2003-162896 |

(51) Int. Cl.
*F16F 15/121* (2006.01)

(52) U.S. Cl. ..................................... 464/68.1

(58) Field of Classification Search ............... 464/68.1, 464/68.2–68.9; 192/212; 74/574.4
See application file for complete search history.

(56) References Cited

U.S. PATENT DOCUMENTS

| 4,890,710 | A | * | 1/1990 | Reik et al. |
| 6,241,614 | B1 | * | 6/2001 | Mizukami et al. ..... 464/68.1 X |
| 6,343,684 | B1 | * | 2/2002 | Lohaus et al. |

* cited by examiner

*Primary Examiner*—Greg Binda
(74) *Attorney, Agent, or Firm*—Global IP Counselors, LLP

(57) ABSTRACT

A flywheel assembly that transmits torque from a crankshaft of an engine is provided. The flywheel assembly has a flywheel with a friction surface and an elastic coupling mechanism. The elastic coupling mechanism elastically couples the flywheel and the crankshaft in a rotating direction, and has a pair of first disk-shaped members axially spaced from each other and fixed together, a second disk-shaped member that is arranged between the pair of first disk-shaped members, and an elastic member that elastically couples the first disk-shaped members to the second disk-shaped member in the rotating direction. Further, a plate-like coupling portion extending between outer peripheries of the paired first disk-shaped members fixes the pair of first disk-shaped members together.

12 Claims, 45 Drawing Sheets

FLYWHEEL ASSEMBLY

CROSS-REFERENCE TO RELATED APPLICATIONS

This application is a divisional application of U.S. patent application Ser. No. 10/685,736 filed on Oct. 16, 2003, now abandoned. The entire disclosure of U.S. patent application Ser. No. 10/685,736 is hereby incorporated herein by reference.

BACKGROUND OF THE INVENTION

1. Field of the Invention

The present invention generally relates to a damper mechanism. More specifically, the present invention relates to a damper mechanism for transmitting a torque while absorbing and damping torsional vibrations. The present invention also relates to a flywheel assembly, especially a flywheel assembly that is elastically coupled to a crankshaft in a rotational direction.

2. Background Information

A clutch disk assembly used in a vehicle has a clutch function for releasably engaging a flywheel, and a damper function for absorbing and damping torsional vibrations transmitted from the flywheel. In general, vibrations of vehicles include idling noises (rattling noises), driving noises (acceleration and deceleration rattling noises and muffled noises), and tip-in/tip-out (low-frequency vibrations). For suppressing such noises and vibrations, the clutch disk assembly is provided with a damper.

The idling noises are rattling noises, which are generated from a transmission when a clutch pedal is released after shifting a gear position to neutral, e.g., to stop at a traffic light. These noises are due to the fact that an engine torque is low and varies to a large extent in response to engine combustion when an engine speed is in or near an idling range. In or near the idling range, tooth collisions occur between an input gear and a counter gear of the transmission.

The tip-in/tip-out (low frequency vibrations) is a large longitudinal vibration of a vehicle body, which occurs when a driver rapidly depresses or releases an acceleration pedal. If a power transmission system has a low rigidity, a torque transmitted to tires is reversely transmitted from the tires to the power transmission system. This reaction causes an excessive torque to be transmitted to the tires so that large longitudinal vibrations transitionally occur to vibrate the vehicle body longitudinally to a large extent.

The idling noises are significantly affected by torsion characteristics of a clutch disk assembly at and around a zero torque, and can be effectively prevented by reducing a torsional rigidity at and around the zero torque. Conversely, for reducing the longitudinal vibrations of the tip-in/tip-out, torsion characteristics of the clutch disk assembly must be solid to a large extent.

For overcoming the above problems, a clutch disk assembly has been provided that uses two kinds of spring members for providing characteristics having two stages. In this structure, the torsional rigidity and a hysteresis torque are kept low in the first stage (low torsion angle region) of the torsion characteristics. This is effective in preventing noises during idling. Since the torsional rigidity and the hysteresis torque are kept high in the second stage (high torsion angle range) of the torsion characteristics, the longitudinal vibrations of tip-in/tip-out can be sufficiently damped.

Further, such a damper mechanism has been known that it can effectively absorb minute torsional vibrations without operating a large frictional resistance mechanism for the second stage when the minute torsional vibrations are applied, e.g., due to combustion variations of the engine in the second stage of the torsion characteristics.

The damper mechanism described above can be achieved by providing a frictional resistance generating mechanism having the following specific structures. The frictional resistance generating mechanism is arranged as a whole to operate in parallel with a spring member of a high rigidity in a rotational direction, and has a frictional resistance generating portion, and a rotating-direction engagement portion arranged to operate in series with respect to the frictional resistance generating portion in the rotational direction. The rotating-direction engagement portion has a minute rotating-direction space between two members.

In the prior art, the rotating-direction space can be configured to operate in response to minute torsional vibrations only in the second stage (large torsion angle region) of the torsion characteristics.

In some cases, however, vibration damping performance can be improved, when such a manner is employed that a large frictional resistance does not occur even when the torsion angle exceeds a predetermined angle in the first stage (small torsion angle region) of the torsion characteristics, and thus a large frictional resistance does not occur in response to the minute torsional vibrations.

Specifically, the damper mechanism described above is achieved by providing a frictional resistance generating mechanism having the following structure. This frictional resistance generating mechanism is arranged to operate in parallel with spring members, which have a high rigidity as a whole, in the rotating direction. Further, the frictional resistance generating mechanism has a frictional resistance generating portion and a rotating-direction engagement portion arranged to operate in series with respect to the frictional resistance generating portion in the rotating direction. The rotating-direction engagement portion is formed of a minute rotating-direction space between two members.

Accordingly, when minute torsional vibrations caused by combustion variations of an engine are generated, the minute rotating-direction space prevents the operation of the frictional resistance generating portion.

However, when torsional vibrations of a large torsion angle are applied, the frictional resistance generating portion operates, and the frictional resistance generating portion does not operate corresponding to the minute rotating-direction space only on the opposite sides, of the torsion angle range. Thus, a large frictional resistance suddenly occurs on the opposite sides of the torsion angle range when torsional vibrations of a large torsion angle are applied. This large frictional resistance increases the impact of collision between the members forming the rotating-direction space so that hitting or tapping noises occur.

In conventional damper mechanisms, a flywheel is fixed to a crankshaft of an engine for absorbing vibrations caused by combustion variations of the engine. Further, a clutch device is arranged on the transmission side of the flywheel in an axial direction. The clutch device includes a clutch disk assembly coupled to an input shaft of a transmission and a clutch cover assembly for biasing a frictional coupling portion of the clutch disk assembly with the flywheel. The clutch disk assembly has a damper mechanism for absorbing and damping torsional vibrations. The damper mechanism has elastic members such as coil springs, which are disposed for compression in the rotating direction.

A structure is also known such that the damper mechanism is arranged not in the clutch disk assembly but between the flywheel and the crankshaft. In this structure, the flywheel is located on an output side of a vibration system, in which the coil springs provide a boundary between the output and input sides, and an inertia on the output side is larger than that in a conventional structure. Consequently, a resonance rotation speed can be set below an idling rotation speed and a high damping performance can be achieved. The structure formed of the above combination of the flywheel and the damper mechanism provides the flywheel assembly or the flywheel damper.

When the flywheel assembly described above receives torque variations from an engine, the springs in the damper mechanism are compressed in the rotational direction to absorb and damp the torque variations. Further, the damper mechanism has a frictional resistance generating mechanism formed of a plurality of members, therefore sliding occurs in the frictional resistance generating mechanism to generate a predetermined hysteresis torque when springs are compressed. Consequently, torsional vibrations are rapidly damped.

The damper mechanism includes a pair of input plates opposed to each other, an output plate disposed between the input plates, and a coil spring circumferentially and elastically coupling the pair of input plates to the output plate. The pair of input plates is fixed together by a plurality of stop pins on the radially outer side so that the input plates rotate together. The stop pins are inserted into recesses formed at an outer periphery of a flange. The pair of input plates can rotate through a predetermined angle range with respect to the flange, and the relative rotation stops when the stop pins come into contact with the circumferential ends of the recesses. As described above, the stop pins couple the pair of input plates together as well as function as a stopper with respect to the flange.

The stop pin must have a certain diameter and must be disposed radially inside the outer periphery of the pair of input plates. Due to these conditions, it is impossible to increase a relative rotation angle between the input plate pair and the flange in the structure employing the stop pins. This means that the performance of coil springs cannot be fully utilized even if the coil springs have a high strength because the relative rotation angle cannot be increased sufficiently. For reducing tooth-hitting noises and muffled noises of a drive system during driving of a vehicle, it is necessary to minimize a torsional rigidity in an acceleration/deceleration torque range for setting a torsional resonance frequency of the drive system to a value lower than an actual rotation range. For achieving the low torsional rigidity and a further increased stopper torque, it is necessary to ensure a wide torsion angle.

In view of the above, it will be apparent to those skilled in the art from this disclosure that there exists a need for an improved damper mechanism. This invention addresses this need in the art as well as other needs, which will become apparent to those skilled in the art from this disclosure.

SUMMARY OF THE INVENTION

An object of the present invention is to improve a torsional vibration damping function by generating a predetermined frictional resistance in both of first and second stages of the torsion characteristics of a damper mechanism while preventing generation of a predetermined frictional resistance in response to minute torsional vibrations.

Another object of the present invention is to suppress occurrence of hitting noises in a frictional resistance generating mechanism, which is provided with a minute rotating-direction space for absorbing minute torsional vibrations.

Still another object of the present invention is to overcome the problem caused by conventional stop pins in a flywheel assembly, and to increase sufficiently a relative torsion angle between the input and output members.

According to a first aspect of the present invention, a damper mechanism provided to transmit a torque while absorbing and damping torsional vibrations includes a first rotary member, a second rotary member, a first elastic member, a second elastic member, a frictional resistance generating mechanism, and a frictional resistance suppressing mechanism. The second rotary member is rotatable relative to the first rotary member. The first elastic member is compressed in response to relative rotation between the first and second rotary members to achieve low rigidity characteristics in a small torsion angle region of the torsion characteristics. The second elastic member is compressed in response to relative rotation between the first and second rotary members to high rigidity achieve characteristics in a large torsion angle region of the torsion characteristics. The frictional resistance generating mechanism generates a frictional resistance when the first elastic member is in a compressed state and when the second elastic member is in a compressed state. The frictional resistance suppressing mechanism has a rotating-direction space to prevent the frictional resistance generating mechanism from operating in a predetermined angle range.

According to this damper mechanism, when the first and second rotary members rotate relatively to each other, the first and second elastic members are compressed, and the frictional resistance generating mechanism generates a frictional resistance. Consequently, the torsional vibrations are rapidly absorbed and damped. In a small torsion angle region, the first elastic member is compressed to achieve low-rigidity characteristics. In a large torsion angle region, the second elastic member is compressed to achieve the high-rigidity characteristics. In any region, the frictional resistance generating mechanism operates to generate the frictional resistance. However, when minute torsional vibrations are applied, the rotating-direction space of the frictional resistance suppressing mechanism acts to stop or prevent the operation of the frictional resistance generating mechanism in any angle range. Thus, a large frictional resistance does not occur in response to the minute torsional vibrations in a first stage of the torsion characteristics, therefore, torsional vibration damping performance improves.

According to a second aspect of the present invention, the damper mechanism of the first aspect further has a feature such that the frictional resistance generating mechanism and the frictional resistance suppressing mechanism are arranged to operate in parallel with the first and second elastic members in the rotational direction.

In this damper mechanism, since the frictional resistance generating mechanism and the frictional resistance suppressing mechanism are arranged to operate in parallel with the first and second elastic members in the rotational direction, these mechanisms are able to operate when the first and second elastic members operate.

According to a third aspect, the damper mechanism of the second aspect further has such a feature that the first and second elastic members operate in series in the rotational direction.

In this damper mechanism, the first and second elastic members operate in series in the rotational direction, however, the second member is hardly compressed when the first elastic member is being compressed.

According to a fourth aspect of the present invention, the damper mechanism of the first, second, or third aspect further has a feature such that the frictional resistance generating mechanism realizes first regions for increasing stepwise a frictional resistance on opposite sides of a range of the predetermined angle, respectively, and a second region for providing a constant frictional resistance.

In this damper mechanism, the frictional resistance increases stepwise in the first region before the large frictional resistance is generated in the second region. Thus, a wall of a high hysteresis torque does not exist when generating the large frictional resistance. This reduces hitting or tapping noises of claws, which may occur when the damper mechanism generates a high hysteresis torque.

According to a fifth aspect of the present invention, the damper mechanism of the fourth aspect further has a feature such that the frictional resistance generating mechanism generates an intermediate frictional resistance in the first region.

In this damper mechanism, an intermediate frictional resistance occurs in the first region before a large frictional resistance occurs in the second region. Thus, a wall of a high hysteresis torque does not exist when generating the large frictional resistance. This reduces hitting or tapping noises of claws, which may occur when the damper mechanism generates a high hysteresis torque.

According to a sixth aspect of the present invention, the damper mechanism of the fourth aspect further has a feature such that the frictional resistance generating mechanism generates a frictional resistance increasing smoothly in the first region.

In this damper mechanism, a frictional resistance increasing smoothly occurs in the first region before a large frictional resistance occurs in the second region. Thus, a wall of a high hysteresis torque does not exist when generating the large frictional resistance. This reduces hitting or tapping noises of claws, which may occur when the damper mechanism generates a high hysteresis torque.

According to a seventh aspect of the present invention, a frictional resistance generating mechanism is arranged between two relatively rotatable members of a rotary mechanism for generating a frictional resistance in response to relative rotation that occurs between the two members by torsional vibrations to damp the torsional vibrations. The frictional resistance generating mechanism includes a first frictional resistance generating portion, a second frictional resistance generating portion, a first frictional resistance suppressing portion, and a second frictional resistance suppressing portion. The second frictional resistance generating portion generates a frictional resistance larger than that generated by the first frictional resistance generating portion. The first frictional resistance suppressing portion has a first rotating-direction space to prevent the operation of both of the first and second frictional resistance generating portions. The second frictional resistance suppressing portion has a second rotating-direction space to prevent the operation of only the second frictional resistance generating portion on the opposite sides of a torsion angle range of the first rotating-direction space.

In the frictional resistance generating mechanism, when the torsion angle of the torsional vibrations is within the torsion angle range of the first rotating-direction space in the first frictional resistance suppressing portion, the first rotating-direction space prevents the operation of the first and second frictional resistance generating portions so that a large frictional resistance does not occur. When the torsion angle of the torsional vibrations is within the torsion angle range of the second rotating-direction space of the second frictional resistance generating portion, the second rotating-direction space only permits the operation of the first frictional resistance suppressing portion to generate a frictional resistance of an intermediate magnitude. When the torsion angle of the torsional vibrations exceeds the torsion angle range of the second rotating-direction space, the second frictional resistance generating portion operates to generate the largest frictional resistance.

As described above, the first frictional resistance generating portion generates frictional resistance of an intermediate magnitude in the torsion angle range of the second rotating-direction engagement portion before the second frictional resistance generating portion operates to generate the large frictional resistance. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism.

According to an eighth aspect of the present invention, a frictional resistance generating mechanism is arranged between two relatively rotatable members of a rotary mechanism to generate a frictional resistance in response to relative rotation that occurs between the two members by torsional vibrations to damp the torsional vibrations. The frictional resistance generating mechanism includes a first frictional resistance generating portion and a second frictional resistance generating portion. The first frictional resistance generating portion does not operate within a first torsion angle range, and operates in second torsion angle ranges provided on the opposite sides of the first torsion angle range, respectively. The second frictional resistance generating portion does not operate within the first and second torsion angle ranges, and operates on the opposite sides of the second torsion angle ranges.

In the frictional resistance generating mechanism, when the torsion angle of the torsional vibrations is within the first torsion angle range, neither of the first and second frictional resistance generating portions operates, thus, a large frictional resistance does not occur. When the torsion angle of the torsional vibrations is within the second torsion angle range, only the first frictional resistance generating portion operates to generate a frictional resistance of an intermediate magnitude. When the torsion angle of the torsional vibrations exceeds the second torsion angle range, the second frictional resistance generating portion operates to generate the largest frictional resistance.

As described above, the first frictional resistance generating portion generates the frictional resistance of an intermediate magnitude within the second torsion angle range before the second frictional resistance generating portion operates to generate the large frictional resistance. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism.

According to a ninth aspect of the present invention, a frictional resistance generating mechanism is arranged between two relatively rotatable members of a rotary mechanism to generate a frictional resistance in response to relative rotation that occurs between the two members by torsional vibrations to damp the torsional vibrations. The frictional resistance generating mechanism includes a large frictional resistance generating mechanism, a large frictional resistance generation suppressing mechanism, and a small frictional resistance generating mechanism. The large frictional resistance generation suppressing mechanism has a rotating-direction space to prevent operation of the large frictional resistance generating mechanism. The small frictional resistance generating mechanism generates a frictional resistance smaller than the frictional resistance generated by the large frictional resistance generating mechanism on the opposite sides of the rotating-direction space.

In the frictional resistance generating mechanism, when the torsion angle is within the torsion angle range of a middle portion of the rotating-direction space, neither of the small and large frictional resistance generating mechanisms operates, thus, a large frictional resistance does not occur. When the torsion angle of the torsional vibrations is within the torsion angle range of the opposite ends of the rotating-direction space, only the small frictional resistance generating mechanism operates to generate a frictional resistance of an intermediate magnitude. When the torsion angle of the torsional vibrations exceeds the the torsion angle range of the rotating-direction space, the large frictional resistance generating mechanism operates to generate the largest frictional resistance.

As described above, the small frictional resistance generating mechanism generates the frictional resistance of an intermediate magnitude on the opposite ends of the torsion angle range of the rotating-direction space before the large frictional resistance generating mechanism operates to generate the large frictional resistance. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism.

According to a tenth aspect of the present mechanism, a frictional resistance generating mechanism is arranged between two relatively rotatable members of a rotary mechanism to generate a frictional resistance in response to relative rotation that occurs between the two members by torsional vibrations to damp the torsional vibrations. The frictional resistance generating mechanism includes a first friction portion and a second friction portion. The first friction portion has a first hysteresis torque generating portion, and a first rotating-direction space arranged to operate in series with respect to the first hysteresis torque generating portion in a rotating direction. The second friction portion has a second hysteresis torque generating portion and a second rotating-direction space. The second hysteresis torque generating portion is arranged in the rotating direction between the first hysteresis torque generating portion and the first rotating-direction space. The second hysteresis torque generating portion generates a hysteresis torque smaller than the hysteresis torque generated by the first hysteresis torque generating portion. The second rotating-direction space is arranged to operate in series with respect to the second hysteresis torque generating portion in the rotating direction.

In the frictional resistance generating mechanism, when the torsion angle of the torsional vibrations is within the torsion angle range of the first rotating-direction space of the first friction portion, neither of the first and second hysteresis torque generating portions operates, thus, a large frictional resistance does not occur. When the torsion angle of the torsional vibrations exceeds the torsion angle range of the first rotating-direction space of the first friction portion to fall within a torsion angle range of the second rotating-direction space of the second friction portion, the second hysteresis torque generating portion operates to generate a hysteresis torque of an intermediate magnitude. When the torsion angle of the torsional vibrations exceeds a torsion angle range of the second rotating-direction space, the first hysteresis torque generating portion operates to generate the largest frictional resistance.

As described above, the second hysteresis torque generating portion generates the frictional resistance of an intermediate magnitude in the torsion angle ranges of the second rotating-direction on the opposite sides of the first rotating-direction space before the first hysteresis torque generating portion operates to generate the large frictional resistance. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism.

According to an eleventh aspect of the present invention, a frictional resistance generating mechanism is arranged between two relatively rotatable members of a rotary mechanism for generating a frictional resistance in response to relative rotation that occurs between the two members by torsional vibrations to damp the torsional vibrations. The frictional resistance generating mechanism includes a first friction generating portion, a second friction generating portion, a first rotating-direction space forming portion, and a second rotating-direction space forming portion. The second friction generating portion is arranged to operate in parallel with the first friction generating portion in the rotating direction. The first rotating-direction space forming portion prevents the operation of the first friction generating portion in an initial stage of a torsion angle. The second rotating-direction space forming portion prevents the operation of the second friction generating portion up to a predetermined torsion angle when the first friction generating portion is operating.

In the frictional resistance generating mechanism, when relative rotation starts between the two members, the first rotating-direction space forming portion initially prevents operation of both the first and second friction generating portions. When the torsion angle exceeds an initial stage, the first friction generating portion starts the operation to generate a predetermined frictional resistance. When a predetermined torsion angle is achieved, the second rotating-direction space forming portion is closed, and the second friction generating portion generates a predetermined frictional resistance. Thus, the first and second friction generating portions operate in parallel in the rotating-direction to generate a frictional resistance larger than that generated only by the first friction generating portion.

As described above, only the first friction generating portion operates to generate the frictional resistance of an intermediate magnitude in the predetermined torsion angle range of the second rotating-direction space forming portion before the first and second friction generating portions operate in parallel in the rotating direction to generate the large frictional resistance. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism.

According to a twelfth aspect of the present invention, a frictional resistance generating mechanism is arranged between two relatively rotatable members of a rotary mechanism for generating a frictional resistance in response to relative rotation that occurs between the two members by torsional vibrations to damp the torsional vibrations. The frictional resistance generating mechanism includes first, second, and third friction generating portions as well as first, second, and third rotating-direction space forming portions. The first, second, and third friction generating portions are arranged to operate in parallel with each other in a rotating direction between the first and second rotary members. The first rotating-direction space forming portion prevents an operation of the first friction generating portion in an initial stage of a torsion angle. The second rotating-direction space forming portion prevents the operation of the second friction generating portion up to a predetermined torsion angle when the first friction generating portion operates. The third rotating-direction space forming portion prevents an operation of the third friction generating portion until a predetermined torsion angle is achieved during the operation of the second friction generating portion.

In the frictional resistance generating mechanism, when relative rotation starts between the two members, the first rotating direction space forming portion initially prevents the operations of all the first, second, and third friction generating portions. When the torsion angle exceeds an initial stage, the first friction generating portion starts the operation to generate a predetermined frictional resistance. When a predetermined torsion angle is achieved, the second rotating-direction space forming portion is closed, and the second friction generating portion generates a predetermined frictional resistance. Thus, the first and second friction generating portions operate in parallel in the rotating-direction to generate a frictional resistance larger than that generated only by the first friction generating portion. When another predetermined torsion angle is achieved, the third rotating-direction space forming portion is closed, and the third friction generating portion generates a predetermined frictional resistance. Thus, the first, second, and third friction generating portions operate in parallel in the rotating-direction to generate a frictional resistance larger than that generated by the first and second friction generating portions.

As described above, only the first friction generating portion initially operates before the first, second, and third friction generating portions operate in parallel in the rotating direction to generate the large frictional resistance. Then, only the first and second friction generating portions operate so that a frictional resistance of an intermediate magnitude is generated in a stepwise fashion. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism.

According to a thirteenth aspect of the present invention, a frictional resistance generating mechanism is arranged between two relatively rotatable members of a rotary mechanism for generating a frictional resistance in response to relative rotation that occurs between the two members by torsional vibrations to damp the torsional vibrations. The frictional resistance generating mechanism includes a plurality of friction generating portions and a plurality of rotating-direction space forming portions. The plurality of friction generating portions is arranged between the first and second rotary members to operate in parallel with each other in the rotating direction. The plurality of rotating-direction space forming portions delays the operations of the plurality of friction portions to start successively the operations of the respective friction portions.

In the frictional resistance generating mechanism, when relative rotation occurs between the two members, the plurality of rotating-direction space forming portions successively starts the operations of the plurality of friction portions. Thus, the number of the friction generating portions operating in parallel with each other in the rotating direction increases stepwise. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism.

According to a fourteenth aspect of the present invention, a frictional resistance generating mechanism is arranged between two relatively rotatable members of a rotary mechanism for generating a frictional resistance in response to relative rotation that occurs between the two members by torsional vibrations to damp the torsional vibrations. The frictional resistance generating mechanism includes a large friction generating portion and an intermediate friction generating portion. The intermediate friction generating portion generates an intermediate frictional resistance smaller than a frictional resistance generated by the large frictional resistance generating portion just before the large friction generating portion starts operating. The magnitude of the intermediate frictional resistance may be constant, may change in a multi-step fashion or may change gradually.

In the frictional resistance generating mechanism, when relative rotation occurs between the two members, the large friction generating portion operates to generate a large frictional resistance immediately after the intermediate friction generating portion operates to generate the intermediate frictional resistance. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism.

According to a fifteenth aspect of the present invention, a flywheel assembly to transmit a torque from a crankshaft of an engine includes a flywheel, an elastic coupling mechanism and a plate-like coupling portion. The flywheel has a friction surface. The elastic coupling mechanism is a mechanism to couple elastically the flywheel and the crankshaft in a rotational direction. The elastic coupling mechanism has a pair of first disk-shaped members, a second disk-shaped member, and an elastic member. The first disk-shaped members are axially spaced from each other and fixed together. The second disk-shaped member is arranged between the pair of first disk-shaped members. The elastic member is provided to couple elastically the pair of first disk-shaped members to the second disk-shaped member in the rotational direction. The plate-like coupling portion extends between outer peripheries of the pair of first disk-shaped members and couples the pair of first disk-shaped members together.

In this flywheel assembly, the plurality of elastic members transmits the torque between the first disk-shaped plate pair and the second disk-shaped plate. When relative rotation occurs between the pair of first disk-shaped plate pair and the second disk-shaped plate, the elastic members are compressed therebetween. A conventional stop pin is eliminated, and the plate-like coupling portion couples the first disk-shaped plate pair to the second disk-shaped plate. The plate-like coupling portion is radially shorter than the conventional stop pin, therefore can be disposed in the radially outermost position of the second disk-shaped plate. Therefore, the plate-like coupling portion does not interfere with the elastic members so that a torsion angle of a damper mechanism can be sufficiently increased.

According to a sixteenth aspect of the present invention, the flywheel assembly of the fifteenth aspect further has a feature such that the plate-like coupling portions are arranged at a plurality of circumferentially shifted positions, respectively.

According to a seventeenth aspect of the present invention, the flywheel assembly of the fifteenth or sixteenth aspect further has a feature such that the plate-like coupling portion has main surfaces directed radially inward and outward, respectively.

According to an eighteenth aspect of the present invention, the flywheel assembly of the fifteenth, sixteenth or seventeenth aspect further has a feature such that the plate-like coupling portion extends integrally from one of the pair of first disk-shaped members.

According to nineteenth aspect of the present invention, the flywheel assembly of any one of the fifteenth to eighteenth aspects further has a feature such that the second disk-shaped member is provided with a stop portion colliding in the rotational direction with the disk-shaped member when a torsion angle between the first disk-shaped member pair and the second disk-shaped member increases.

According to a twentieth aspect of the present invention, a frictional resistance generating mechanism is arranged between two relatively rotatable members of a rotary mechanism to generate a frictional resistance in response to relative rotation that occurs between the two members by torsional vibrations to damp the torsional vibrations. The frictional resistance generating mechanism includes a first rotary member, a second rotary member, a first intermediate member, and a second intermediate member. The second rotary member is rotatable relatively to the first rotary member. The first intermediate member engages with the first rotary member via a first rotating-direction space. The second intermediate member cooperates with the first intermediate member to form an engagement portion engaging with the first intermediate member via a second rotating-direction space. The second intermediate member also cooperates with the first intermediate member to form a first frictional resistance generating portion slidably and frictionally engaging in the rotating direction with the first intermediate member. Further, the second intermediate member cooperates with the second rotary member to form a second frictional resistance generating portion slidably and frictionally engaging in the rotating direction with the second rotary member to generate a frictional resistance larger than a frictional resistance generated by the first frictional resistance generating portion.

In this frictional resistance generating mechanism, when the first rotary member rotates relatively to the second rotary member, the first rotating-direction space between the first rotary member and the first intermediate member initially decreases. In this operation, neither the first nor the second frictional resistance generating portions generates a frictional resistance. When the first rotating-direction space disappears, the first intermediate member rotates together with the first rotary member, and rotates relatively to the second intermediate member. In this relative rotation, the first frictional resistance generating portion generates a frictional resistance, and at the same time, the second rotating-direction space decreases. When the second rotating-direction space disappears, the second intermediate member rotates together with the first intermediate member, and rotates relatively to the second rotary member. In this relative rotation, the second frictional resistance generating portion generates a frictional resistance larger than that generated by the first frictional resistance generating portion.

Consequently, in the frictional resistance generating mechanism, when a torsion angle of torsional vibrations is in an angle range of the first rotating-direction space, the first rotating-direction space prevents the operation of the first and second frictional resistance generating portions so that a large frictional resistance does not occur. When the torsion angle of torsional vibrations is in an angle range of the second rotating-direction space, due to the second rotating-direction space only the first frictional resistance generating portion operates so that a frictional resistance of an intermediate magnitude occurs. When the torsion angle of torsional vibrations exceeds the angle range of the second rotating-direction space, the second frictional resistance generating portion operates to generate the largest frictional resistance.

As described above, the first frictional resistance generating portion generates the frictional resistance of an intermediate magnitude in the torsion angle range of the second rotating-direction space before the second frictional resistance generating portion operates to generate the large frictional resistance. In this manner, the large frictional resistance rises in a multi-step or stepwise fashion so that a wall of a high hysteresis torque does not exist when generating the large frictional resistance. Thereby, hitting or tapping noises of claws, which may occur when a high hysteresis torque occurs, can be reduced in the frictional resistance generating mechanism.

According to a twenty-first aspect of the present invention, the frictional resistance generating mechanism of the twentieth aspect further has a feature such that the first rotating-direction space is larger than the second rotating-direction space.

According to a twenty-second aspect of the present invention, the frictional resistance generating mechanism of the twentieth or twenty-first aspect further has a feature such that the first and second intermediate members are disk-shaped members axially overlapping and being in contact with each other.

According to a twenty-third aspect of the present invention, the frictional resistance generating mechanism of the twenty-second aspect further has a feature such that the second intermediate member is formed of a pair of members each being in contact with one of axially opposite sides of the first intermediate member. Each of the pair of members cooperates with the first intermediate member to form the first frictional resistance generating portion therebetween, and cooperates with the second rotary member to form the second frictional resistance generating portion therebetween.

According to a twenty-fourth aspect of the present invention, the frictional resistance generating mechanism of the twenty-second or twenty-third aspect further has a feature such that the first rotating-direction space is radially positioned in an area defined by axially overlapping portions of the first and second intermediate members.

In this frictional resistance generating mechanism, the radial position of the first rotating-direction space is not shifted radially outward from the axially overlapping portions of the first and second intermediate members so that the structure can be small in size.

According to a twenty-fifth aspect of the present invention, the frictional resistance generating mechanism of the twenty-fourth aspect further has a feature such that the first rotary member has a disk-shaped portion axially overlapping the first intermediate member. The first rotating-direction space is formed between the first intermediate member and the disk-shaped portion of the first rotary member.

In this frictional resistance generating mechanism, the first rotating-direction space is formed between the first intermediate member and the disk-shaped portion of the first rotary member so that the structure of the first rotating-direction space can be simple. Therefore, the accuracy of the first rotating-direction space is improved.

According to a twenty-sixth aspect of the present invention, the frictional resistance generating mechanism of the twenty-fifth aspect further has a feature such that one of the first intermediate member and the disk-shaped portion of the first rotary member is provided with a space extending in the rotating direction, and the other is provided with a projected portion extending axially through the space to form the first rotating-direction space.

In this frictional resistance generating mechanism, since the first intermediate member and the disk-shaped portion of the first rotary member are provided with the space and the projection, the structure of the first rotating-direction space can be simple. Therefore, the accuracy of the first rotating-direction space is improved.

According to a twenty-seventh aspect of the present invention, the frictional resistance generating mechanism of the twenty-sixth aspect further has a feature such that the space is formed in the disk-shaped portion of the first rotary member. The first intermediate member is formed of a pair of members arranged on axially opposite sides of the disk-shaped portion, respectively. One of the pair of members has the projected portion, and is unrotatably engaged with the other of the pair of members via the projected portion.

According to a twenty-eighth aspect of the present invention, a frictional resistance generating mechanism is arranged between two relatively rotatable members of a rotary mechanism to generate a frictional resistance in response to relative rotation that occurs between the two members by torsional vibrations to damp the torsional vibrations. The frictional resistance generating mechanism includes a first rotary member, a second rotary member, a first intermediate member, and a second intermediate member. The second rotary member is rotatable relatively to the first rotary member. The first intermediate member engages with the first rotary member via a first space in the rotating-direction, and cooperates with the second rotary member to form a first friction generating portion therebetween. The second intermediate member is arranged between the first and second rotary members to operate with respect to the first intermediate member in a rotating direction such that an end of the second intermediate member and an end of the first intermediate member exert forces on each other, engages with the first intermediate member via a second space in the rotating-direction, and cooperates with the second rotary member to form a second friction generating portion therebetween.

In this frictional resistance generating mechanism, when the first rotary member rotates relatively to the second rotary member, the first rotating-direction space between the first rotary member and the first intermediate member initially decreases. In this operation, neither the first nor the second friction generating portions generates a frictional resistance. When the first rotating-direction space disappears, the first intermediate member rotates together with the first rotary member, and rotates relatively to the second intermediate member. In this relative rotation, the first friction generating portion generates a frictional resistance, and at the same time, the second rotating-direction space decreases. When the second rotating-direction space disappears, the second intermediate member rotates together with the first intermediate member, and rotates relatively to the second rotary member. In this relative rotation, the first and second friction generating portions operate in parallel in the rotating direction, and generate a frictional resistance larger than that generated only by the first friction generating portion.

In this manner, the large frictional resistance rises in a multi-step or stepwise fashion so that a wall of a high hysteresis torque does not exist when generating the large frictional resistance. Thereby, hitting or tapping noises of claws, which may occur when a high hysteresis torque occurs, can be reduced in the frictional resistance generating mechanism.

According to a twenty-ninth aspect of the present invention, the frictional resistance generating mechanism of the ninth aspect further has a feature such that the frictional resistance generating mechanism further includes a third intermediate member arranged between the first and second rotary members to operate with respect to the first and second intermediate members in the rotating direction such that an end of the third intermediate member and an end of the first and second intermediate members exert forces on each other, engaging with the second intermediate member via a third rotating-direction space, and cooperating with the second rotary member to form a third friction generating portion.

In this frictional resistance generating mechanism, when the first rotary member rotates relatively to the second rotary member, the first rotating-direction space between the first rotary member and the first intermediate member initially decreases. In this operation, neither the first nor the second friction generating portions generates a frictional resistance. When the first rotating-direction space is closed, the first intermediate member rotates together with the first rotary member, and rotates relatively to the second intermediate member. In this relative rotation, the first friction generating portion generates a frictional resistance, and at the same time, the second rotating-direction space decreases. When the second rotating-direction space disappears, the second intermediate member rotates together with the first intermediate member, and rotates relatively to the second rotary member. In this relative rotation, the first and second friction generating portions operate in parallel in the rotating direction, and generate a frictional resistance larger than that generated only by the first friction generating portion. When the third rotating-direction space disappears, the third intermediate member rotates together with the second intermediate member, and rotates relatively to the second rotary member. In this relative rotation, the first, second, and third friction generating portions operate in parallel in the rotating direction, and generate a frictional resistance larger than that generated only by the first and second friction generating portions.

In this manner, the large frictional resistance rises in a multi-step or stepwise fashion so that hitting or tapping noises of claws, which may occur when a high hysteresis torque occurs, can be reduced in the frictional resistance generating mechanism.

According to a thirtieth aspect of the present invention, a frictional resistance generating mechanism is arranged between two relatively rotatable members of a rotary mechanism to generate a frictional resistance in response to relative rotation that occurs between the two members by torsional vibrations to damp the torsional vibrations. The frictional generating mechanism includes a first rotary member, a second rotary member, and a plurality of friction members. The second rotary member is rotatable relatively to the first rotary member. The plurality of friction members is arranged in a rotating direction between the first and second rotary members, and each of the friction members frictionally engages with the second rotary member. The friction members engage in series with each other in the rotating direction via a rotating-direction space such that an end of one exerts force on an end of the other.

In this frictional resistance generating mechanism, when the first rotary member rotates relatively to the second rotary member, the plurality of friction members are driven by the first rotary member to slide with respect to the second rotary member and to generate a frictional resistance. In this operation, the respective friction members are successively driven while being spaced from each other by the rotating-direction spaces. Thus, the hysteresis torque increases in a stepwise fashion.

In this manner, the large frictional resistance rises in a multi-step or stepwise fashion so that a wall of a high hysteresis torque does not exist when generating the large frictional resistance. Thereby, hitting or tapping noises of claws, which may occur when a high hysteresis torque occurs, can be reduced in the frictional resistance generating mechanism.

According to the frictional resistance generating mechanism of the invention, when a torsion angle of torsional vibrations is in an angle range of the first rotating-direction space, the first rotating-direction space prevents the operation of the first and second frictional resistance generating portions so that a large frictional resistance does not occur. When the torsion angle of torsional vibrations is in an angle range of the second rotating-direction space, the second rotating-direction space operates only the first frictional resistance generating portion so that a frictional resistance of an intermediate magnitude occurs. When the torsion angle of torsional vibrations exceeds the angle range of the second rotating-direction space, the second frictional resistance generating portion operates to generate the largest frictional resistance.

As described above, the first frictional resistance generating portion generates the frictional resistance of an intermediate magnitude in the torsion angle range of the second rotating-direction space before the second frictional resistance generating portion operates to generate the large frictional resistance. In this manner, the large frictional resistance rises in a multi-step or stepwise fashion so that a wall of a high hysteresis torque does not exist when generating the large frictional resistance. Thereby, hitting or tapping noises of claws, which may occur when a high hysteresis torque occurs, can be reduced in the frictional resistance generating mechanism.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
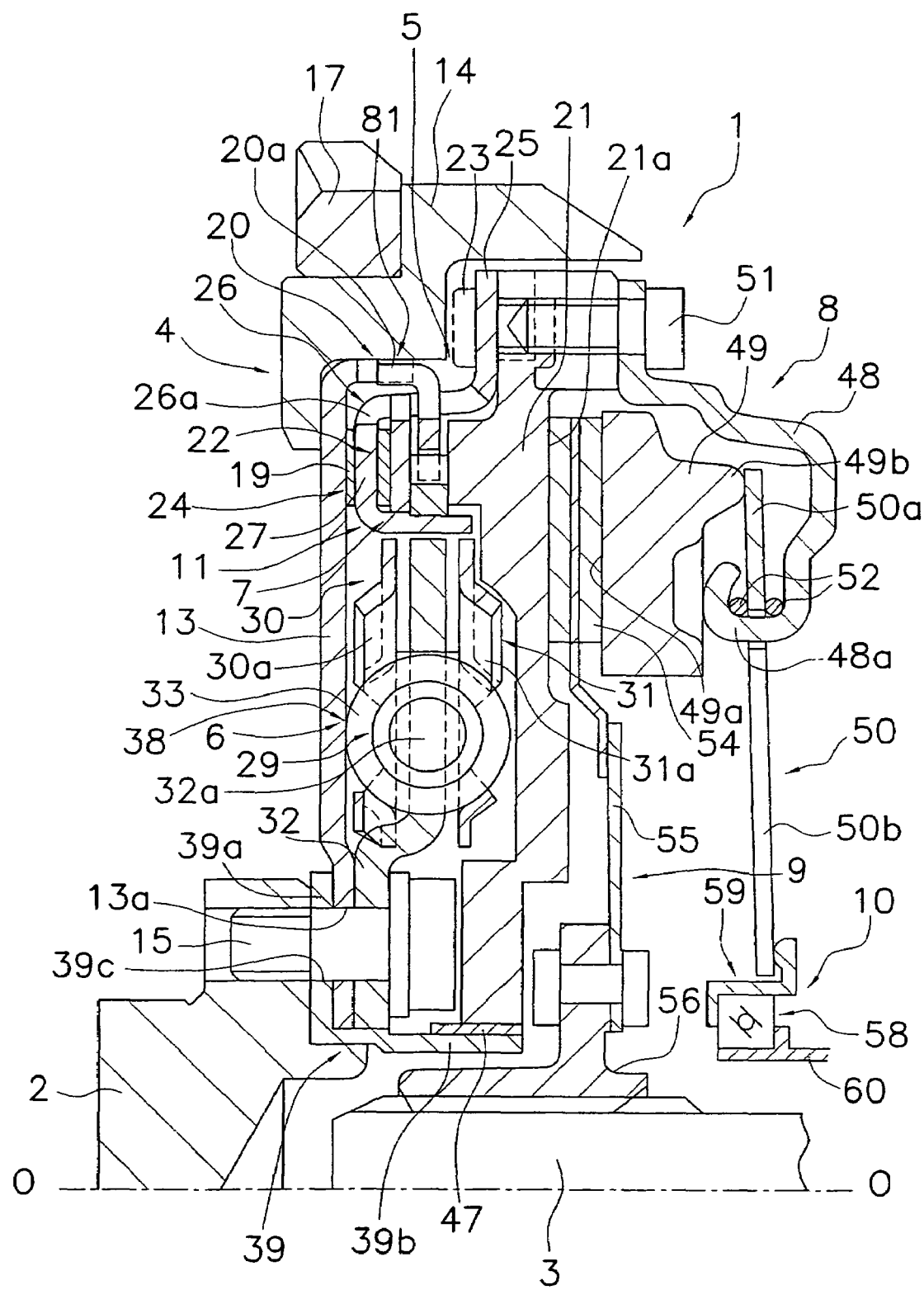
FIG. 1 is a schematic cross-sectional view of a clutch device in accordance with a preferred embodiment of the present invention.
Figure 2:
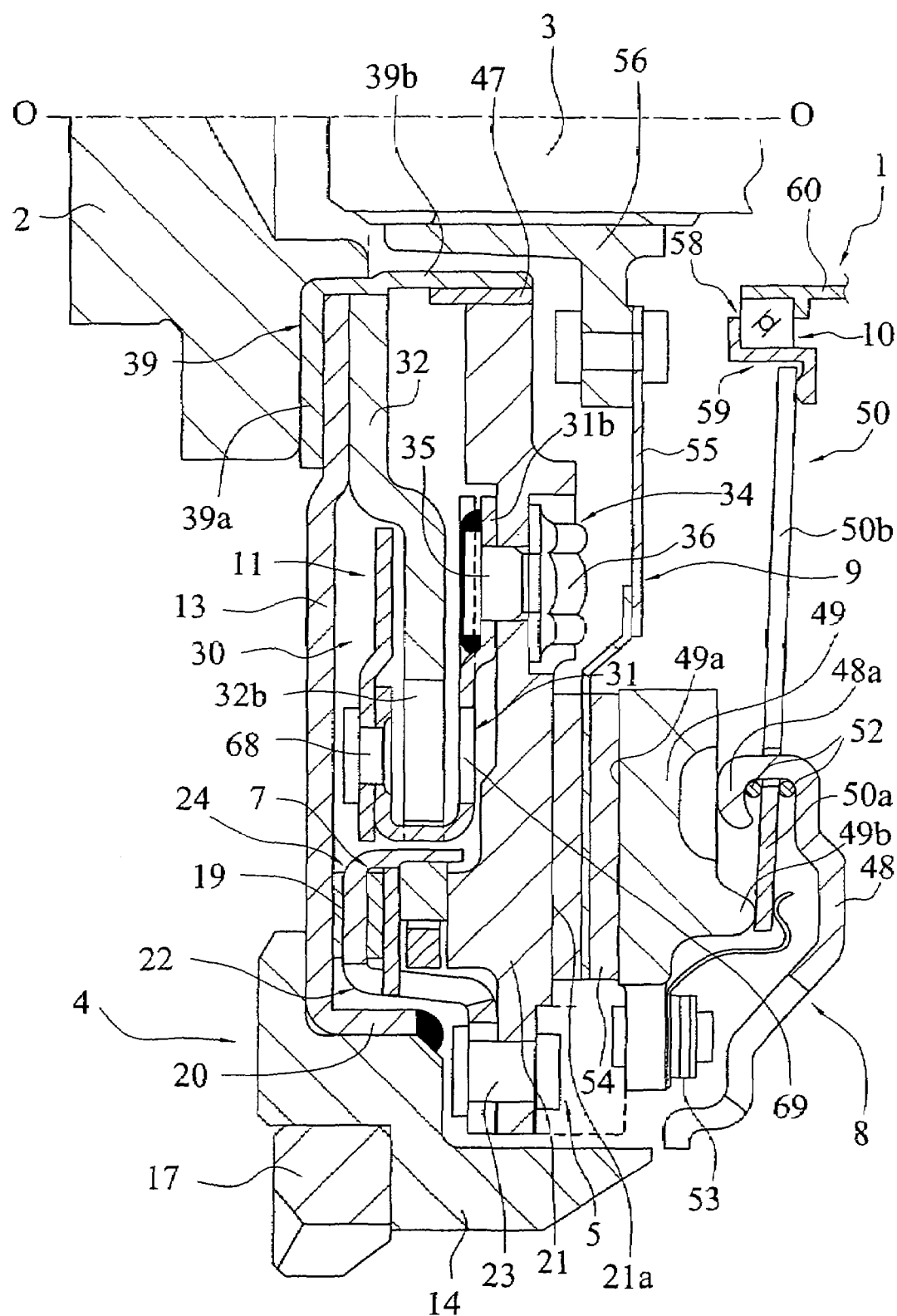
FIG. 2 is an alternate schematic cross-sectional view of the clutch device.

A clutch device 1 in accordance with a preferred embodiment of the present invention shown in FIGS. 1 and 2 is to couple provided releasably torque between a crankshaft 2 on an engine side and an input shaft 3 on a transmission side. The clutch device 1 is primarily formed of a first flywheel assembly 4, a second flywheel assembly 5, a clutch cover assembly 8, a clutch disk assembly 9, and a release device 10. The first and second flywheel assemblies 4 and 5 are combined to form a flywheel damper 11, which includes a damper mechanism 6 and is described later.

Figure 3:
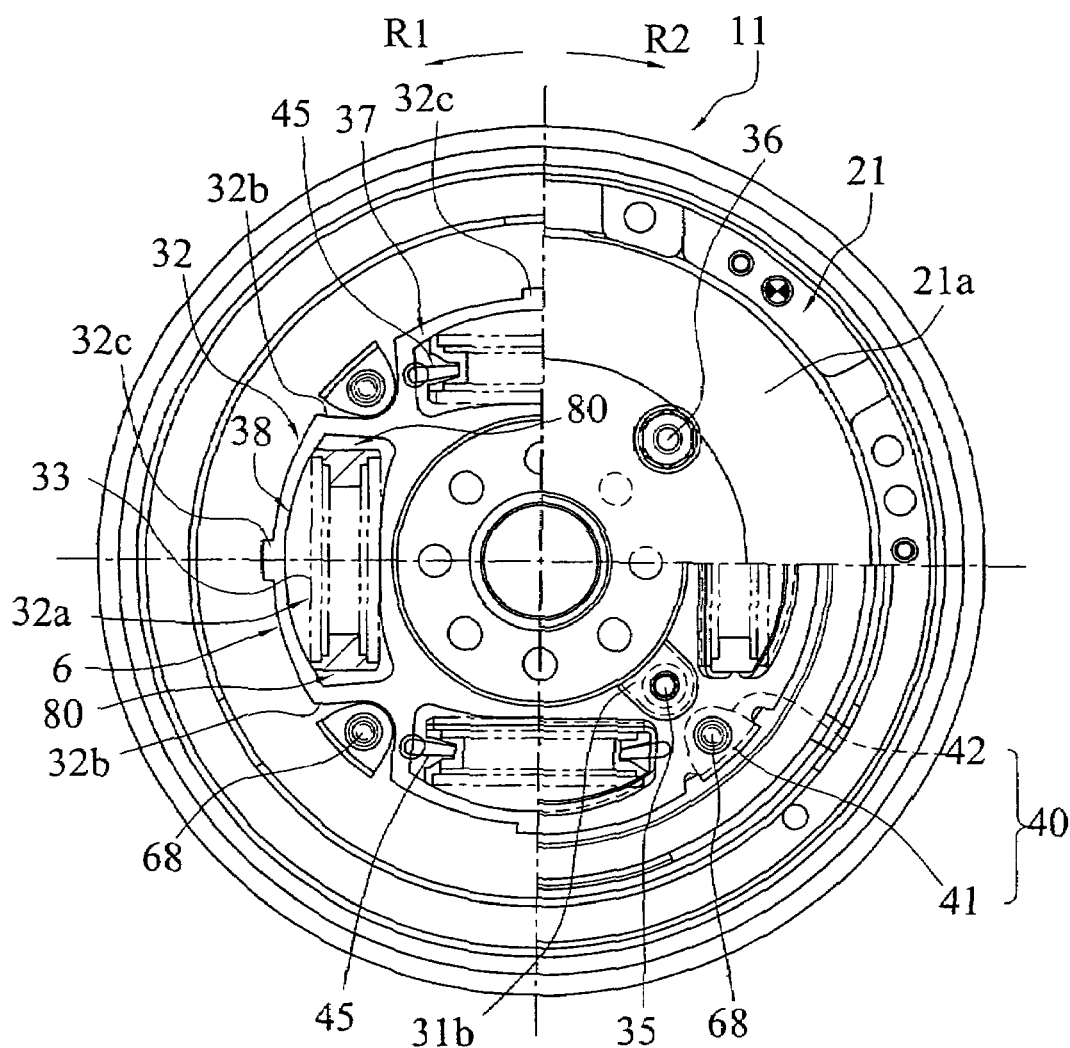
FIG. 3 is an elevational view of a flywheel damper of the clutch device.

In FIGS. 1 and 2, O—O indicates a rotation axis of the clutch device 1. An engine (not shown) is disposed on the left side in FIGS. 1 and 2, and a transmission (not shown) is disposed on the right side. In following description, the left side in FIGS. 1 and 2 will be referred to as the engine side, which is based on the axial direction, and the right side will be referred to the transmission side, which is based on the axial direction. In FIG. 3, an arrow R1 indicates a drive side, i.e., forward side in the rotational direction, and an arrow R2 indicates a reverse drive side (rearward side in the rotational direction).

First Flywheel Assembly

Referring to FIGS. 1 and 2, the first flywheel assembly 4 is fixed to an end of the crankshaft 2. The first flywheel assembly 4 is a member that ensures a large moment of inertia on the crankshaft side. The first flywheel assembly 4 is primarily formed of a disk-shaped member 13, an annular member 14, and a support plate 39, which will be described later. The disk-shaped member 13 has a radially inner end fixed to an end of the crankshaft 2 by a plurality of bolts 15. The disk-shaped member 13 has bolt insertion apertures 13a located corresponding to the bolts 15, respectively. Each bolt 15 is axially attached to the crankshaft 2 from the transmission side. The annular member 14 has a relatively thick block-like form, and is axially fixed to the transmission side of the radially outer end of the disk-shaped member 13. The radially outer end of the disk-shaped member 13 is welded to the annular member 14. Further, a ring gear 17 for an engine starter is fixed to the outer peripheral surface of the annular member 14. The first flywheel assembly 4 may be integrally formed.

Figure 5:
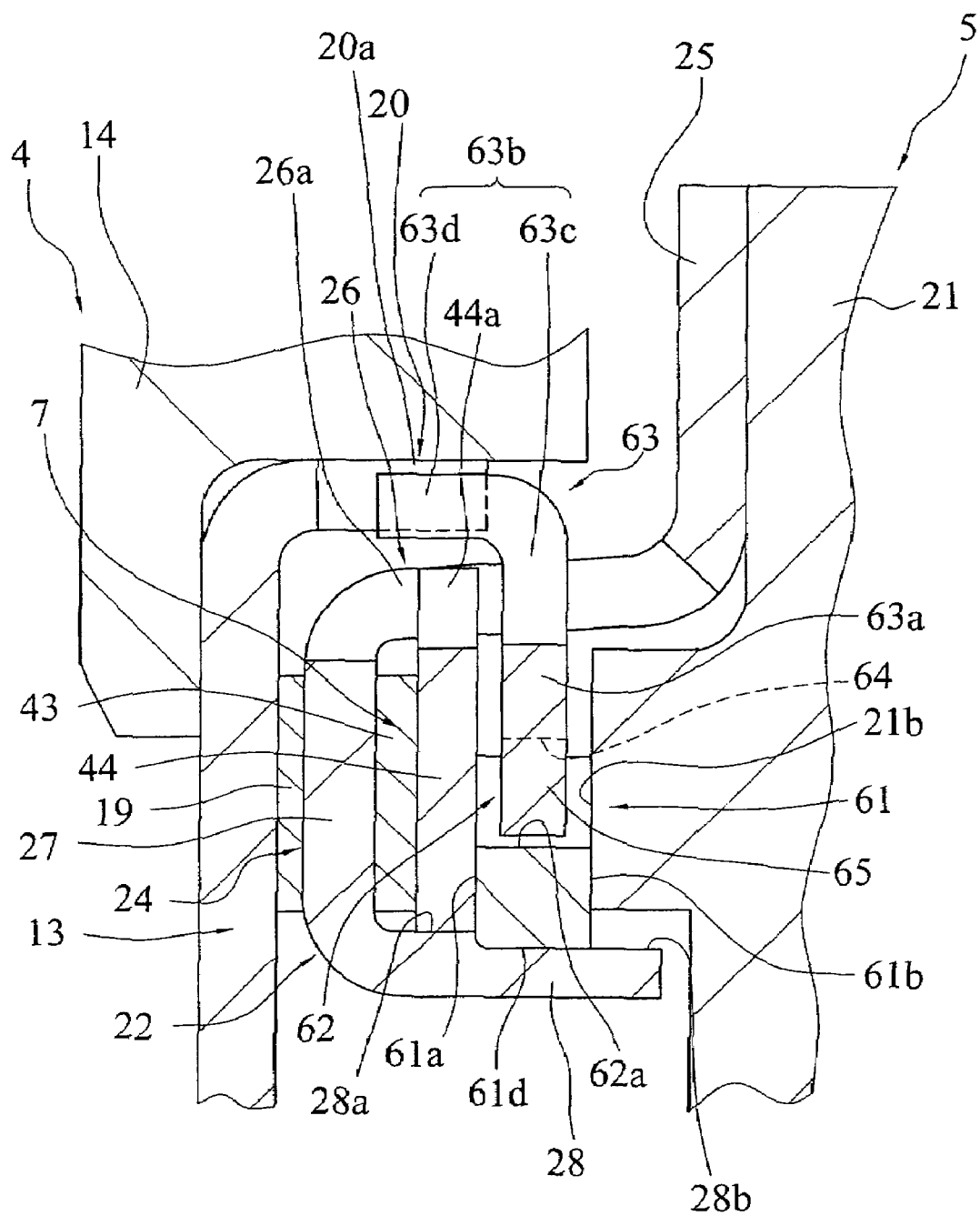
FIG. 5 is a fragmentary view showing, on an enlarged scale, a structure of the clutch device of FIG. 1, and particularly illustrating a frictional resistance generating mechanism thereof.

A structure of the radially outer portion of the disk-shaped member 13 will now be described in greater detail. As shown in FIG. 5, the radially outer portion of the disk-shaped member 13 has a flat form, having a friction member 19 fixed to its axial surface on the transmission side. The friction member 19 is formed of a plurality of arc-shaped members, and has an annular form as a whole. In a relative rotation suppressing mechanism 24, which will be described later, the friction member 19 functions as a member for damping shock, which is caused when the first and second flywheel assemblies 4 and 5 are coupled together. The friction member 19 also serves to stop rapidly the relative rotation in the coupling operation. The friction member 19 may be fixed to a disk-shaped plate 22, which will be described later.

The disk-shaped member 13 is provided with a cylindrical portion 20 at its outer periphery extending axially toward the transmission side as shown in FIG. 5. The cylindrical portion 20 is supported by the inner peripheral surface of the annular member 14, and is provided with a plurality of recesses 20a at its end. Each recess 20a has a predetermined angular length in the rotational direction. It can be deemed that each recess 20a is defined by axial projections on the cylindrical portion 20.

Second Flywheel Assembly

The second flywheel assembly 5 is primarily formed of a flywheel 21 with a friction surface, and the disk-shaped plate 22. The flywheel 21 with the friction surface has an annular and disk-shaped form, and is axially located on the transmission side with respect to the outer peripheral portion of the first flywheel assembly 4. The flywheel 21 with the friction surface is provided with a first friction surface 21a on its transmission side. The first friction surface 21a is an annular and flat surface, and can be connected to the clutch disk assembly 9, which will be described later. The flywheel 21 with the friction surface is further provided with a second friction surface 21b on its engine side in the axial direction. The second friction surface 21b is an annular and flat surface, and functions as a frictional sliding surface of a frictional resistance generating mechanism 7, which will be described later. As compared with the first friction surface 21a, the second friction surface 21b has a slightly smaller outer diameter and a significantly larger inner diameter. Accordingly, the second friction surface 21b has a larger effective radius than the first friction surface 21a. The second friction surface 21b is axially opposed to the friction member 19.

Description will now be given on the disk-shaped plate 22. As seen in FIG. 2, the disk-shaped plate 22 is disposed axially between the first flywheel assembly 4 and the flywheel 21 having the friction surface. The disk-shaped plate 22 has a radially outer portion fixed to a radially outer portion of the flywheel 21 having the friction surface by a plurality of rivets 23, and functions as a member rotational together with the flywheel 21 having the friction surface. More specifically, as seen in FIG. 5, the disk-shaped plate 22 is formed of a radially outer fixing portion 25, a radially outer cylindrical portion 26, a contact portion 27, and a radially inner cylindrical portion 28, which are aligned radially in this order. The radially outer fixed portion 25 is flat and is in axial contact with the surface on the engine side of the radially outer portion of the flywheel 21 having the friction surface. The radially outer fixing portion 25 is fixed to the radially outer portion of the flywheel 21 by the rivets 23 already described. The cylindrical portion 26 extends axially toward the engine from the inner periphery of the radially outer fixed portion 25. The cylindrical portion 26 is located radially inside the cylindrical portion 20 of the disk-shaped member 13. The cylindrical portion 26 is provided with a plurality of recesses 26a. Each recess 26a is formed corresponding to the recess 20a in the cylindrical portion 20 of the disk shaped member 13. The contact portion 27 has a circular and flat form, and corresponds to the friction member 19. The contact portion 27 is axially opposed to the second friction surface 21b of the flywheel 21 having the friction surface with a space therebetween. Various members of the frictional resistance generating mechanism 7 to be described later are arranged in this space. The frictional resistance generating mechanism 7 is disposed between the contact portion 27 of the disk-shaped plate 22 of the second flywheel assembly 5 and the flywheel 21 having the friction surface so that the required space of the structure can be small. The radially inner cylindrical portion 28 extends axially toward the transmission, and has an end neighboring the flywheel 21 having the friction surface. The radially inner cylindrical portion 28 is provided with an outer peripheral surface 28a at its base portion, which is larger in diameter than an outer peripheral surface 28b on its tip end portion, and a stepped portion is formed between these surfaces 28a and 28b.

As seen in FIGS. 1 and 2, the support plate 39 of the first flywheel assembly 4 is a member to support radially the second flywheel assembly 5 with respect to the first flywheel assembly 4. The support plate 39 is formed of a disk-shaped portion 39a and a cylindrical portion 39b extending axially from its inner periphery toward the transmission. The disk-shaped portion 39a is disposed axially between the end surface of the crankshaft 2 and the disk-shaped member 13. The disk-shaped portion 39a is provided with bolt insertion apertures 39c corresponding to the bolt insertion apertures 13a, respectively. Owing to the above structure, the support plate 39 is fixed to the crankshaft 2 by the bolts 15 together with the disk-shaped member 13 and an input disk-shaped plate 32.

An inner peripheral surface of the flywheel 21 with the friction surface is supported by the outer peripheral surface of the cylindrical portion 39b of the support plate 39 via a bushing 47. In this manner, the support plate 39 centers the flywheel 21 having the friction surface with respect to the first flywheel assembly 4 and the crankshaft 2.

Damper Mechanism

Figure 20:
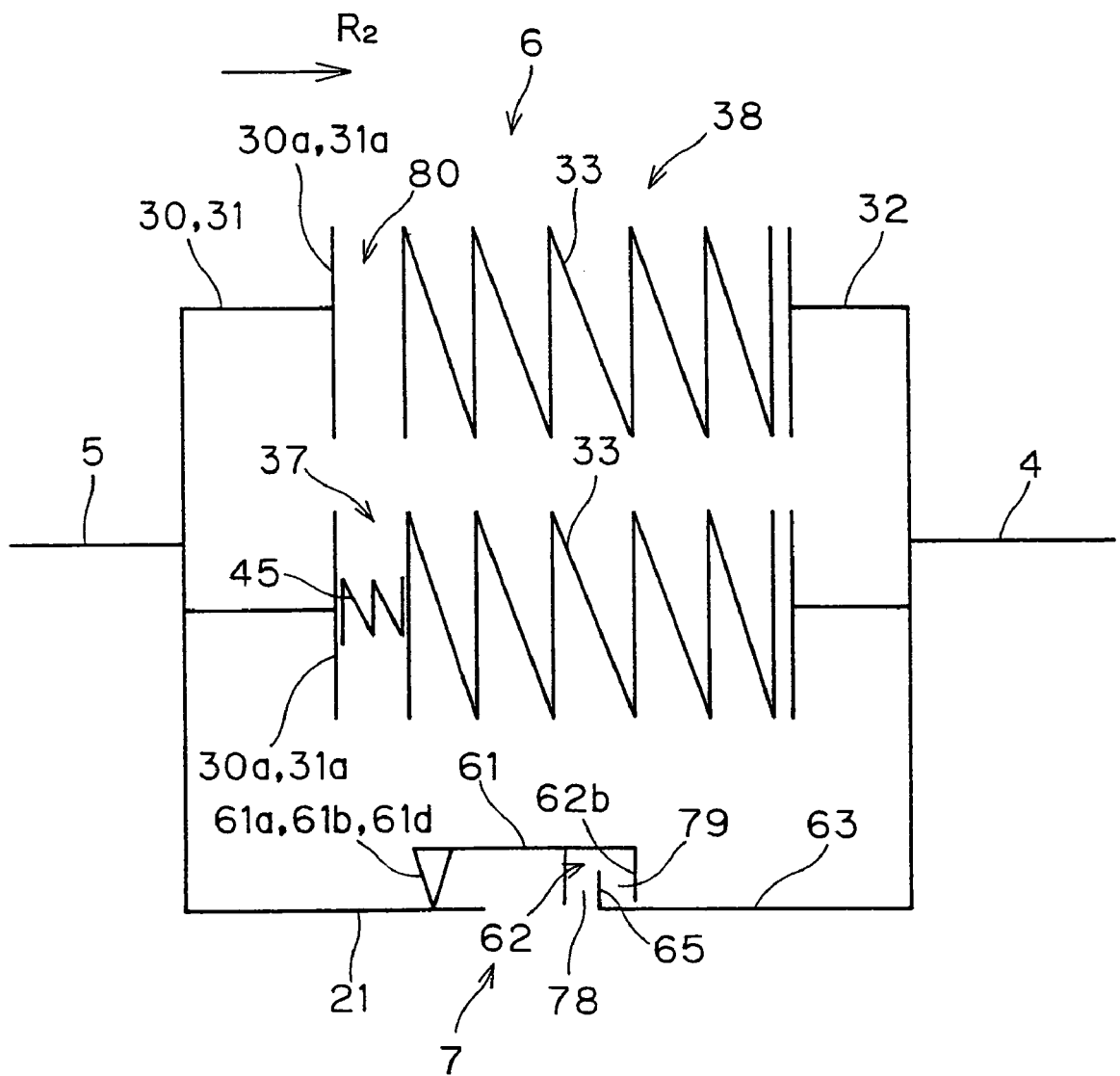
FIG. 20 is a view of a mechanical circuit diagram of the damper mechanism.

Description will now be given on the damper mechanism 6. The damper mechanism 6 is a mechanism to couple elastically the crankshaft 2 with the flywheel 21 having the friction surface in the rotational direction. The damper mechanism 6 is formed of a high-rigidity damper 38, which includes a plurality of coil springs 33, and the frictional resistance generating mechanism 7. The damper mechanism 6 further includes a low-rigidity damper 37 for exhibiting low-rigidity characteristics in a region of a small torsion angle. Further, as shown in FIG. 20, the low- and high-rigidity dampers 37 and 38 are disposed to operate in series in the rotational direction, and to operate in parallel with the frictional resistance generating mechanism 7 in the rotational direction in the torque transmission system.

Figure 9:
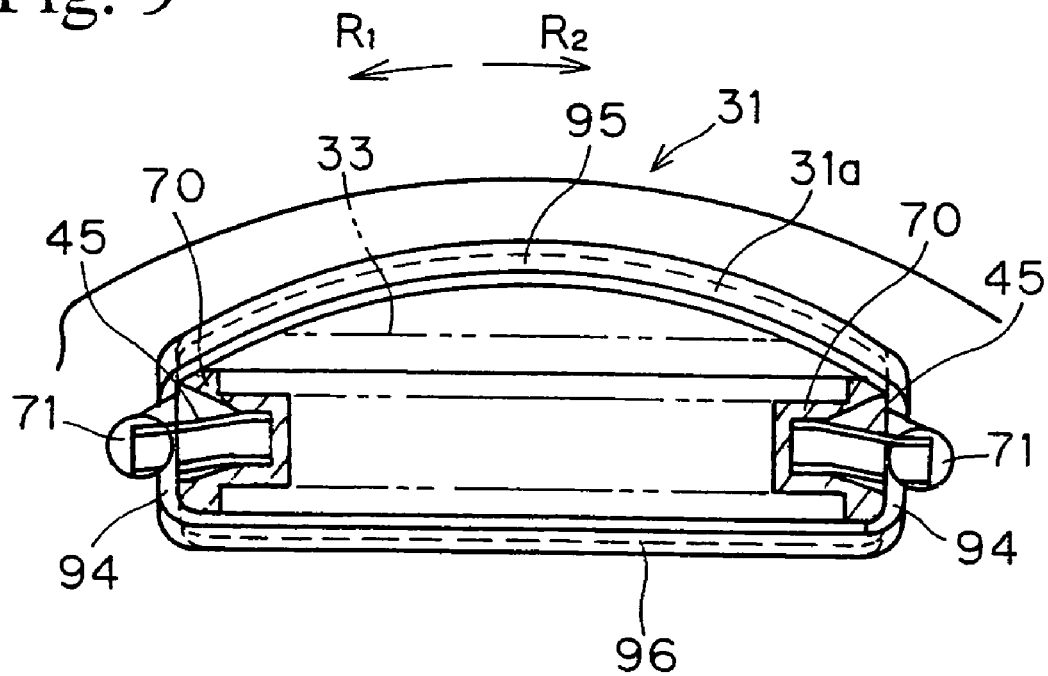
FIG. 9 is an elevational view of the damper mechanism in clutch and retaining plates of the clutch device.

Referring again to FIGS. 1 and 2, a pair of output disk-shaped plates (30 and 31) is formed of a first plate 30 axially arranged on the engine side and a second plate 31 axially arranged on the transmission side. These plates 30 and 31 have disk-shaped forms respectively, and are axially spaced by a predetermined distance from each other. Each of plates 30 and 31 is provided with a plurality of spaced windows 30a or 31a in the circumferential direction. The windows 30a and 31a are configured to support the coil springs 33, which will be described later, in the axial and rotational directions. Each window 30a and 31a has a cut and bent portion, which axially holds the coil spring 33 and is in contact with circumferentially opposite ends thereof. As shown in FIG. 9, each of the windows 30a and 31a is defined by a pair of end surfaces 94, which are located on the opposite ends in the rotational direction respectively, as well as a radially outer support portion 95 and a radially inner support portion 96. Each end surface 94 and the radially inner support portion 96 extend substantially straight in the radial direction and the tangential direction respectively. The radially outer support portion 95 extends along an arc in the rotational direction.

Figure 4:
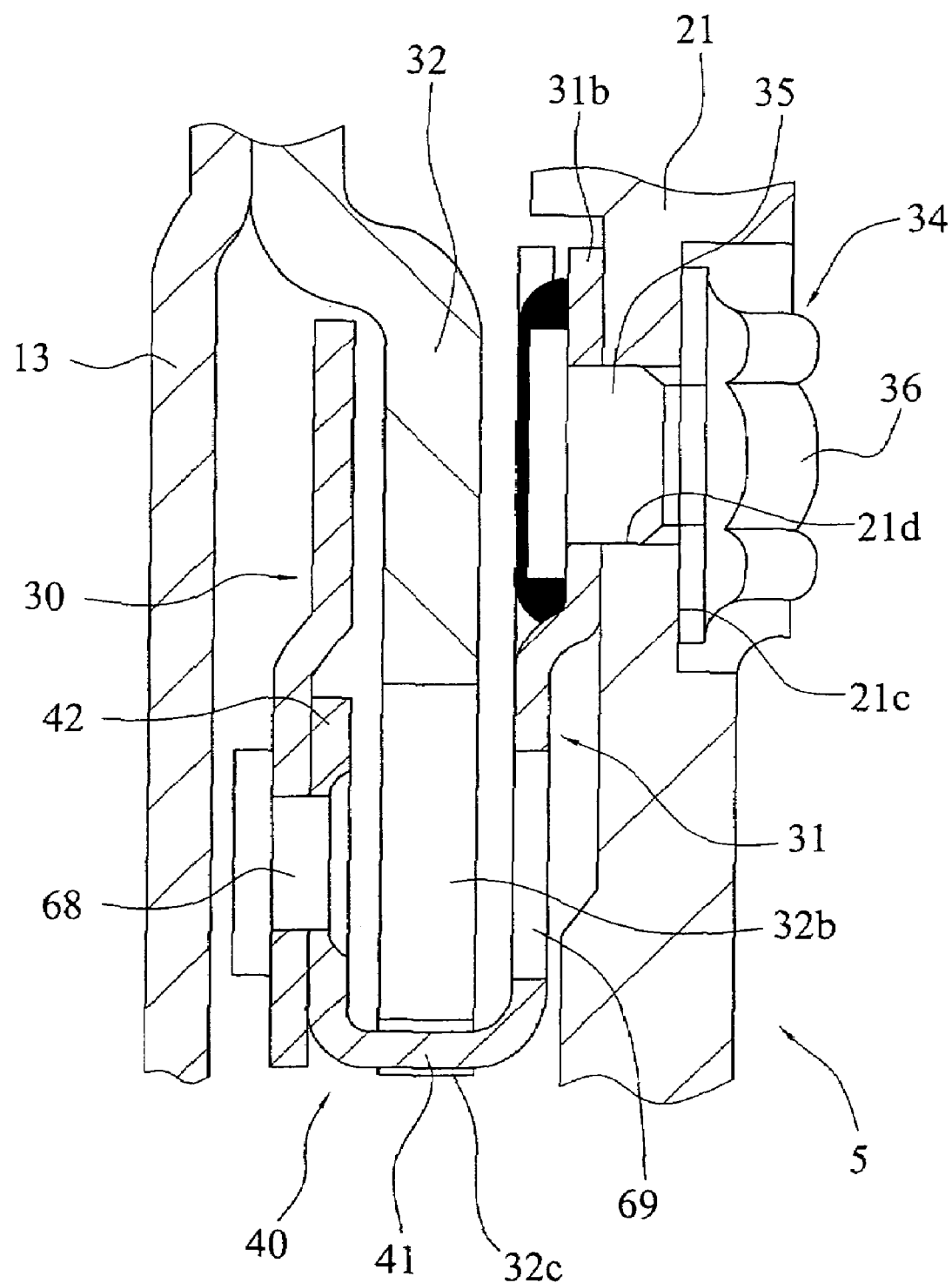
FIG. 4 is a fragmentary view showing, on an enlarged scale, a structure of the clutch device of FIG. 1, and particularly illustrating a plate coupling portion thereof.

A structure of the second plate 31 will now be described in greater detail with reference to FIGS. 1 and 2. A disk-shaped body of the second plate 31 is provided with four circumferentially spaced windows 31a, and is also provided with rivet apertures 69 for rivets 68, each of which is located between circumferentially neighboring windows 31a, as will be described later. As shown in FIGS. 3 and 4, the disk-shaped body of the second plate 31 is provided with a plurality of plate coupling portions 40 at its outer periphery extending axially toward the engine, i.e., toward the first plate 30. The plate coupling portion 40 is formed of an axially extending portion 41 and a fixed portion 42 extending radially inward from the end of the extending portion 41. The end of the extending portion 41 is substantially located radially outside or parallel to the first plate 30. The extending portion 41 has main surfaces directed radially inward and outward respectively, and thus has a radial width equal to the thickness of the plate 31. The fixed portion 42 is in contact with the side surface of the first plate 30 on the axial transmission side, and is fixed thereto by rivets 68. In this manner, the plates 30 and 31 are fixed together for rotation together, and an intended axial space is maintained therebetween.

Figure 8:
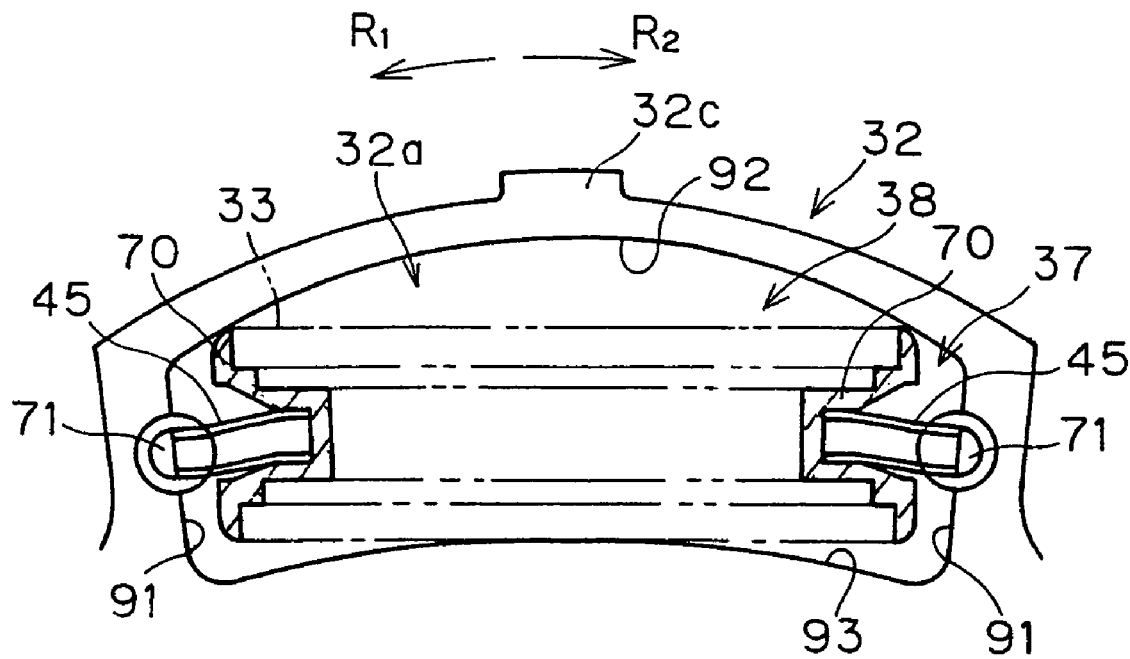
FIG. 8 is an elevational view of a damper mechanism in a hub flange of the clutch device.

The input disk-shaped plate 32 is a disk-shaped member, disposed between the plates 30 and 31. The input disk-shaped plate 32 has a plurality of window apertures 32a each extending in the circumferential direction, and the coil spring 33 and a small coil spring 45 are arranged within the window aperture 32a. As shown in FIG. 8, the window aperture 32a is formed of a pair of end surfaces 91, which are located on the opposite ends in the rotational direction, respectively, as well as a radially outer support portion 92 and a radially inner support portion 93. Each end surface 91 extends substantially straight in the radial direction. Each of the radially outer support portion 92 and the radially inner support portion 93 extends along an arc in the rotational direction. The input disk-shaped plate 32 is provided with recesses 32b, each of which is located circumferentially between the neighboring window apertures 32a to allow the rivet 68 to pass axially therethrough, as will be described later. As shown in FIGS. 3 and 4, the input disk-shaped plate 32 is provided with contact portions 32c, each of which is spaced in the rotational direction from the extending portion 41 but can come into contact with the extending portion 41. According to the above structure, the plate coupling portions 40 and the contact portions 32c form a stop mechanism in the damper mechanism 6 of this embodiment. However, the stop mechanism may be formed of portions other than the above.

Each coil spring 33 is formed of a combination of large and small springs. Each coil spring 33 is arranged within the corresponding window aperture 32a and windows 30a and 31a, and is supported at its opposite sides in the radial direction as well as at its opposite sides in the rotational direction. Each coil spring 33 is also supported at its opposite sides in the axial direction within the windows 30a and 31a.

Then, description will be given on a coupling structure 34 to couple the output disk-shaped plates 30 and 31 with the flywheel 21 having the friction surface. The coupling structure 34 is formed of bolts 35 and nuts 36. The second plate 31 is provided with a plurality of fixed portions 31b at its inner periphery, which are partially cut and shifted axially toward the transmission, as shown in FIGS. 3 and 4. A disk-shaped body of the second plate 31 is slightly spaced from the surface on the axially engine side of the flywheel 21 having the friction surface, however the fixed portions 31b are in contact with the surface on the axially engine side of the flywheel 21 having the friction surface. The bolt 35 projecting axially toward the transmission is welded to each fixed portion 31b. The flywheel 21 with the friction surface is provided with concavities 21c and apertures 21d at positions corresponding to the fixed portions 31b and the bolts 35. The concavities 21c are formed at the surface on the axially transmission side of the flywheel 21 with the friction surface, and the apertures 21d coaxially extend through bottom walls of the concavities 21c respectively. The foregoing bolt 35 is axially inserted into the aperture 21d from the axially engine side. The nut 36 is axially located on the transmission side against the concavity 21c and aperture 21d, and is engaged with the bolt 35. An end surface of the nut 36 is seated on the bottom surface of the concavity 21c.

(1-4-2) Low-Rigidity Damper

The low-rigidity damper 37 is primarily formed of the small coil springs 45. The small coil spring 45 is much smaller in free length, wire diameter, and coil diameter than the coil spring 33, and has an extremely small rigidity. As shown in FIG. 3, the small coil springs 45 are arranged in two of the four window apertures 32a, and particularly in the diametrally opposed two window apertures 32a (i.e., upper and lower window apertures 32a in FIG. 3). In each window aperture 32a, the small coil springs 45 are arranged on the opposite sides, in the rotational direction, of the coil spring 33. Edges of the window apertures 32a and windows 30a and 31a support an outer end of each small coil spring 45 in the rotational direction. Therefore, the small coil spring 45 operates in series with respect to the coil spring 33. In each of the diametrally opposed two windows apertures 32a, which are located on the right and left sides in FIG. 3, among the four window apertures 32a, a space 79 of a predetermined angle is maintained in the rotational direction between each end of the coil spring 33 and the neighboring end of the window aperture 32a.

Description will now be given in greater detail. As shown in FIGS. 8 and 9, a first spring seat 70 is disposed between each small coil spring 45 and the corresponding coil spring 33. As shown more specifically in FIGS. 14 to 17, the first spring seat 70 is formed of a support portion 81 having a disk-shaped form, a first projection 82, and a second projection 83. The support portion 81 has an annular first support surface 81a, which comes into contact with the end surface of a large spring 33a of the coil spring 33 in the rotational direction. The first projection 82 projects from the first support surface 81a, and has an annular second support surface 82a, which contacts with the rotational end surface of a small spring 33b of the coil spring 33 and a first outer peripheral surface 82b, which contacts with an inner peripheral surface of the large spring 33a. The second projection 83 projects from the second support surface 82a of the first projection 82 and has a flat end surface 83a and a second outer peripheral surface 83b which contacts with the inner peripheral surface of the small spring 33b. The support portion 81 also has a second support surface 81b on the side opposite to the first support surface 81a. The second support surface 81b is spaced in the rotational direction from the end surface 91 of the window aperture 32a in the input disk-shaped plate 32 as shown in FIG. 8, however it is in contact with or close to the end surfaces 94 of the windows 30a and 31a in the first and second plates 30 and 31.

Figure 16:
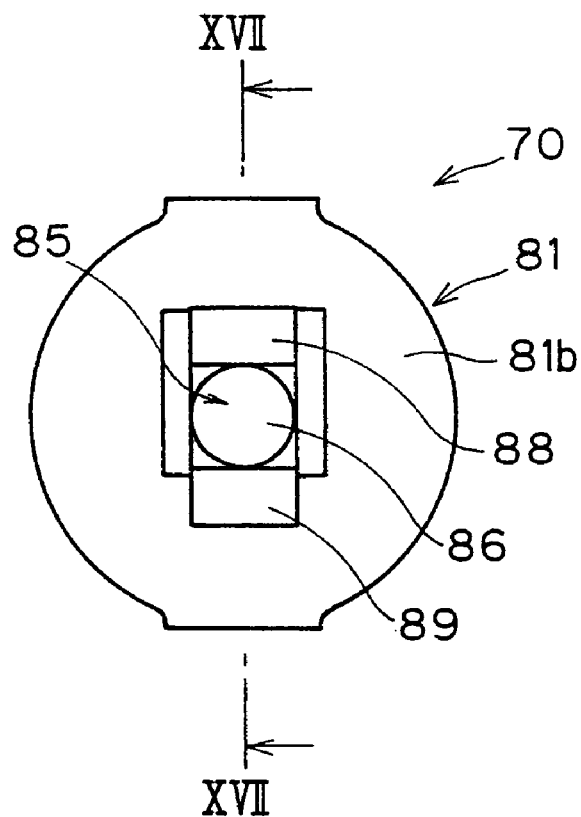
FIG. 16 is a rear view of the first spring seat viewed in a direction of an arrow XVI in FIG. 15.
Figure 17:
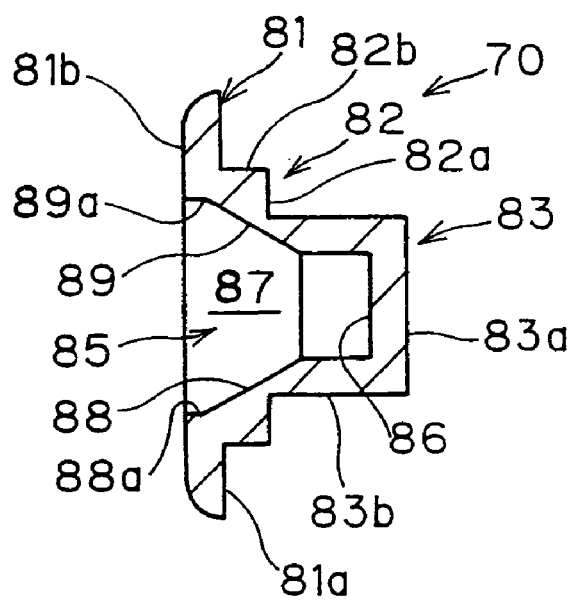
FIG. 17 is a cross-sectional view of the first spring seat taken along line XVII—XVII in FIG. 16.
Figure 22:
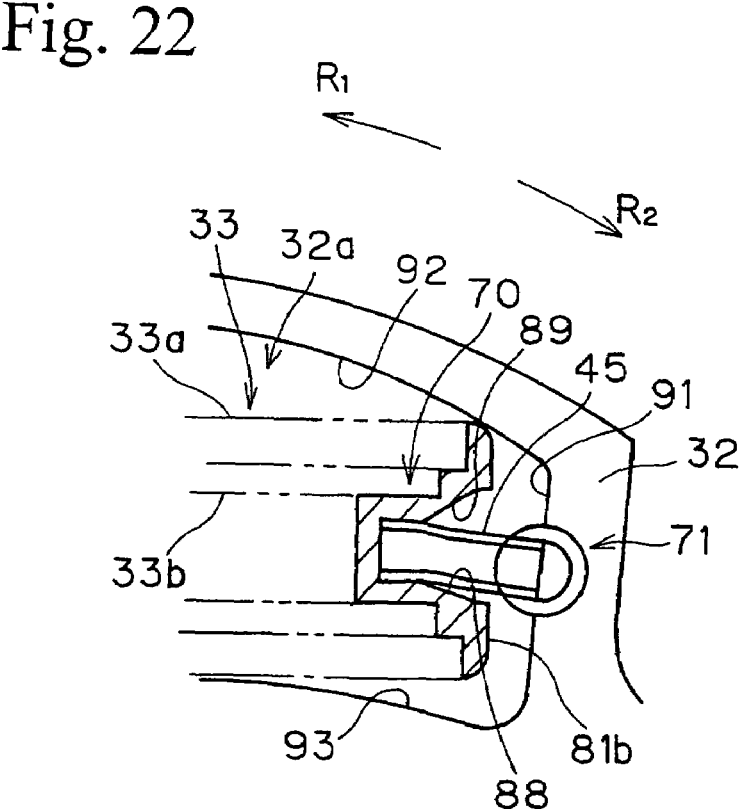
FIG. 22 is a fragmentary cross-sectional view illustrating an operation of a small coil spring of the damper mechanism.

As seen in FIG. 17, the first spring seat 70 further has a concavity 85, which is formed at its end surface remote from the first and second projections 82 and 83 for inserting the small coil spring 45 therein. As shown in FIGS. 16 and 17, the concavity 85 is primarily formed of first and second portions 86 and 87. The first portion 86 of the concavity 85 has a circular caved form when viewed in the rotational direction and is formed in a portion corresponding to the second projection 83. The second portion 87 of the concavity 85 forms an external opening portion extending to the first portion 86, and has surfaces 88 and 89 which extend from the first portion 86 and diverge toward the external opening. Straight surfaces 88a and 89a are ensured between the opening and the respective surfaces 88 and 89. An end of the small coil spring 45 is disposed within the concavity 85 of the first spring seat 70 as shown in FIG. 22 and an end portion thereof is inserted into the first portion 86 of the concavity 85. The end of the first spring seat 70 is in contact with the bottom surface of the first portion 86 of the concavity 85 allow torque transmission. The outer peripheral surface of the end portion of the first spring seat 70 is fitted into the first portion of the concavity 85, and is in contact with or close to the peripheral surface thereof. In the state described above, a small radial space is maintained between the small coil spring 45 and the radial surface 88 on the radially inner side, and a large radial space is maintained between the small coil spring 45 and the radial surface 89 on the radially outer side as shown in FIG. 22.

Figure 12:
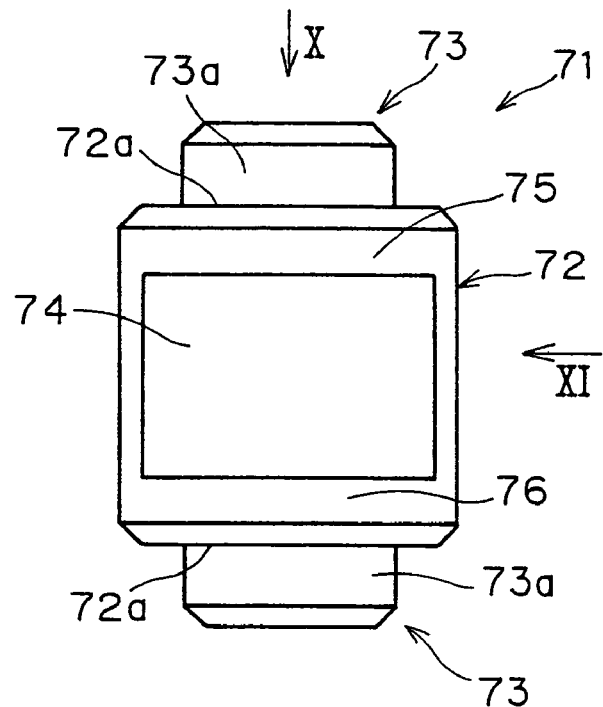
FIG. 12 is a plan view of the second spring seat viewed in a direction of arrow XII in FIG. 10.
Figure 13:
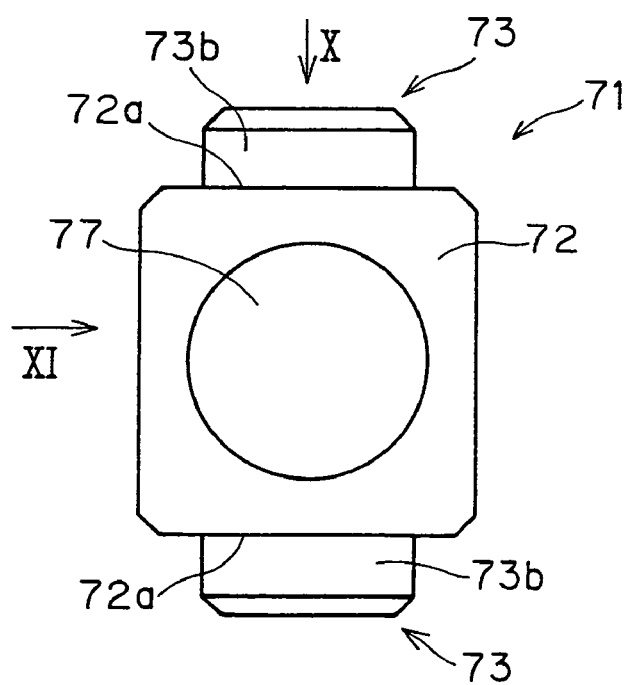
FIG. 13 is a rear view of the second spring seat viewed in a direction of arrow XIII in FIG. 10.
Figure 14:
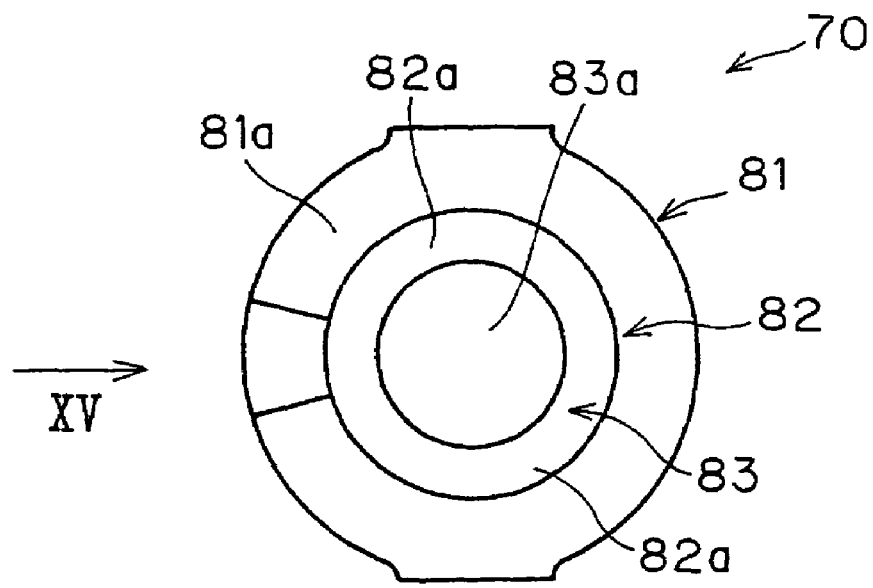
FIG. 14 is an elevational view of a first spring seat of the damper mechanism.
Figure 18:
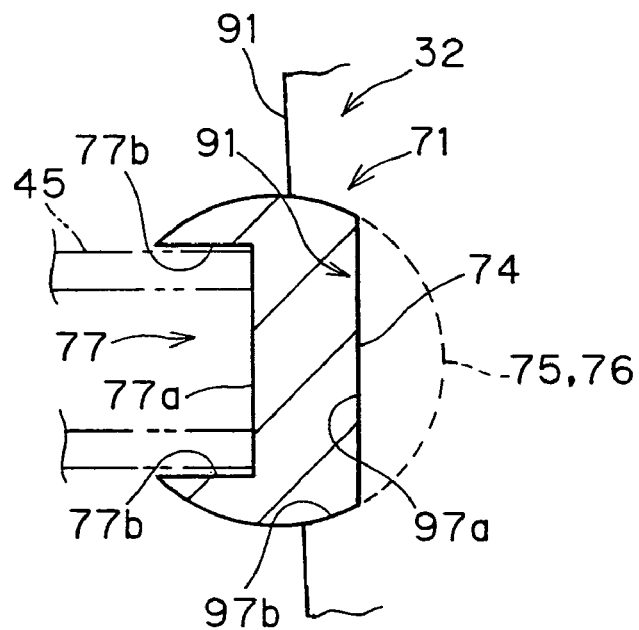
FIG. 18 is a fragmentary cross-sectional view illustrating the engagement between the second spring seat and the hub flange.

As shown in FIGS. 10 to 13, a second spring seat 71 is formed of a body 72 and a pair of engagement projections 73 and 74. The body 72 substantially has a columnar form extending in the axial direction. As shown in FIGS. 12 and 13, the body 72 has a first concavity 77 on a side surface of the small coil spring 45, and also has a second concavity 74 on the opposite surface. The second concavity 74 further has a recessed form opened in the tangentially opposite directions. The second concavity 74 has a first surface 74a directed in the rotational direction as well as second and third surfaces 74b and 74c directed in the axial direction. In other words, a pair of upper and lower radial projections 75 and 76 form the second concavity 74. As shown in FIG. 18, the window aperture 32a in the input disk-shaped plate 32 is further provided with a hollow 97, which is formed at each end surface 91 (i.e., surface directed substantially in the rotational direction) of the window aperture 32a and is hollowed substantially in the rotational direction. The hollow 97 has a first linear surface 97a directed in the rotational direction as well as second surfaces 97b located on the opposite sides of the first surface 97a. As shown in FIG. 18, the second spring seat 71 is removable in the rotational direction from the end surface 91, but is radially and axially unmovable when it is in the engaged state. More specifically, the first surface 97a of the hollow 97 is in contact with the first surface 74a of the second concavity 74 of the second spring seat 71 so that a torque can be transmitted from the second spring seat 71 to the end surface 91. Additionally, a portion near the first surface 97a is located axially between the projections 75 and 76 so that the second spring seat 71 cannot axially be spaced from the input disk-shaped plate 32. Further, the outer peripheral surface of the body 72 of the second spring seat 71 is in contact with the second surface 97b. Therefore, the second spring seat 71 cannot be spaced radially from the input disk-shaped plate 22.

Figure 10:
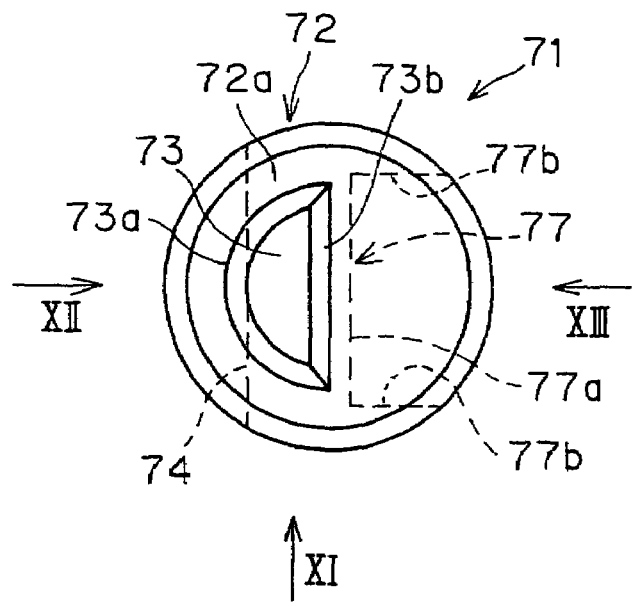
FIG. 10 is an elevational view of a second spring seat of the damper mechanism.
Figure 11:
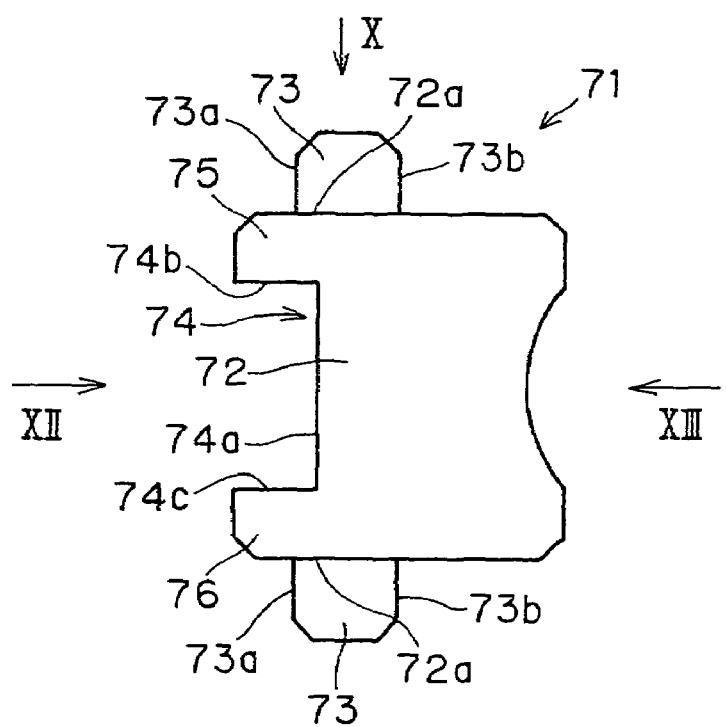
FIG. 11 is a side view of the second spring seat viewed in a direction of arrow XI in FIG. 10.
Figure 15:
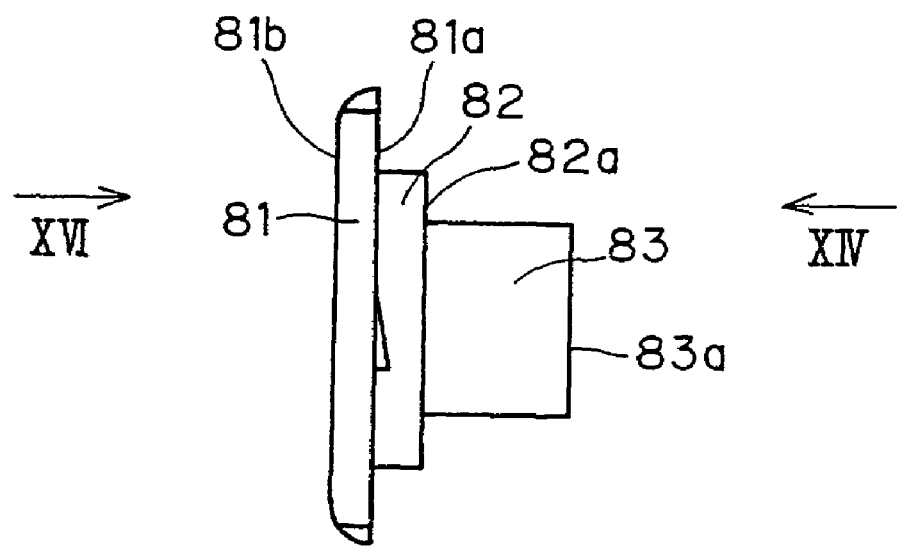
FIG. 15 is a side view of the first spring seat viewed in a direction of an arrow XV in FIG. 14.

As shown in FIGS. 10 and 15, the first concavity 77 is a circular form when viewed in the radial direction and has a bottom surface 77a and a peripheral surface 77b. As shown in FIG. 18, an end of the small coil spring 45 is fitted into the first concavity 77. An end surface, which is substantially directed in the rotational direction, of one end of the small coil spring 45 is in contact with the bottom surface 77a of the first concavity 77 to enable a transmission of torque. An outer peripheral surface of the end of the small coil spring 45 is in contact with or close to the peripheral surface 77b of the first concavity 77, and thus is engaged therewith so that disengagement thereof from the second spring seat 71 is prevented.

Figure 19:
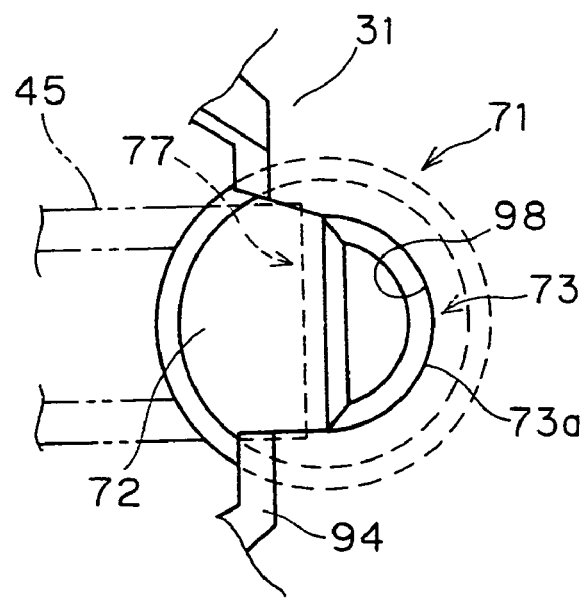
FIG. 19 is a fragmentary cross-sectional view illustrating engagement of the second spring seat with the clutch and retaining plates.

As shown in FIG. 19, the end surfaces 94, which are directed in the rotational direction, of the windows 30a and 31a in the first and second plates 30 and 31 are further provided with hollows 98, which are followed in the rotational direction. The hollow 98 has a semicircular form. As shown in FIG. 19, the second spring seat 71 is removable from the end surface 94 in the rotational direction, but is radially and axially unmovable in the engaged state. More specifically, the surfaces 73a of first and second projections 73 are engaged with the hollow 98 in the rotational direction. Therefore, the second spring seat 71 can transmit a torque to the end surface 94, and the second spring seat 71 is not radially spaced from the first and second plates 30 and 31. Further, portions near the hollow 98 are located close to the surfaces 72a on the axially opposite sides of the body 72 respectively so that the second spring seat 71 is not axially spaced from first and second plates 30 and 31.

As shown in FIG. 3, in the structure already described, since the low-rigidity damper 37 is located between the coil springs 33 neighboring to each other in the rotational direction, it is possible to prevent an unnecessary increase in diameter of the damper mechanism 6. In particular, the small coil spring 45 is located within an annular region defined between the outermost and innermost peripheries of the coil spring 33 when viewed in the axial direction. Therefore, diameter of the damper mechanism does not increase beyond necessary length.

Further, the small coil springs 45 are disposed close to the opposite ends, of the coil spring 33 in the rotational direction and more specifically are arranged within the window aperture 32a and others so that the sizes and required space of the whole damper mechanism 6 can be reduced.

(1-4-3) Frictional Resistance Generating Mechanism

Figure 6:
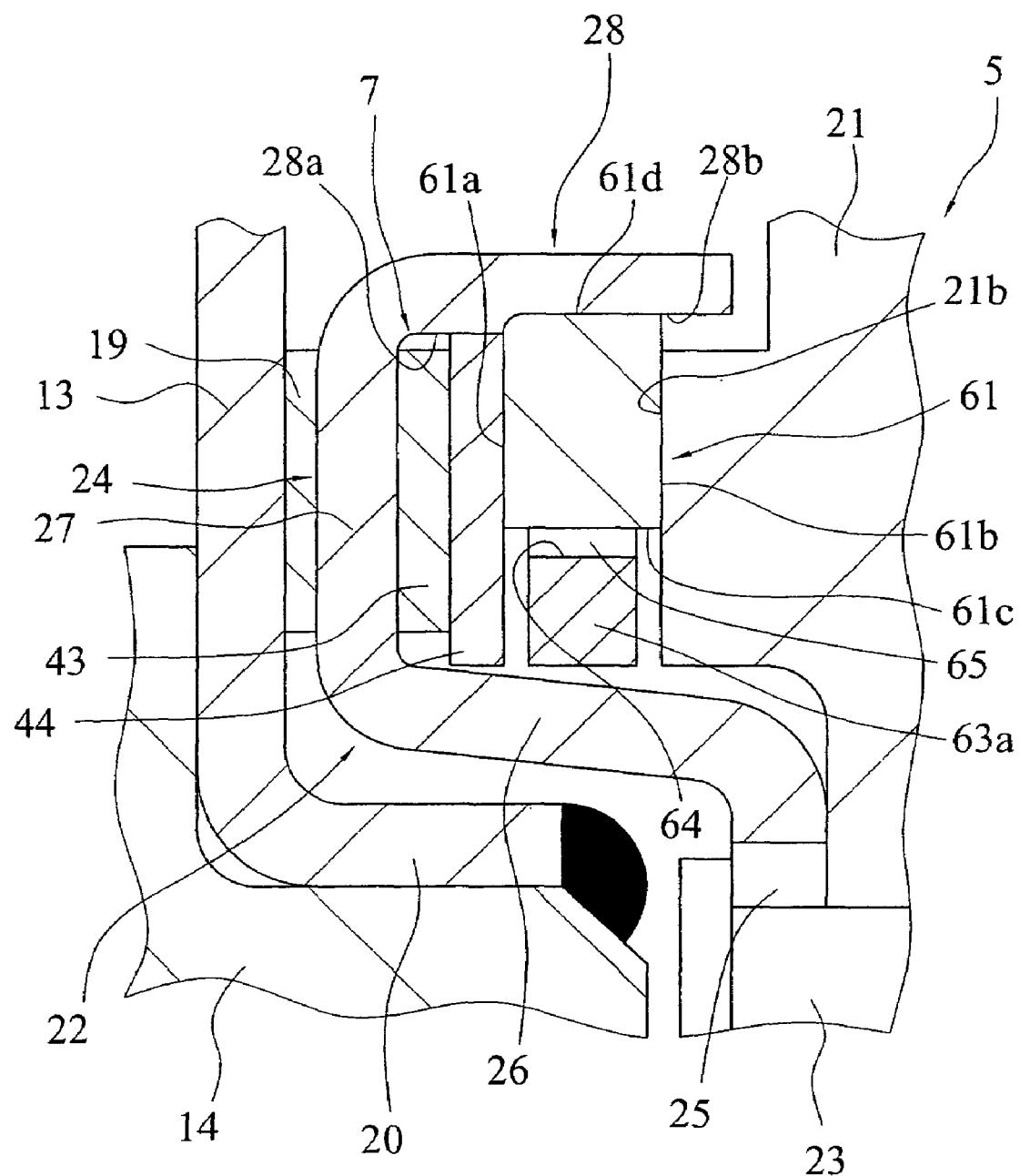
FIG. 6 is a fragmentary view showing, on an enlarged scale, a structure of the clutch device of FIG. 2, and particularly illustrating an alternate view of the frictional resistance generating mechanism.

As seen in FIGS. 1 and 2, the frictional resistance generating mechanism 7 functions between the crankshaft 2 and the flywheel 21 with the friction surface in parallel with the coil springs 33 in the rotational direction and generates a predetermined frictional resistance (hysteresis torque) when the crankshaft 2 rotates relatively to the flywheel 21 with the friction surface. As shown in FIG. 5, the frictional resistance generating mechanism 7 is formed of a plurality of washers, which are disposed between the second friction surface 21b of the flywheel 21 having the friction surface and the contact portion 27 of the disk-shaped plate 22 and are in contact with each other. As shown in FIGS. 5 and 6, the frictional resistance generating mechanism 7 has a cone spring 43 located near the contact portion 27, an output friction plate 44, an input friction plate 63, and a friction washer unit 61 located at positions successively shifted toward the flywheel 21 respectively. As described above, the disk-shaped plate 22 has the function of holding the frictional resistance generating mechanism 7 on the side of the flywheel 21 with the friction surface. Therefore, it is possible to reduce the number of parts and thus the structure can be simplified.

The cone spring 43 is provided to apply a load to each friction surface in the axial direction and is compressed between the contact portion 27 and the output friction plate 44 so that it applies an axial constant biasing force to these members. The output friction plate 44 is provided with claws 44a at its outer periphery, which are engaged with the recesses 26a in the disk-shaped plate 22, so that the output friction plate 44 is unrotatable relatively but is axially movable with respect to the disk-shaped plate 22 and the flywheel 21 having the friction surface. The output friction plate 44 has an inner peripheral surface, which is in contact with the outer peripheral surface 28a of the base portion of the cylindrical portion 28 formed at the inner periphery of the disk-shaped plate 22, and thereby is radially positioned.

Figure 7:
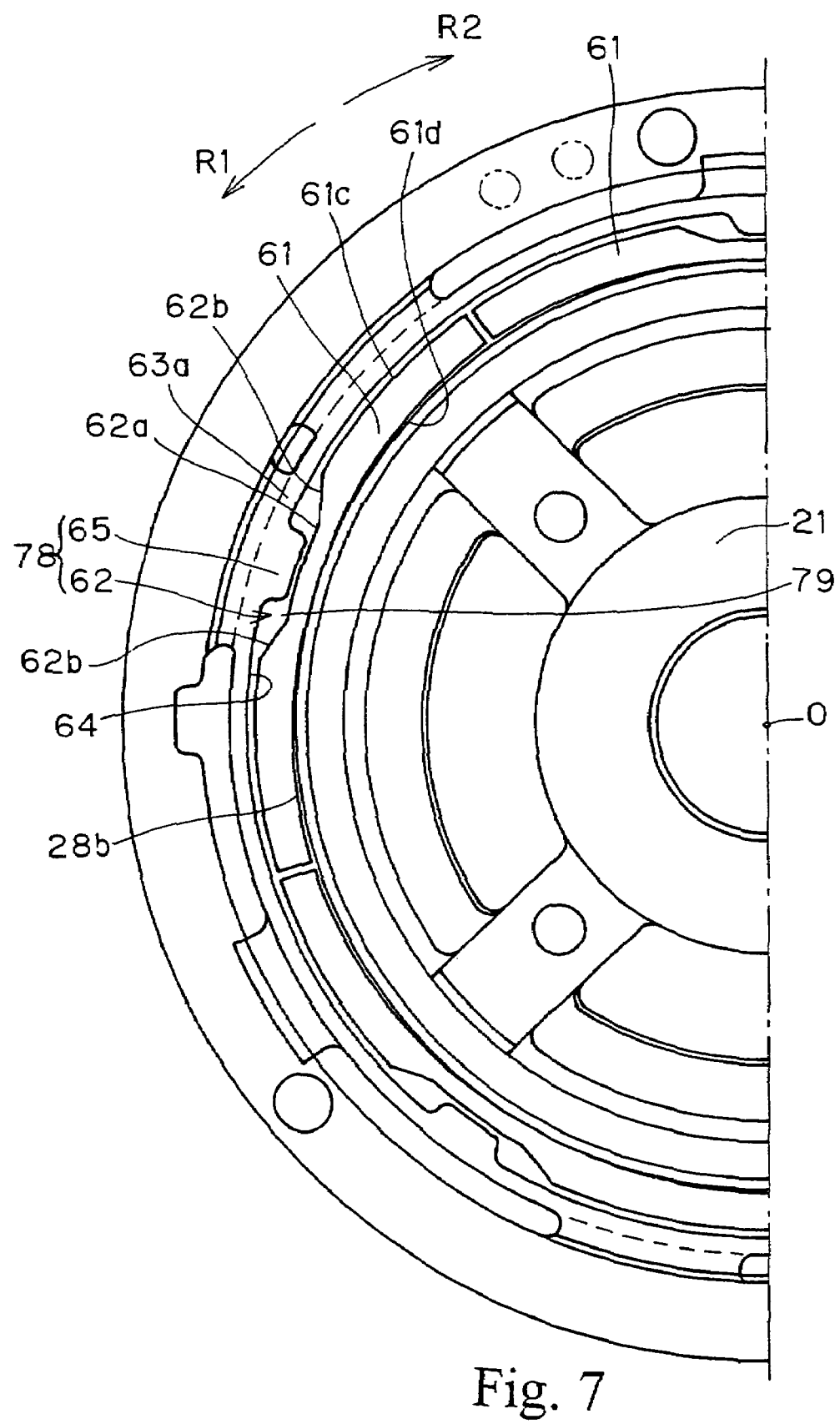
FIG. 7 is a rear elevational view of the flywheel damper, illustrating the frictional resistance generating mechanism.
Figure 24:
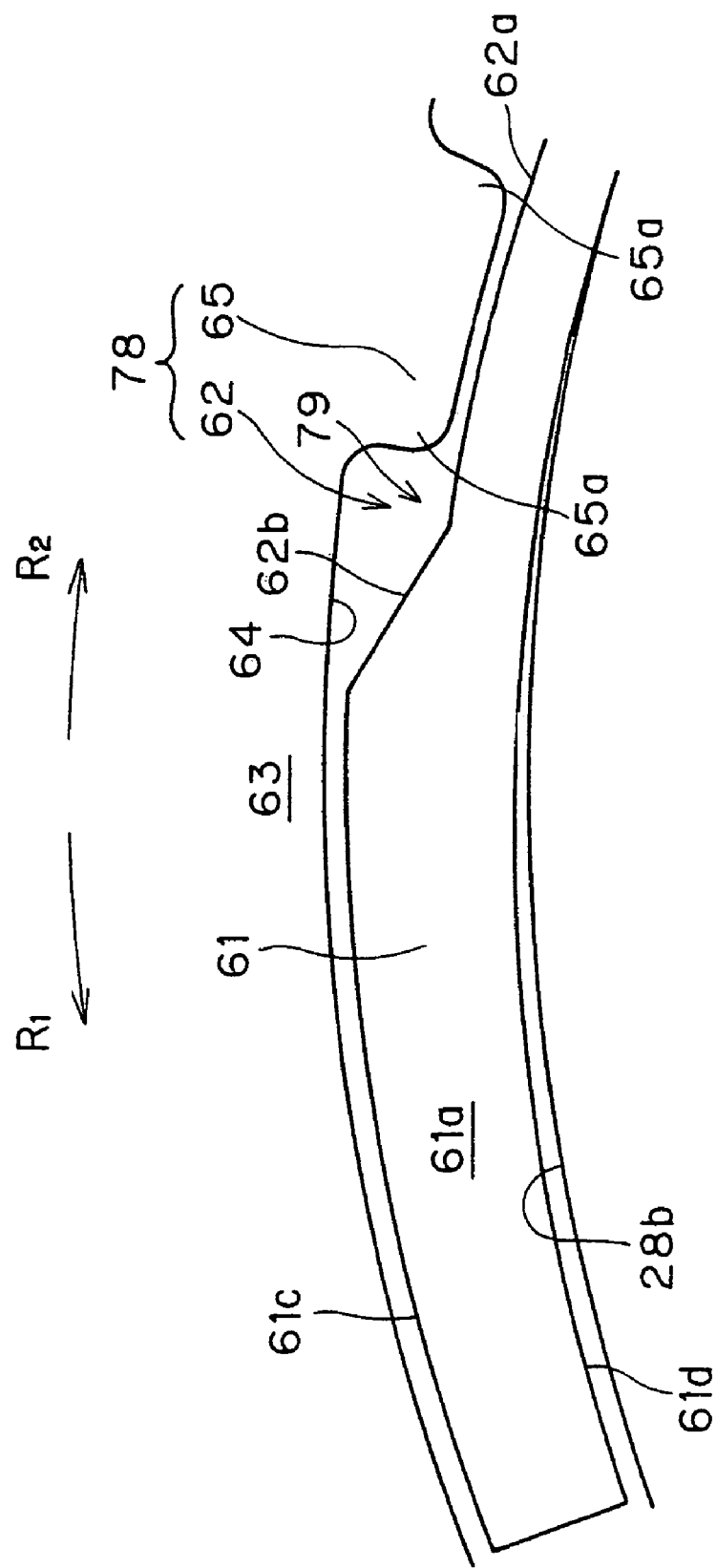
FIG. 24 is a fragmentary elevational view illustrating an operation of the frictional resistance generating mechanism.

The friction washers 61 are formed of a plurality of arc-shaped members aligned in the rotational direction as shown in FIG. 7. As seen in FIG. 6, each friction washer 61 is held between the output friction plate 44 and the second friction surface 21b of the flywheel 21 having the friction surface. Thus, a radial surface 61a on the engine side of the friction washer 61 is in slidable contact with the output friction plate 44 and a radial surface 61b on the transmission side of the friction washer 61 is in slidable contact with the second friction surface 21b of the flywheel 21 having the friction surface. As shown in FIG. 24, the friction washer 61 is provided with a concavity 62 at its outer peripheral surface 61c. The concavity 62 is formed at a circumferentially middle portion of the friction washer 61 and has a bottom surface 62a extending in the rotational direction (i.e., circumferential direction) as well as inclined surfaces 62b, which extend obliquely and radially outward from the opposite ends of the bottom surface 62a. The inclined portions 62b on the opposite ends of each concavity 62 diverge radially outward to increase the circumferential distance between them. An inner peripheral surface 61d of the friction washer 61 has a circumferentially middle portion, which is close to the outer peripheral surface 28b of the free end portion of the radially inner cylindrical portion 28 and a space between the inner peripheral surface 61d and the outer peripheral surface 28b gradually increases as the position moves to the circumferential end of the inner peripheral surface 61d. Thus, the friction washer 61 is swingable around its circumferentially middle portion with respect to the cylindrical portion 28.

As shown in FIG. 7, the input friction plate 63 has a disk-shaped portion 63a disposed radially outside the friction washer 61. As seen in FIG. 5, the input friction plate 63 is provided with a plurality of projections 63b at its outer periphery.

Referring to FIGS. 5 and 6, the projections 63b are formed corresponding to the recesses 26a respectively and each have a projected portion 63c extending radially outward and a claw 63d extending axially toward the engine from the end of the projected portion 63c. The projected portion 63c extends radially through the recess 26a. The claw 63d is located radially outside the cylindrical portion 26, and extends through the recess 20a in the cylindrical portion 20 of the disk-shaped member 13 from the axially transmission side. The claw 63d has a circumferential width (i.e., width in the rotational direction) equal to that of the recess 20a, therefore is circumferentially unmovable in the recess 20a.

As seen in FIG. 7, the disk-shaped portion 63a of the input friction plate 63 has an inner peripheral surface 64 which is opposed to the outer peripheral surface 61c of the friction washer 61 with a slight space therebetween, and a plurality of convexities 65 extending radially inward from the inner peripheral surface 64 into the concavities 62, respectively. The convexities 65 and the concavities 62 form an engagement portion 78 in the frictional resistance generating mechanism 7. The engagement portion 78 will now be described in greater detail. As shown in FIG. 24, the convexity 65 has a substantially square form and has round corners 65a. The convexity 65 is close to the bottom surface 62a of the concavity 62, and the space 79 of a predetermined angle, e.g., of 4 degrees is preferably maintained in the rotational direction between each corner 65a and the neighboring inclined surface 62b. A total of these torsion angles on the opposite sides is equal to an allowed maximum angle of relative rotation between the friction washer 61 and the input friction plate 63. In this embodiment, the above total torsion angle is equal to 8 degrees (see FIG. 21) and is preferably equal to or slightly larger than a damper operation angle which occurs from depends on minute torsional vibrations caused by variations in combustion of the engine.

As described above, friction washer 61 is frictionally engaged with the members on the output side, i.e., the flywheel 21 with the friction surface and the output friction plate 44, and is also engaged with the member on the input side, i.e., the input friction plate 63 via the rotating-direction space 79 of the engagement portion 78 for allowing torque transmission.

In the above structure, since the second friction surface 21b of the flywheel 21 with the friction surface forms the friction surface of the frictional resistance generating mechanism 7, the number of parts is reduced and the structure becomes simpler.

Clutch Cover Assembly

Referring again to FIGS. 1 and 2, the clutch cover assembly 8 is a mechanism that biases a friction facing 54 of the clutch disk assembly 9 to the first frictional surface 21a of the flywheel 21 having the friction surface by an elastic force. The clutch cover assembly 8 is primarily formed of a clutch cover 48, a pressure plate 49, and a diaphragm spring 50.

The clutch cover 48 is a disk-shaped member prepared by press working and has a radially outer portion fixed to the radially outer portion of the flywheel 21 with the friction surface by bolts 51.

The pressure plate 49, which is made of, e.g., cast iron, is disposed radially inside the clutch cover 48, and is axially located on the transmission side with respect to the flywheel 21 having the friction surface. The pressure plate 49 has a pressing surface 49a opposed to the first friction surface 21a of the flywheel 21 having the friction surface. The pressure plate 49 is provided with a plurality of arc-shaped projected portions 49b projecting toward the transmission at the surface opposite to the pressing surface 49a. The pressure plate 49 is coupled unrotatably and axially movably to the clutch cover 48 by a plurality of arc-shaped strap plates 53. In the clutch engaged state, the strap plates 53 apply a load to the pressure plate 49 for biasing the pressure plate 49 away from the flywheel 21 having the friction surface.

The diaphragm spring 50 is a disk-shaped member disposed between the pressure plate 49 and the clutch cover 48, and is formed of an annular elastic portion 50a and a plurality of lever portions 50b extending radially inward from the elastic portion 50a. The radially outer portion of the elastic portion 50a is in axial contact with the end of each projected portion 49b of the pressure plate 49 on the transmission side.

The clutch cover 48 is provided with a plurality of tabs 48a at its inner periphery, which extend axially toward the engine and are bent radially outward. Each tab 48a extends through an aperture in the diaphragm spring 50 toward the pressure plate 49. The tabs 48a support two wire rings 52, which support axially opposite sides of the radially inner portion of the elastic portion 50a of the diaphragm spring 50. In this state, the elastic portion 50a is axially compressed to apply an axial force to the pressure plate 49 and the clutch cover 48.

Clutch Disk Assembly

The clutch disk assembly 9 has the friction facing 54 disposed between the first friction surface 21a of the flywheel 21 having the friction surface and the pressing surface 49a of the pressure plate 49. The friction facing 54 is fixed to a hub 56 via a circular and annular plate 55. The hub 56 has a central aperture spline-engaged with the transmission input shaft 3.

Release Device

The release device 10 is a mechanism provided to drive the diaphragm spring 50 of the clutch cover assembly 8 to perform the clutch releasing operation on the clutch disk assembly 9. The release device 10 is primarily formed of a release bearing 58 and a hydraulic cylinder device (not shown). The release bearing 58 is primarily formed of inner and outer races as well as a plurality of rolling elements arranged therebetween and can bear radial and thrust loads. A cylindrical retainer 59 is attached to the outer race of the release bearing 58. The retainer 59 has a cylindrical portion a first flange, and a second flange. The cylindrical portion contacts the outer peripheral surface of the outer race. The first flange extends radially inward from an axial end on the engine side of the cylindrical portion and is in contact with the surface on the transmission side of the outer race in the axial direction. The second flange extends radially outward from an end on the engine side of the cylindrical portion in the axial direction. The second flange is provided with an annular support portion, which is in axial contact with a portion on the engine side of the radially inner end of each lever portion 50b of the diaphragm spring 50.

A hydraulic cylinder device is primarily formed of a hydraulic chamber forming member and a piston 60. The hydraulic chamber forming member and the cylindrical piston 60 arranged radially inside the member define a hydraulic chamber between them. The hydraulic chamber can be supplied with a hydraulic pressure from a hydraulic circuit. The piston 60 has a substantially cylindrical form and has a flange which is in axial contact with a portion on the transmission side of the inner race of the release bearing 58. When the hydraulic circuit supplies a hydraulic fluid into the hydraulic chamber, the piston 60 axially moves the release bearing 58 toward the engine.

Coupling between First and Second Flywheel Assemblies

As already described, each of the first and second flywheel assemblies 4 and 5 is independent of each other and is axially and removably attached. More specifically, the first and second flywheel assemblies 4 and 5 are engaged together owing to engagement between the cylindrical portion 20 and the input friction plate 63, between the disk-shaped member 13 and the contact portion 27 (relative rotation suppressing mechanism 24), between the second plate 31 and the flywheel 21 with the friction surface (coupling structure 34), and between the support plate 39 and the flywheel 21 with the friction surface (bushing 47), which are located at positions shifted successively and radially inward in this order. These assemblies 4 and 5 are axially movable through a predetermined range with respect to each other. More specifically, the second flywheel assembly 5 is axially movable with respect to the first flywheel assembly 4 between a position, where the contact portion 27 is slightly spaced from the friction member 19, and a position, where the contact portion 27 is in contact with the friction member 19.

(2) Operation (2-1) Torque Transmission

In this clutch device 1, a torque is supplied from the engine to the crankshaft 2 to the flywheel damper 11, and is transmitted from the first flywheel assembly 4 to the second flywheel assembly 5 via the damper mechanism 6. In the damper mechanism 6, the torque is transmitted through the input disk-shaped plate 32, small coil springs 45, coil springs 33, and output disk-shaped plates 30 and 31 in this order. Further, the torque is transmitted from the flywheel damper 11 to the clutch disk assembly 9 in the clutch engaged state and is finally provided to the input shaft 3.

(2-2) Absorbing and Damping of Torsional Vibrations

When the clutch device 1 receives the combustion variations from the engine, the damper mechanism 6 operates to rotate the input disk-shaped plate 32 relatively to the output disk-shaped plates 30 and 31 in the damper mechanism 6 so that the small coil springs 45 and the coil springs 33 are compressed. Further, the frictional resistance generating mechanism 7 generates a predetermined hysteresis torque. Through the foregoing operations, the torsional vibrations are absorbed and damped.

Figure 23:
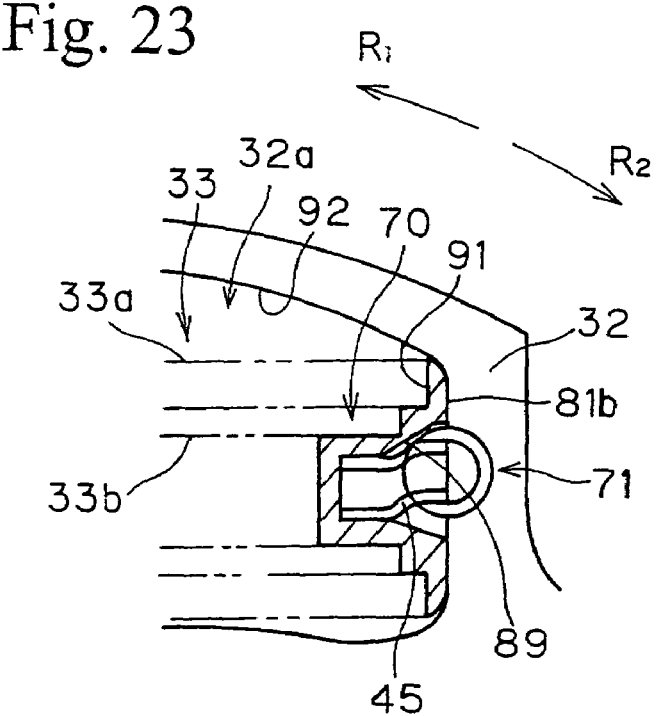
FIG. 23 is a fragmentary cross-sectional view illustrating an operation of the small coil spring.

As seen in FIGS. 8 and 9, more specifically, the small coil springs 45 and the coil spring 33 are compressed between the end surfaces 91 of the window aperture 32a in the input disk-shaped plate 32 and the end surfaces 94 of the windows 30a and 31a in the output disk-shaped plates 30 and 31 in the rotational direction. Further, in a region of a small torsion angle, the two small coil springs 45 are compressed to exhibit characteristics of a low rigidity. In this state, the coil spring 33 is hardly compressed. Moreover, when the input disk-shaped plate 32 rotates in the rotational direction R1 relatively against the first and second plates 30 and 31 from the neutral position illustrated in FIG. 22, the small coil spring 45 located on the forward side in the rotational direction R2 with respect to the coil spring 33 is compressed in the rotational direction between the first and second spring seats 70 and 71. In this operation, the torque is transmitted from the end surface 91, located on the forward side in the rotational direction R2, of the window aperture 32a in the input disk-shaped plate 32 to the coil spring 33 via the second spring seat 71 on the forward side in the rotational direction R2, the small coil spring 45 and the first spring seat 70, and further is transmitted through the first spring seat 70 on the forward side in the rotational direction R1 to the end surfaces 94 on the forward side in the rotational direction R2 of the windows 30a and 31a in the plates 30 and 31. Thereafter, as shown in FIG. 23, the end surface 91 on the forward side in the rotational direction of the window aperture 32a comes into contact with the second support surface 81b of the support portion 81 of the first spring seat 70. At the same time, a portion of the body 72 of the second spring seat 71 comes into contact with the radial surface 89 on the radially outer side of the concavity 85 of the first spring seat 70. When this contact occurs, the small coil springs 45 are no longer compressed. As described above, since the small coil springs 45 are disposed within the window aperture 32a in the input disk-shaped plate 32 and are aligned in the rotational direction with respect to the coil spring 33, the required spaced can be small and the structure can be relatively simple. Further, the radial surface 89 on the radially outer side of the first spring seat 70 (i.e., the surface located radially outside the small coil spring) is inclined to increase the space from the small coil spring 45 as the position moves toward the end surface 91. Therefore, the first spring seat 70 does not restrict the radial position of the small coil spring 45 when the small coil spring 45 is compressed. Consequently, the small coil spring 45 does not slide on the first spring seat 70 so that friction hardly occurs therebetween. Further, the small coil spring 45 maintains an intended position when compressed, and thus can provide an intended load.

Subsequently, the coil spring 33 is compressed to produce characteristics of a high rigidity in a region of a large torsion angle. More specifically, the four coil springs 33 are compressed in parallel.

Referring now to FIG. 5, in the frictional resistance generating mechanism 7, the friction washer 61 rotates together with the input friction plate 63, and thus rotates relatively to the output friction plate 44 and the flywheel 21 having the friction surface. Consequently, the friction washer 61 slides on the output friction washer 44 and the flywheel 21 having the friction surface to generate a relatively large frictional resistance.

(2-2-1) Minute Torsional Vibrations

The operation of the damper mechanism 6, which is performed when minute torsional vibrations due to the combustion variations of the engine are applied to the clutch device 1, will now be described with reference to a mechanical circuit diagram of FIG. 20 as well as torsion characteristic diagrams of FIGS. 21, 27, 28 and 29. In FIG. 20, the first and second spring seats 70 and 71 are not shown.

When minute torsional vibrations are applied, the input friction plate 63 in the frictional resistance generating mechanism 7 rotates relatively to the friction washer 61 through an angle, which corresponds to the minute space in the rotational direction between the concavity 65 and convexity 62. Thus, the friction washer 61 is not driven by the input friction plate 63, and therefore, does not rotate relatively the flywheel 21 having the friction surface and others. Consequently, a high hysteresis torque does not occur in response to the minute torsional vibrations. According to the torsion characteristic diagram of FIG. 21, the coil spring 33 operates, e.g., in "AC2 HYS", but no sliding occurs in the frictional resistance generating mechanism 7. Thus, only a hysteresis torque, which is much smaller than an ordinary hysteresis torque, can be obtained in a predetermined torsion angle range. As described above, the minute rotating-direction space is provided to prevent the operation of the frictional resistance generating mechanism 7 in the predetermined angle range in the torsion characteristics. Therefore, the levels of vibrations and noises can be significantly lowered.

The operation of driving the friction washer 61 by the input friction plate 63 will now be described in connection with an initial transition state and a usual state. The input friction plate 63 rotates relatively to the friction washer 61 in the rotational direction R1 from the neutral position in FIG. 24, as described below. In FIG. 24, the inner peripheral surface 61d of the friction washer 61 is slightly spaced from the outer peripheral surface 28b of the cylindrical portion 28 except for its circumferentially middle portion (i.e., the middle portion in the rotational direction).

Figure 25:
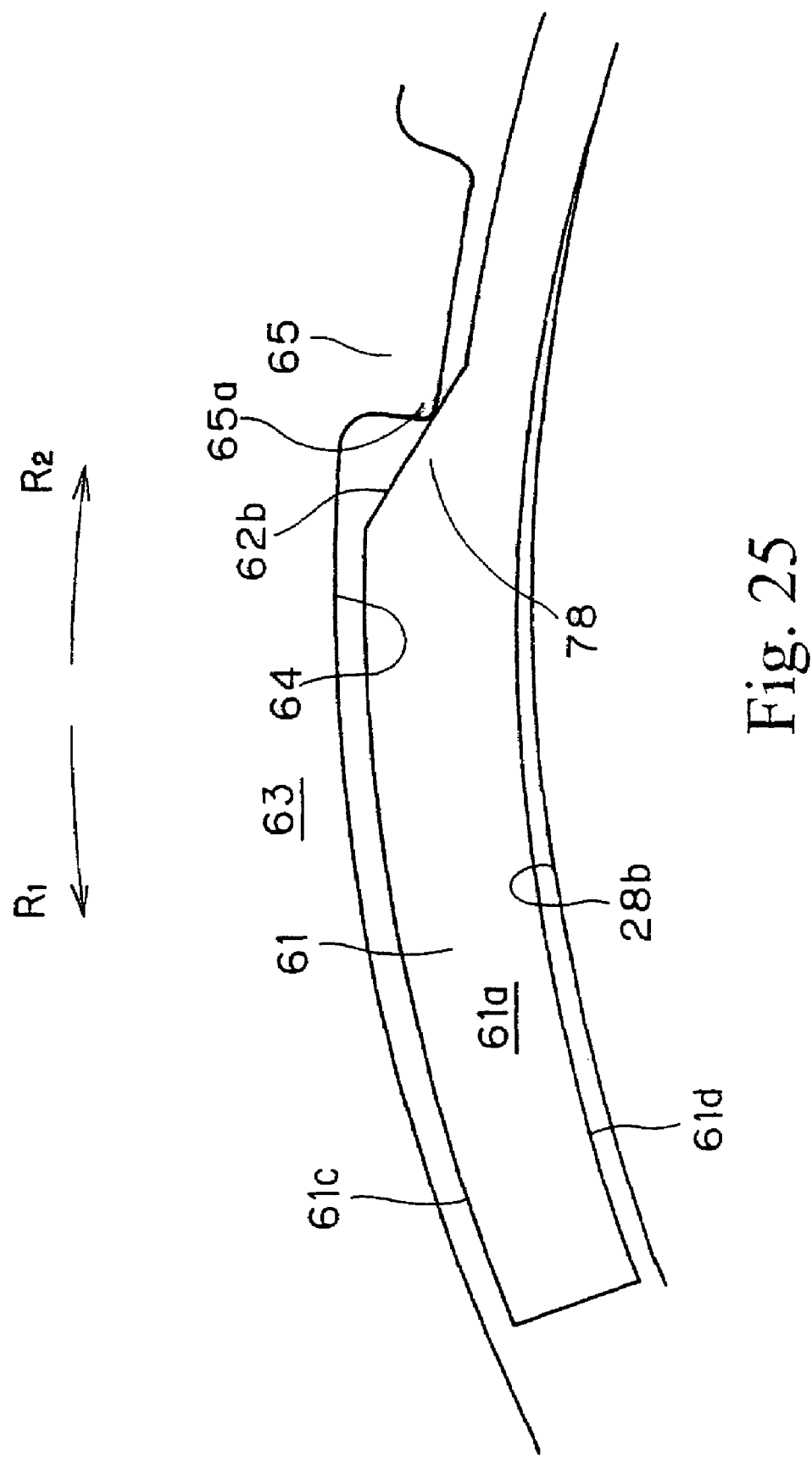
FIG. 25 is a fragmentary elevational view illustrating an operation of the frictional resistance generating mechanism.
Figure 26:
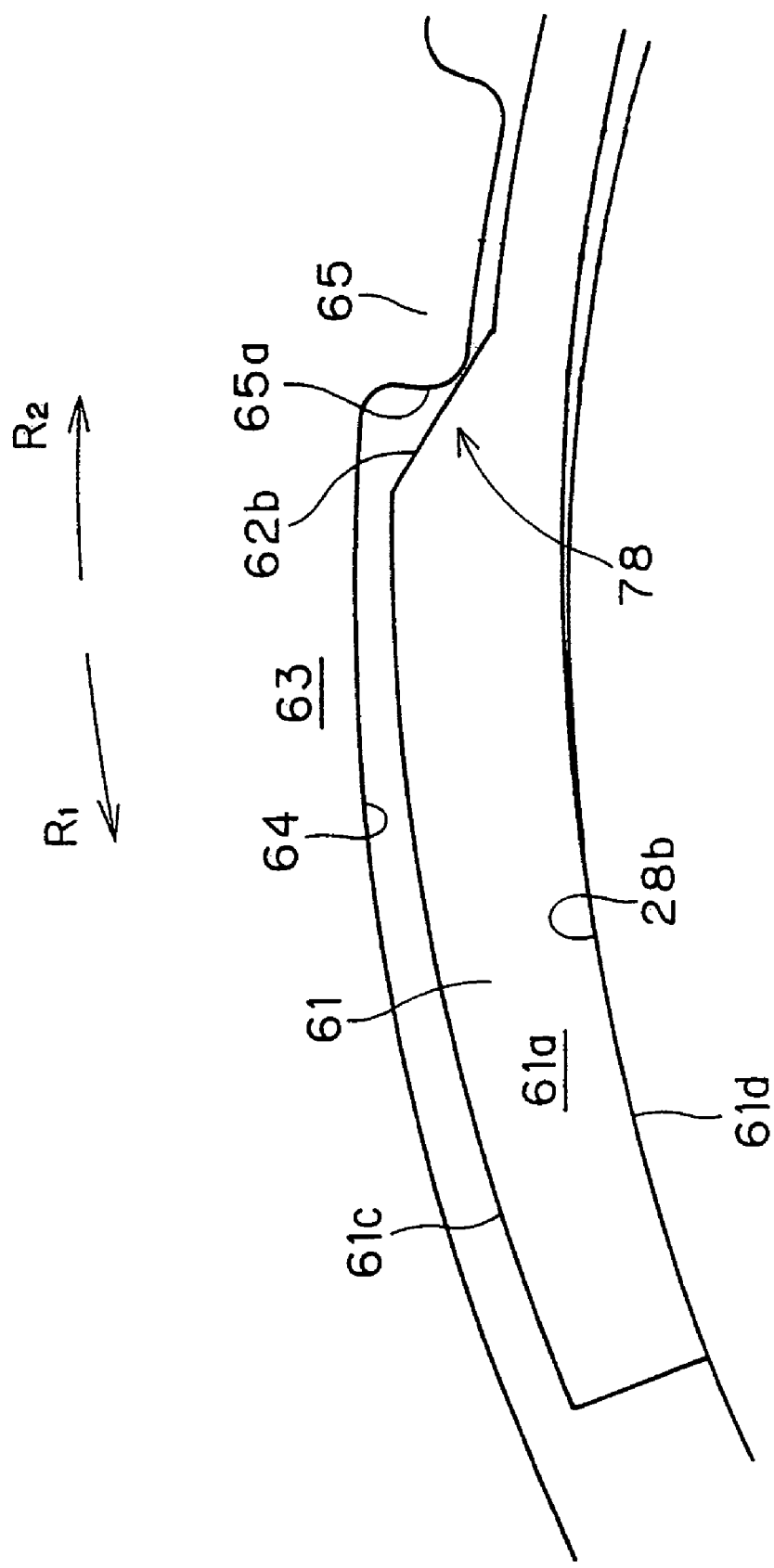
FIG. 26 is a fragmentary elevational view illustrating an operation of the frictional resistance generating mechanism.

When the torsion angle increases, the convexity 65 comes into contact with the wall surface of the convexity 62 as shown FIG. 25. More specifically, the corner 65a of the convexity 65 comes into contact with the inclined surface 62b of the convexity 62. In this state, a component of a force applied from the convexity 65 to the concavity 62 occurs to move the friction washer 61 radially inward. When the torsion angle increases from the state shown in FIG. 25, the portion, which is located on the forward side in the rotational direction R1, of the friction washer 61 moves radially inward and the portion on the forward side in the rotational direction R2 moves radially outward. Thus, as shown in FIG. 26, the inner peripheral surface 61d of the forward portion of the friction washer 61 in the rotational direction R1 moves toward the outer peripheral surface 28b of the cylindrical portion 28 and the inner peripheral surface 61d of the forward portion, in the rotational direction R2, moves away from the outer peripheral surface 28b of the cylindrical portion 28. During the above operation, the force for moving the friction washer 61 radially inwardly increases. Thus, an effective radius of the friction surface of the friction washer 61 gradually increases; thereby the frictional resistance gradually increases. After the inner peripheral surface 61d of the forward portion of the friction washer 61 the rotational direction R1 comes into contact with the outer peripheral surface 28b of the cylindrical portion 28 as shown in FIG. 26, the friction washer 61 moves only in the rotational direction thereafter.

The above can be summarized as follows. The friction washer 61 is driven by the input friction plate 63 in the two regions, i.e., the first region, in which the effective radius of the friction surface and the frictional resistance gradually increase and the second region, in which the effective radius of the friction surface and the frictional resistance are constant. In this embodiment, the first region has a size, e.g., of about 2°.

In summary, the input friction plate 63 and the engagement portion 78 of the friction washer 61 (specifically, the convexity 65 and the concavity 62) are configured to ensure the first region for gradually increasing the effective radius of the friction surface of the friction washer 61 and the second region for keeping the effective radius of the friction surface of the friction washer 61 at a constant value.

Figure 27:
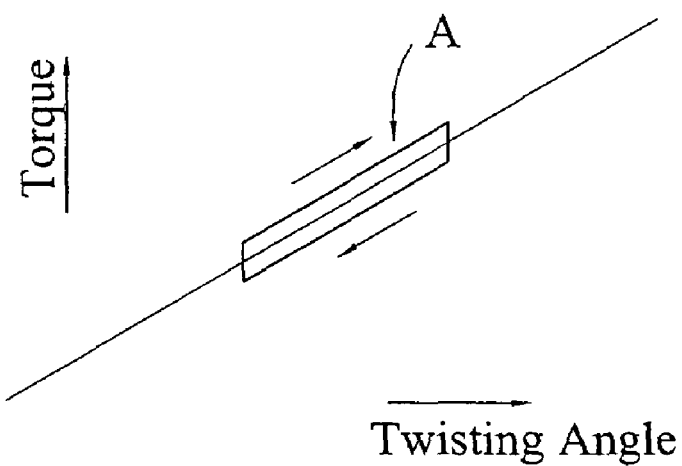
FIG. 27 is a view of a diagram illustrating torsion characteristics of the damper mechanism.
Figure 28:
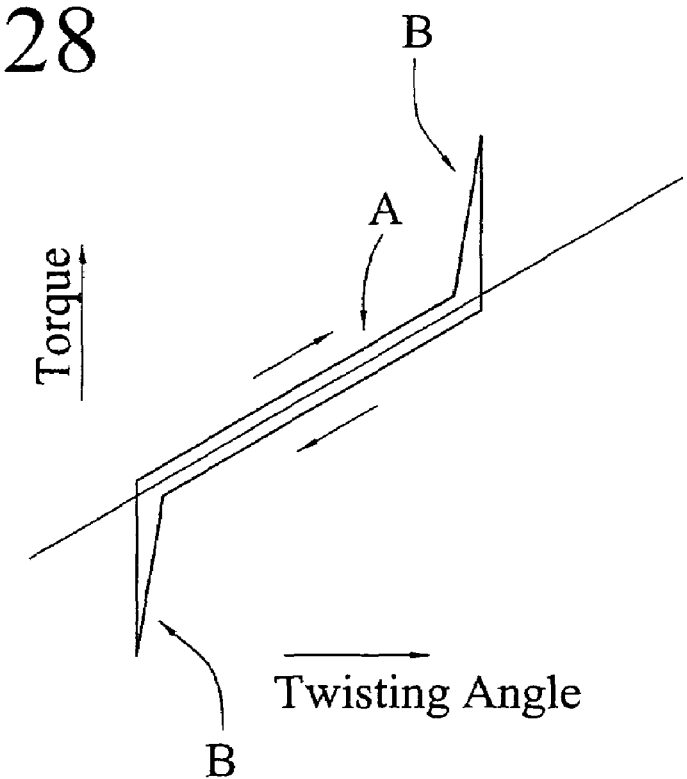
FIG. 28 is a view of a diagram illustrating torsion characteristics of the damper mechanism.
Figure 29:
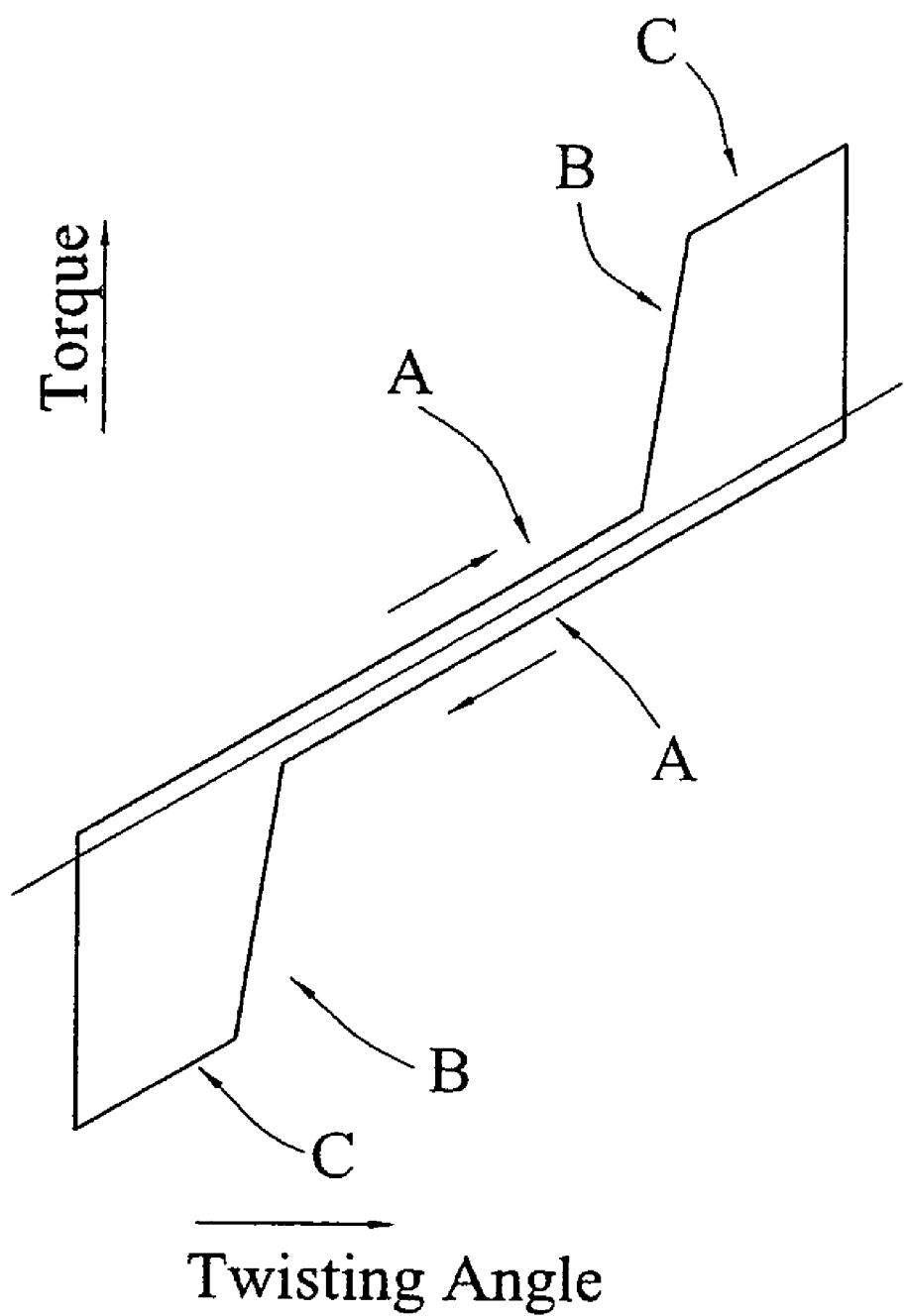
FIG. 29 is a view of a diagram illustrating torsion characteristics of the damper mechanism.

Consequently, when the operation angle of the torsional vibrations does not exceed a predetermined angle (e.g., of 8°) of the engagement portion 78, a large frictional resistance (high hysteresis torque) does not occur, and only a region A of a low frictional resistance is obtained as illustrated in FIG. 27. When the operation angle of the torsional vibrations is in a range between the predetermined angle (e.g., of 8°) of the rotating-direction space 79 of the engagement portion 78 and an angle (e.g., 10°) larger than this predetermined angle (e.g., 8°) by a frictional resistance change angle (e.g., 2°), a region B in which the frictional resistance gradually increases, occurs at each end of the region A of the low frictional resistance as illustrated in FIG. 28. When the operation angle of the torsional vibrations is larger than the angle equal to a sum of the predetermined angle of the engagement portion 78 and the frictional resistance change angle, the region B, in which the frictional resistance gradually increases, and a region C, in which a large constant frictional resistance occurs, are formed on each side of the region A of the low frictional resistance as illustrated in FIG. 29.

(2-2-2) Large-Angle Torsional Vibrations

Figure 21:
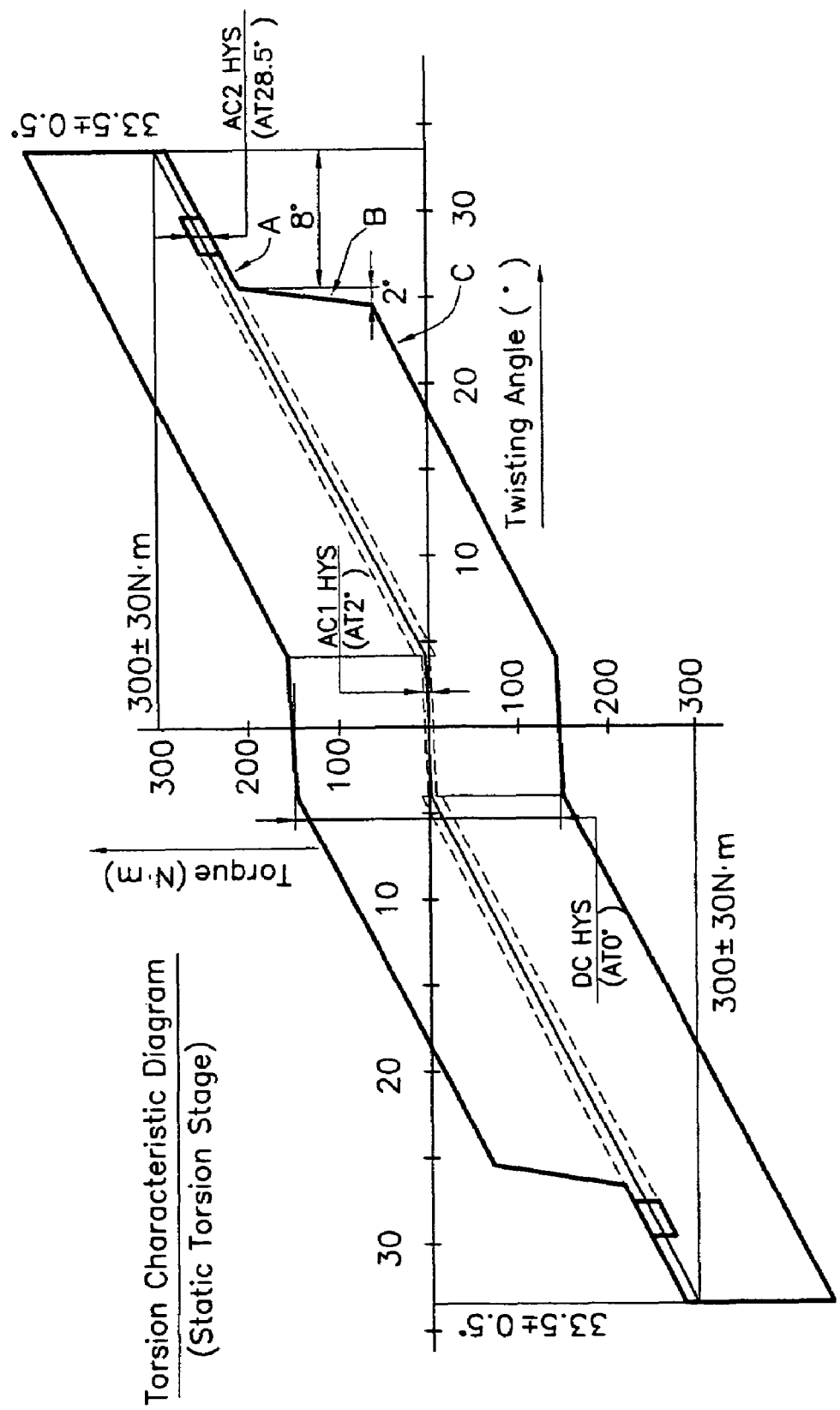
FIG. 21 is a view of a torsion characteristic diagram of the damper mechanism.

Referring now to FIGS. 5, 7 and 21, described before, when the torsion angle of torsional vibrations is large, the friction washer 61 slides on the flywheel 21 having the friction surface and the disk-shaped plate 22. Thereby, a frictional resistance of a constant magnitude occurs throughout the first and second stage.

At an end of the torsion angle range (i.e., the position where the direction of the vibration changes), operations are performed as follows. On the right end in the torsion characteristic diagram of FIG. 21, the friction washer 61 is in the position shifted to the maximum extent in the rotational direction R2 with respect to the input friction plate 63. When the disk-shaped member 13 rotates relatively to the flywheel 21 having the friction surface in the rotational direction R2, the friction washer 61 rotates relatively to the input friction plate 63 throughout the angle range of the rotating-direction space 79 between the convexity 65 and the concavity 62. During this operation, the friction washer 61 does not slide on the member on the output side, i.e. the flywheel 21 having the friction surface, so that the region A (e.g., of 8°) of a low frictional resistance is obtained, i.e. friction is not generated between the friction washer 61 and the flywheel 21. When the rotating-direction space 79 of the engagement portion 78 disappears, the input friction plate 63 starts to drive the friction washer 61. Thereby, the friction washer 61 rotates relatively to the output friction plate 44 and the flywheel 21 having the friction surface as well as the disk-shaped plate 22. This produces the region B, e.g., of 2°, in which the frictional resistance gradually (and thus smoothly) increases, as already described, then produces the region C of a large constant frictional resistance.

As described above, the region B, in which the frictional resistance gradually increases, is provided in an initial stage of the operation of generating a large frictional resistance. Since the large frictional resistance rises smoothly, a wall of a high hysteresis torque does not exist when generating the large hysteresis torque. Thereby, hitting or tapping noises of claws, which may occur when a high hysteresis torque occurs, can be reduced in the frictional resistance generating mechanism, which is provided with the minute space in the rotational direction for absorbing the minute torsional vibrations.

In particular, since the structure according to the invention employs a single kind of friction washers (i.e., washers 61) for generating an intermediate frictional resistance, the kinds of the friction members can be reduced in number. Since the friction washer 61 has a simple arc-shaped form, the manufacturing cost thereof can be low.

(3) Clutch Engaging and Releasing Operations

As seen in FIGS. 1 and 2, when the hydraulic circuit (not shown) supplies the hydraulic fluid into the hydraulic chamber of the hydraulic cylinder, the piston 60 axially moves toward the engine. Thereby, the release bearing 58 axially moves the radially inner end of the diaphragm spring 50 toward the engine. Consequently, the elastic portion 50a of the diaphragm spring 50 is spaced from the pressure plate 49. Thereby, the pressure plate 49 biased by the strap plates 53 moves away from the friction facing 54 of the clutch disk assembly 9 so that the clutch is released.

In the clutch release operation, the release bearing 58 applies an axial load which is directed toward the engine to the clutch cover assembly 8 and this load axially biases and moves the second flywheel assembly 5 toward the engine. Thereby, the contact portion 27 of the disk-shaped plate 22 in the relative rotation suppressing mechanism 24 is pressed against the friction mechanism 19 and is frictionally engaged with the disk-shaped member 13. Thus, the second flywheel assembly 5 becomes unrotatable with respect to the first flywheel assembly 4. In other words, the second flywheel assembly 5 is locked with respect to the crankshaft 2 so that the damper mechanism 6 does not operate. Accordingly, when the rotation speed passes through the resonance point in a low speed range (e.g., from 0 to 500 rpm) during a start or stop operation of the engine, it is possible to suppress the breakage of the damper mechanism 6 as well as noises and vibrations, which may be caused by the resonance when releasing the clutch.

In this operation, since the damper mechanism 6 is locked by using the load applied from the release device 10 in the clutch releasing operation, the structure becomes simpler. In particular, since the relative rotation suppressing mechanism 24 is formed of the members having simple forms such as the disk-shaped member 13 and the disk-shaped plate 22, a special structure is not required.

(3) Stop Mechanism of Damper Mechanism

As already described, the elastic coupling mechanism 29 of the damper mechanism 6, which elastically couples the second flywheel assembly 5 to the crankshaft 2 in the rotating direction, is formed of the pair of output-side disk-shaped plates 30 and 31, the input-side disk-shaped plate 32, and a plurality of coil springs 33. As seen in FIG. 3, further, a stop mechanism 90 of the damper mechanism 6 is formed of a plurality of plate coupling portions 40 formed at the outer periphery of the disk-shaped main body of the second plate 31 and the contact portions 32c formed at the outer periphery of the input-side disk-like plate 32.

The stop mechanism 90 described above has the following advantages.

(3-1) Since the axially extending portion 41 of the plate coupling portion 40 has a plate-like form, a circumferential angle thereof can be shorter than that in a conventional stop pin.

(3-2) The axially extending portion 41 of the plate coupling portion 40 has a radial length much smaller than that of the conventional stop pin. More specifically, the radial length of the stop mechanism 90 is equal to the thickness of the pair of output-side disk-shaped plates 30 and 31. This means that the radial length of the stop mechanism 90 is substantially restricted to a small value corresponding to the plate thickness.

Owing to the above, as shown in FIG. 3, the plate coupling portion 40 is arranged at the outer peripheral portion, i.e., the radially outermost position of the input disk-shaped plate 32, and is located radially outside the outer periphery of the window aperture 32a. As described above, the plate coupling portion 40, i.e., the stop mechanism 90 takes a position radially different from the window aperture 32a so that the stop mechanism 90 does not circumferentially interfere with the window aperture 32a. Consequently, it is possible to increase both the maximum torsion angle of the damper mechanism 6 and the torsion angle of the coil spring 33. More specifically, the plate coupling portion 40 moves to a position radially outside the window aperture 32a, and further can substantially move to a position radially outside a circumferential center of the window aperture 32a.

In a conventional structure, the stop mechanism and the window aperture are located at the radially same position. In this structure, the torsion angle of the damper mechanism restricts the circumferential angle of the window aperture, and vice versa so that it is impossible to increase the maximum angle of the damper mechanism and to lower the rigidity of the springs.

In particular, the radial length of the stop mechanism 90 is much shorter than that of the conventional stop pin. Therefore, provision of the stop mechanism radially outside the window aperture 32a does not remarkably increase the outer diameter of the output-side disk-shaped plates 30 and 31. Also, it does not reduce the radial length of the window aperture 32a.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Second Embodiment

Referring to FIGS. 30 to 45, a second embodiment of the invention will be described. Basic structures of the clutch device and the damper mechanism in the second embodiment are substantially the same as those in the first embodiment as a whole, therefore, a frictional resistance generating mechanism 107 will be described hereinafter.

Figure 30:
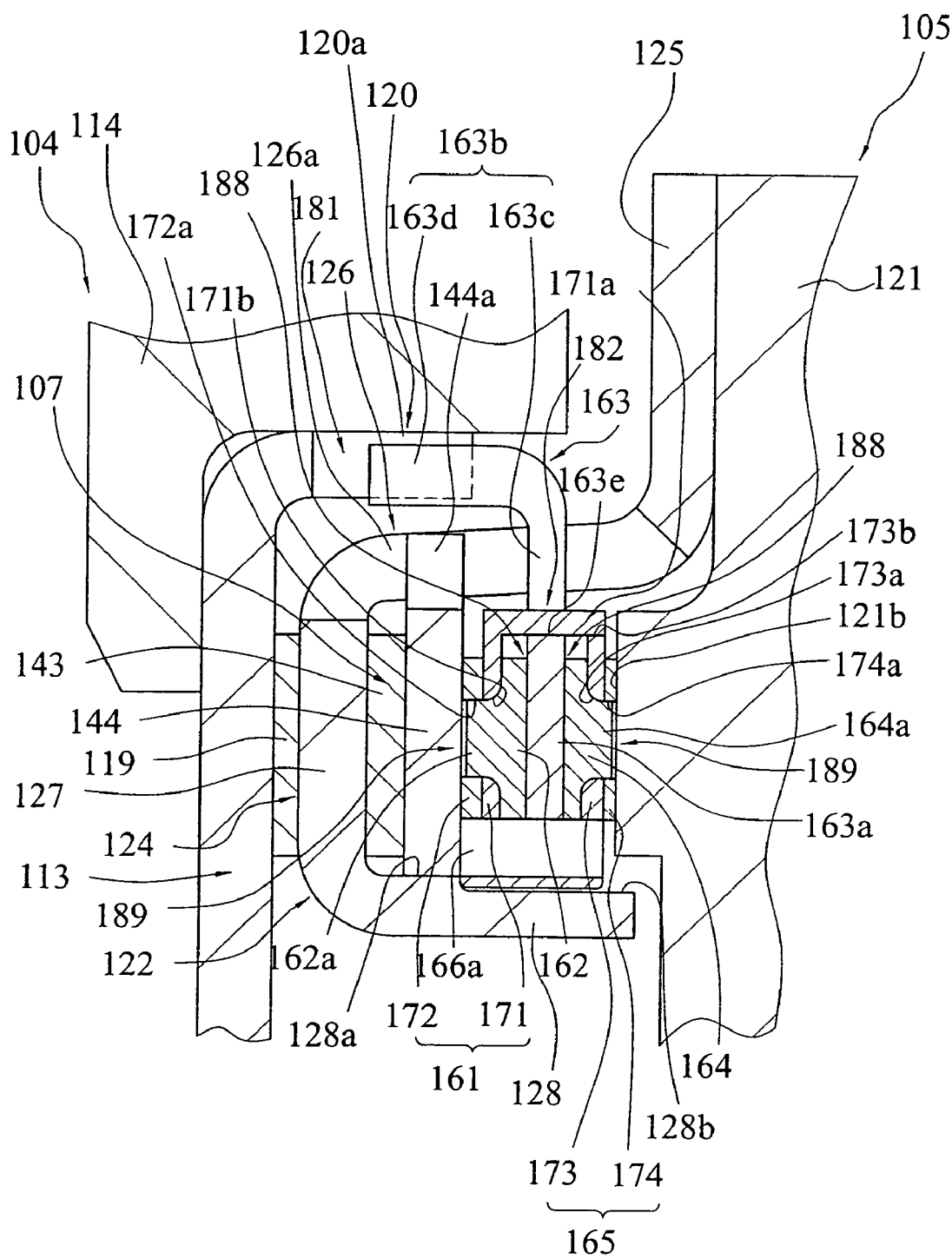
FIG. 30 is a cross-sectional view illustrating a frictional resistance generating mechanism in accordance with a second preferred embodiment of the present invention.
Figure 31:
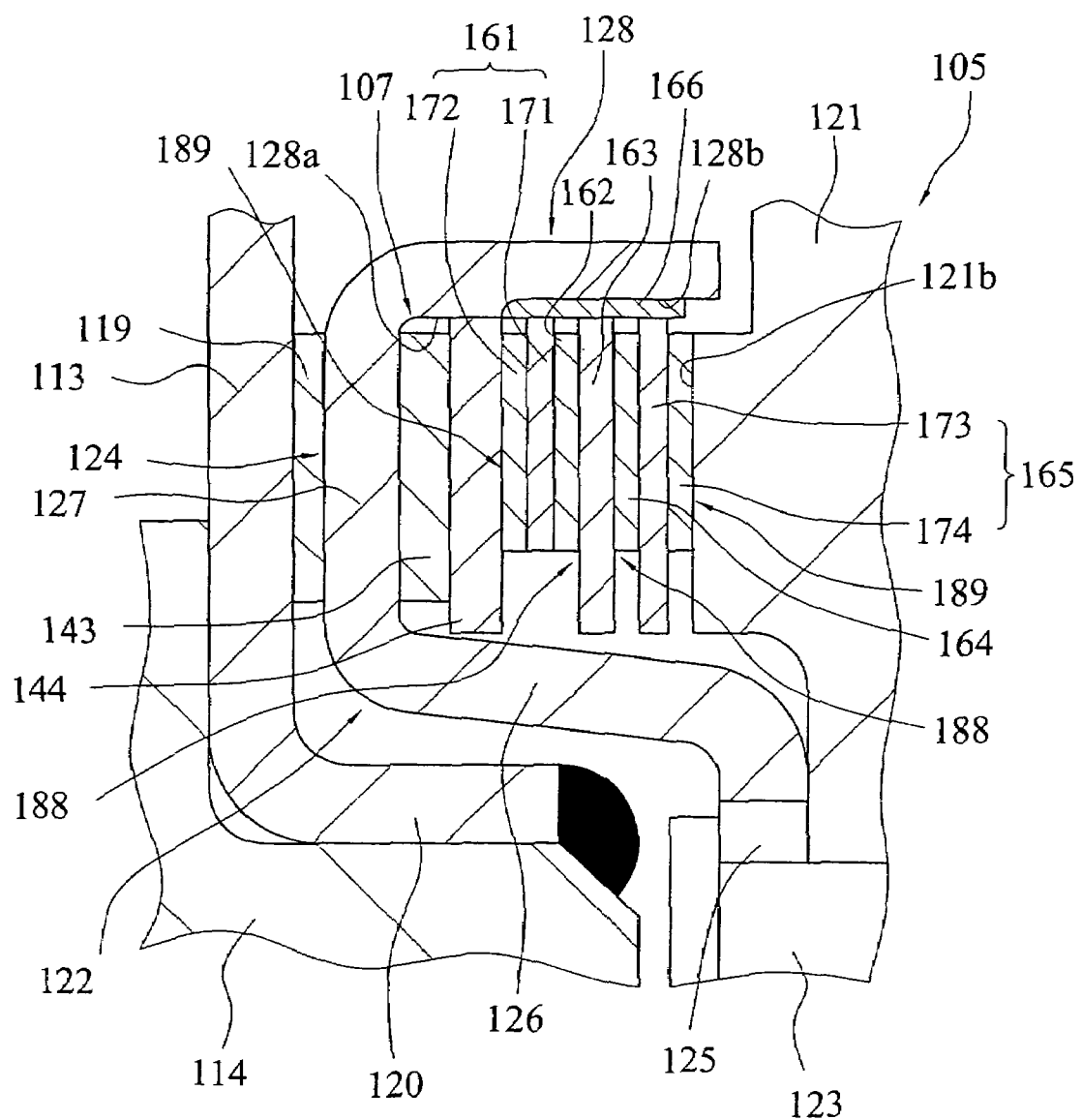
FIG. 31 is an alternate cross-sectional view illustrating the frictional resistance generating mechanism of the second embodiment.

As seen in FIG. 30, the frictional resistance generating mechanism 107 functions between a crankshaft and a flywheel 121 having the friction surface in parallel with coil springs 133 and generates a predetermined frictional resistance (hysteresis torque) when the crankshaft rotates relatively to the flywheel 121 having the friction surface. The flywheel assembly 104 and annular member 114 are configured the same as or substantially the same as the flywheel assembly 4 and annular member 14 of the first embodiment. As seen in FIG. 30, the frictional resistance generating mechanism 107 is formed of a plurality of washers, which are disposed between a second friction surface 121b of the flywheel 121 having the friction surface and a contact portion 127 of a disk-shaped plate 122, and are in contact with each other. As shown in FIGS. 30 and 31, the frictional resistance generating mechanism 107 has a cone spring 143, an output friction plate 144, a first friction washer 161, a first friction washer 162, an input friction plate 163, a second friction washer 164, and a second friction washer 165. The cone spring 143 is located near the contact portion 127. The first friction washer 161 has a high friction coefficient. The first friction washer 162 has a low friction coefficient. The second friction washer 164 has a low friction coefficient. The second friction washer 165 has a high friction coefficient. In the aforementioned order, the members of the frictional resistance generating mechanism 107 are located at positions successively shifted toward the flywheel 121, respectively. As described above, the disk-shaped plate 122 has the function of holding the frictional resistance generating mechanism 107 on the side of the flywheel 121 having the friction surface. Therefore, it is possible to reduce the number of parts to simplify the structure.

The cone spring 143 is provided apply an axial load to each friction surface and is compressed between the contact portion 127 and the output friction plate 144 so that it applies an axial biasing force to these members. The output friction plate 144 is provided with claws 144a at its outer periphery, which are engaged with recesses 126a in the disk-shaped plate 122 so that the output friction plate 144 is unrotatable but is axially movable with respect to the disk-shaped plate 122 and the flywheel 121 having the friction surface. The output friction plate 144 has an inner peripheral surface, which is in contact with an outer peripheral surface 128a of the base portion of the cylindrical portion 128 formed at the outer periphery of the disk-shaped plate 122, and thereby is radially positioned.

Figure 32:
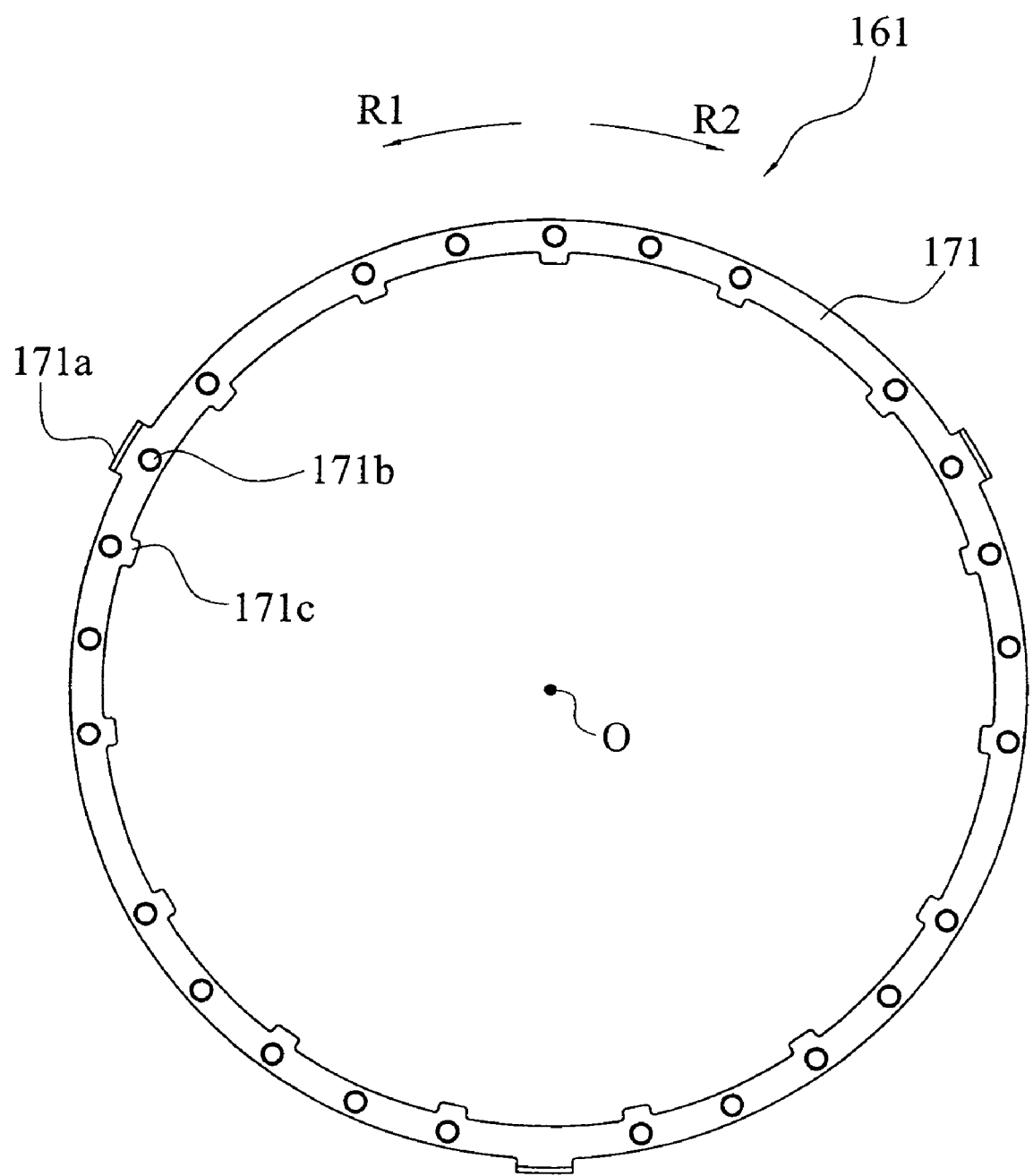
FIG. 32 is an elevational view a first high-friction-coefficient friction washer of the frictional resistance generating mechanism of the second embodiment.
Figure 33:
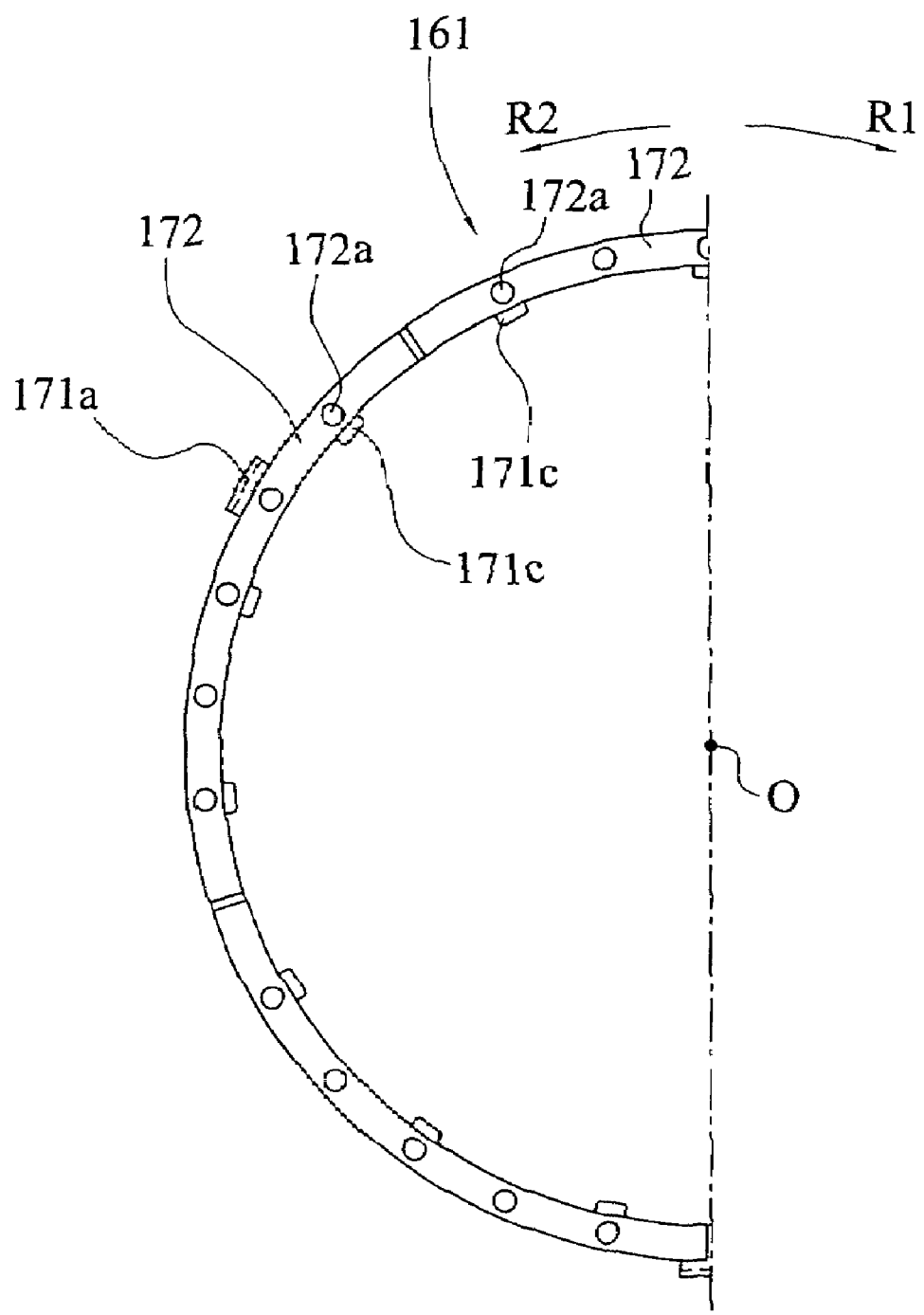
FIG. 33 is a rear elevational view of the first high-friction-coefficient friction washer of the second embodiment.

The first friction washer 161 having a high friction coefficient is an annular member as shown in FIGS. 32 and 33. As shown in FIG. 31, the first friction washer 161 is located between the output friction plate 144 and the first friction washer 162 having a low friction coefficient. The first high-friction-coefficient friction washer 161 is formed of a core plate 171 and a friction facing 172 affixed thereto. The core plate 171 is an annular member. The friction facing 172 is formed of a plurality of arc-shaped members affixed to the axial surface on the engine side of the core plate 171, and is in contact with the output friction plate 144. The core plate 171 and the friction facing 172 have substantially the same inner diameters, and also have substantially the same outer diameters. As seen in FIGS. 32 and 33, the core plate 171 is provided with projected portions 171a at its outer periphery projecting axially toward the transmission. The core plate 171 is provided with a plurality of apertures 171b at its body. The core plate 171 is provided with a plurality of projections 171c at its inner periphery extending radially inward. The friction facing 172 is provided with apertures 172a corresponding to the apertures 171b respectively.

Figure 34:
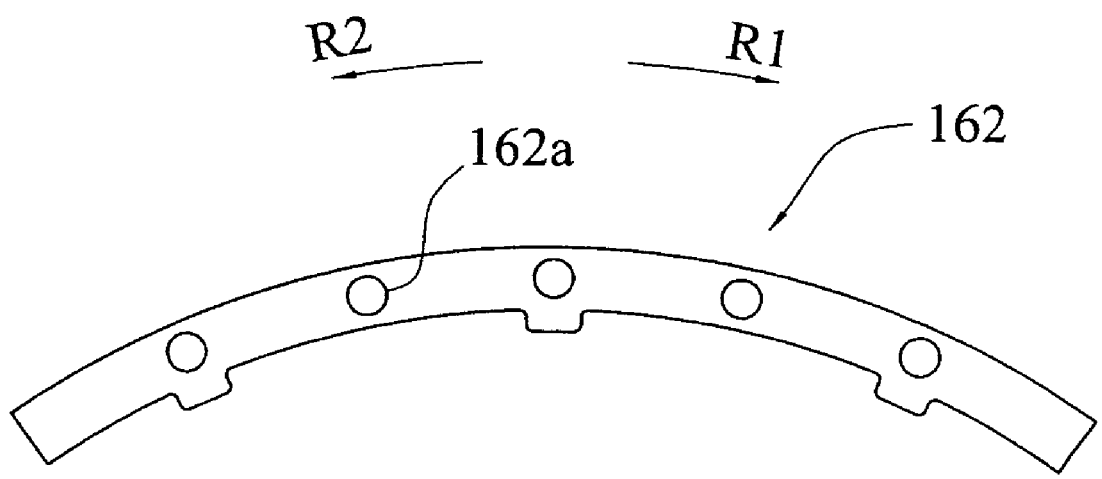
FIG. 34 is an elevational view of a second high-friction-coefficient friction washer of the frictional resistance generating mechanism of the second embodiment.

As shown in FIG. 34, the first low-friction-coefficient friction washer 162 is formed of a plurality of arc-shaped members, and as seen in FIG. 31, is located between the first high-friction-coefficient friction washer 161 and the input friction plate 163. The first low-friction-coefficient friction washer 162 is preferably made of plastics. Referring again to FIG. 34, the first low-friction-coefficient friction washer 162 is provided with a plurality of projected portions 162a at its radial surface on the engine side. The projected portions 162a are inserted into and engaged with the apertures 171b and 172a in the first high-friction-coefficient friction washer 161. Owing to this engagement, the first high-friction-coefficient friction washer 161 and first low-friction-coefficient friction washer 162 rotate together. The first low-friction-coefficient friction washer 162 is provided with a plurality of projections 162b at its inner periphery projected radially inward.

Figure 35:
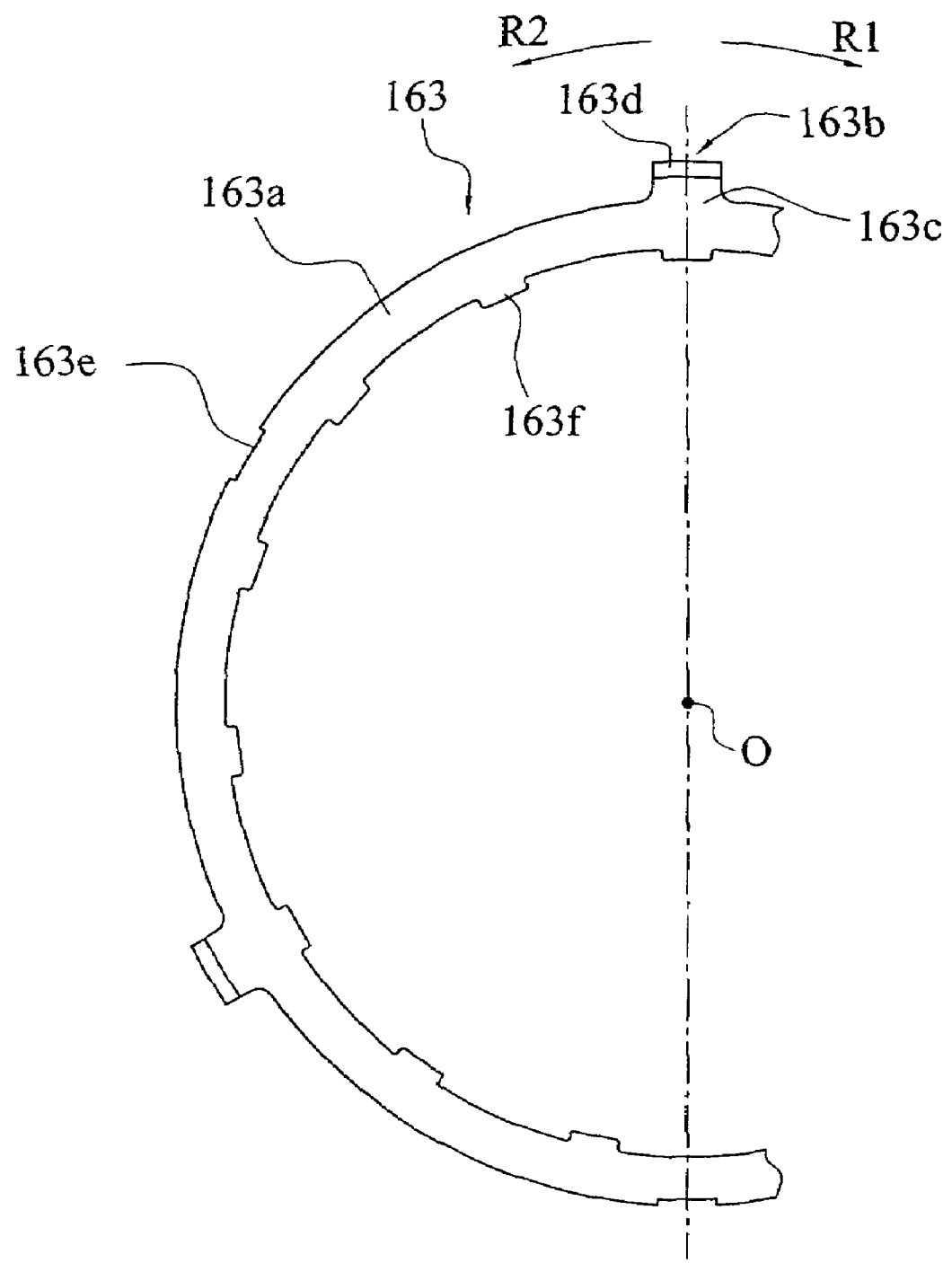
FIG. 35 is a rear fragmentary elevational view of the second high-friction-coefficient friction washer of the second embodiment.
Figure 39:
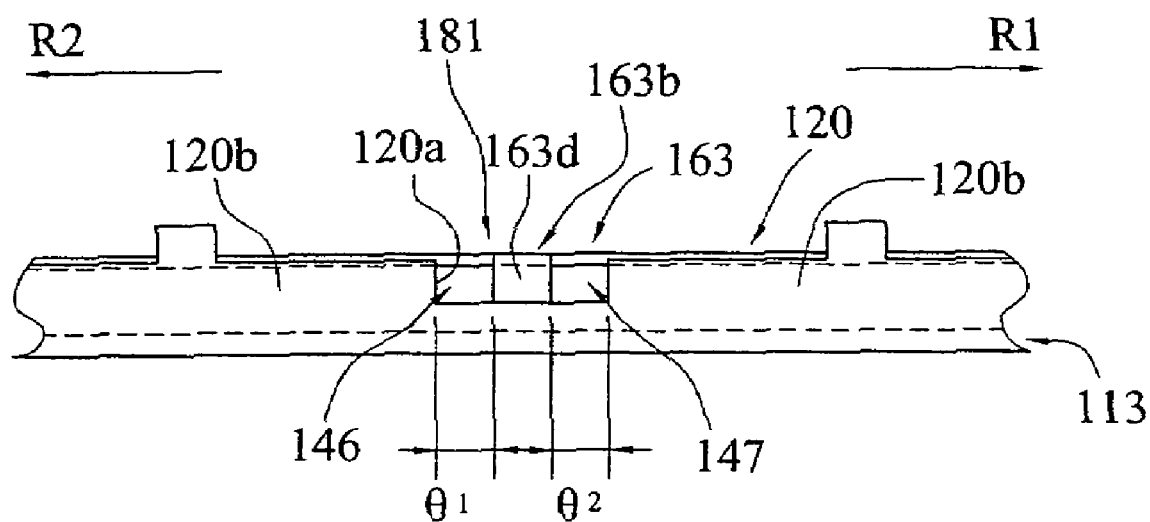
FIG. 39 is a fragmentary plan view illustrating a structure of a first rotating-direction engagement portion of the frictional resistance generating mechanism of the second embodiment.
Figure 40:
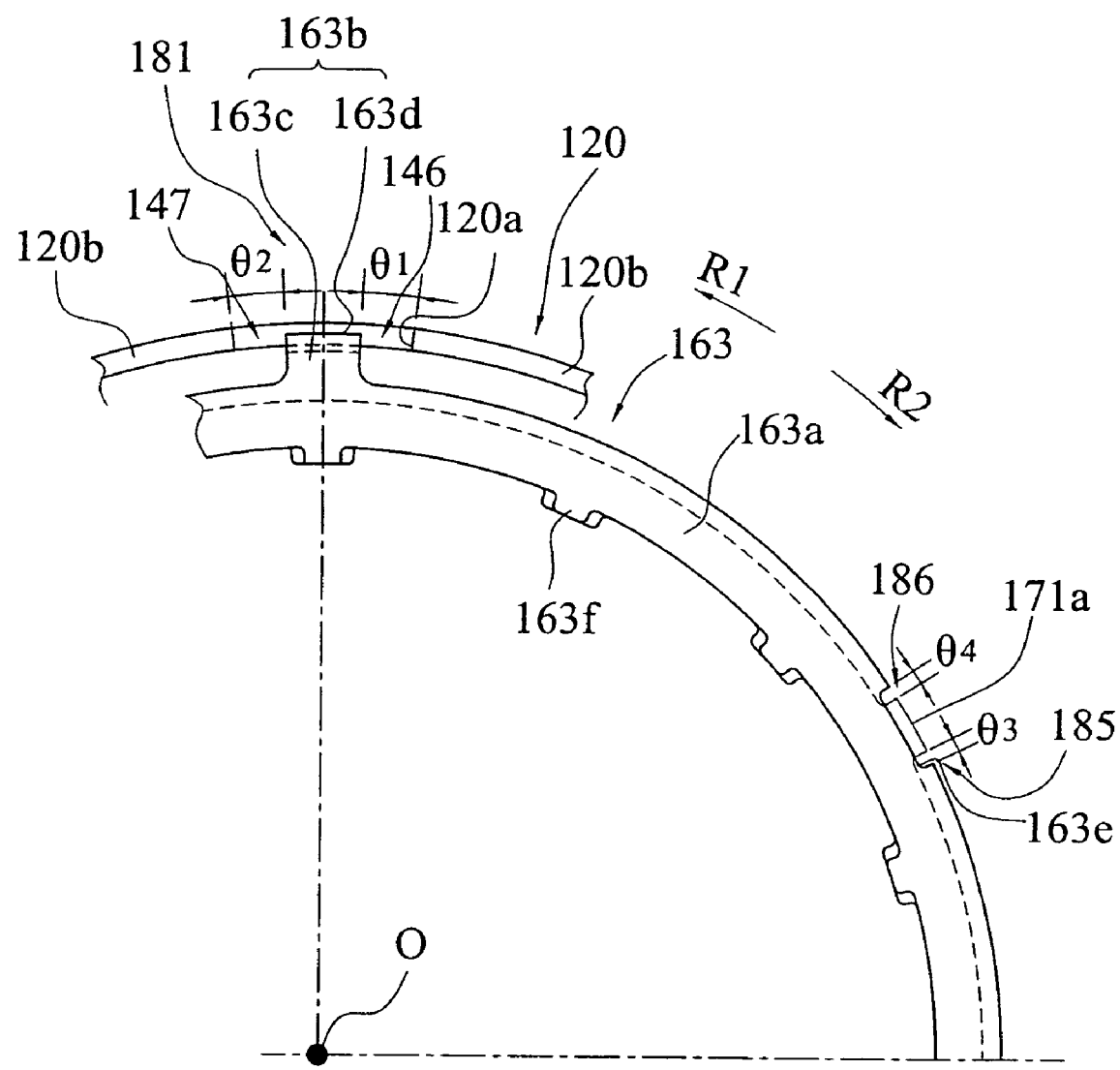
FIG. 40 is a fragmentary elevational view illustrating structures of the first and second rotating-direction engagement portions of the second embodiment.

The input friction plate 163 has a disk-shaped portion 163a located axially between the first low-friction-coefficient friction washer 162 and the second low-friction-coefficient friction washer 164. As shown in FIG. 35, the input friction plate 163 is provided with a plurality of projections 163b at its outer periphery, as shown in FIG. 35. The projections 163b are formed corresponding to the recesses 126a, respectively, and each are formed of a projected portion 163c projected radially outward and a claw 163d extending axially toward the engine from the end of the projected portion 163c. The projected portion 163c extends radially through the recess 126a. The claw 163d is located radially outside the cylindrical portion 126, and extends axially through the recess 126a in the cylindrical portion 120 of the disk-shaped member 113 toward the engine. As shown in FIGS. 39 and 40, the claw 163d and the recess 120a form a first rotating-direction engagement portion 181 between the disk-shaped member 113 and the output friction plate 144. The disk-shaped portion 163a of the input friction plate 163 is provided with a plurality of recesses 163e at its outer periphery, and is provided with a plurality of projections 163f at its inner periphery extending radially inward.

In the first rotating-direction engagement portion 181, the width in the rotational direction of the claw 163d is shorter than that of the recess 120a so that the claw 163d can move a predetermined angle within the recess 120a. This means that the input friction plate 163 is movable through a predetermined angle range with respect to the disk-shaped member 113. More specifically, as shown in FIG. 40, a rotating-direction space 146 of a torsion angle of θ1 is ensured on the forward side, in the rotational direction R2, of the claw 163d, and a rotating-direction space 147 of a torsion angle of θ2 is formed on the forward side, in the rotational direction R1, of the claw 163d. Consequently, the total torsion angle, i.e., the sum of the torsion angles of θ1 and θ2 provides the predetermined angle, by which the input friction plate 163 can rotate relatively to the disk-shaped member 113. In this embodiment, the total torsion angle is equal to 8° (see FIG. 42). This total torsion angle is preferably in a range slightly exceeding a damper operation angle, which is caused by minute torsional vibrations due to combustion variations of the engine.

As seen in FIG. 31, the second low-friction-coefficient friction washer 164 is formed of a plurality of arc-shaped members similar or identical to the first low-friction-coefficient friction washer 162 and is located between the input friction plate 163 and the second high-friction-coefficient friction washer 165. The second low-friction-coefficient friction washer 164 is preferably made of plastics. The second low-friction-coefficient friction washer 164 is provided with a plurality of projected portions 164a at its surface on the transmission side.

Figure 36:
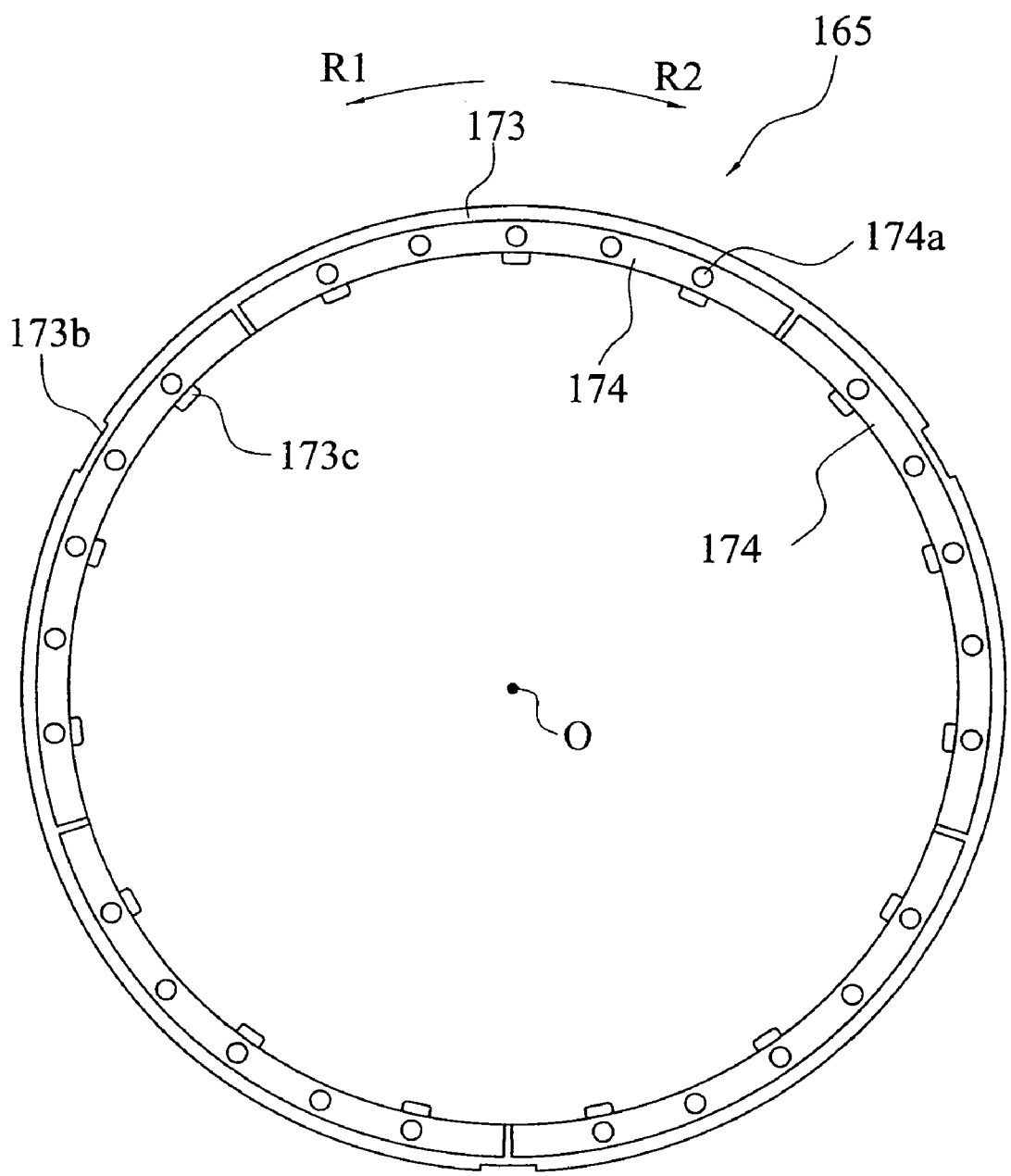
FIG. 36 is an elevational view of an input friction plate of the frictional resistance generating mechanism of the second embodiment.
Figure 37:
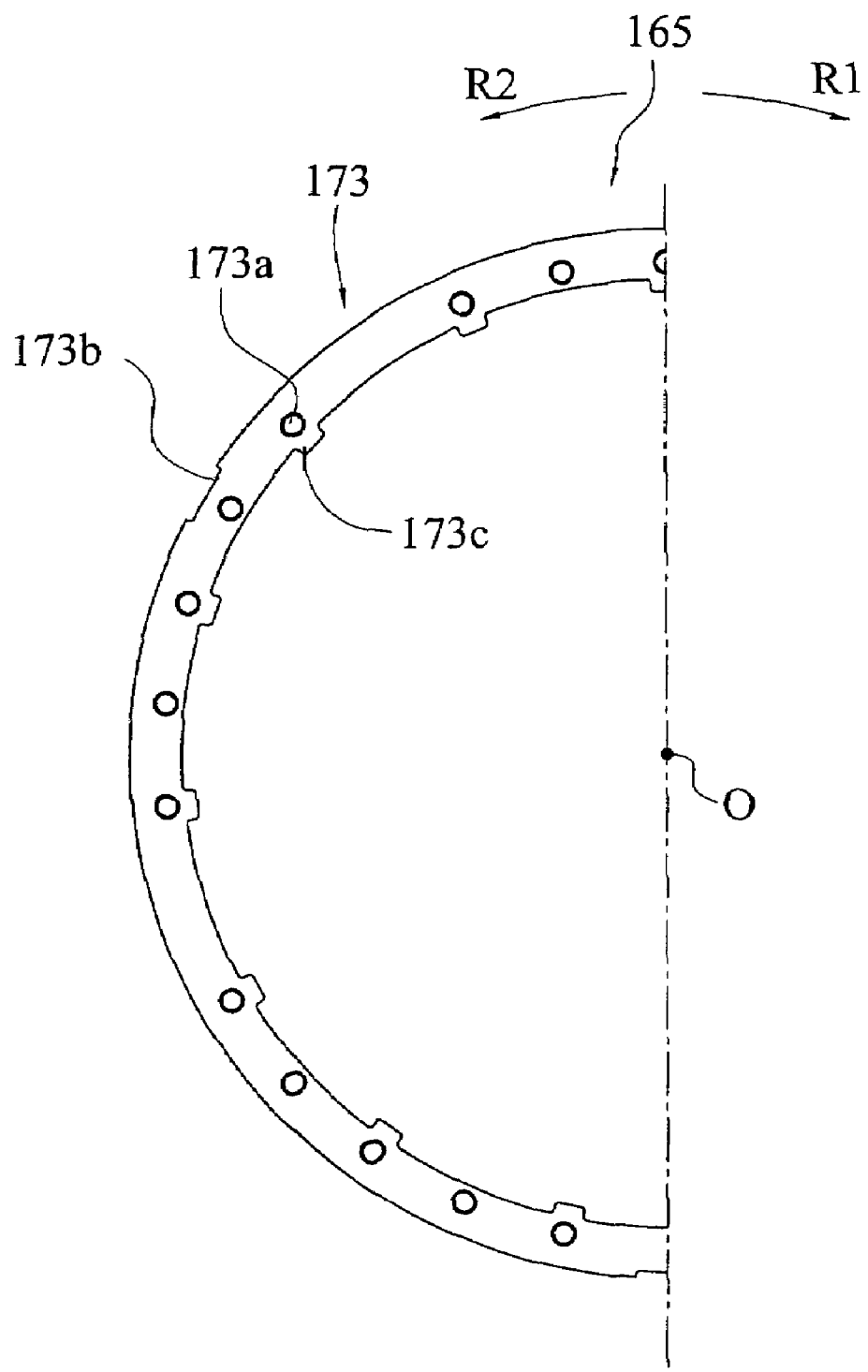
FIG. 37 is an elevational view of a bushing of the frictional resistance generating mechanism of the second embodiment.

The second high-friction-coefficient friction washer 165 is an annular member as shown in FIGS. 36 and 37, and is located between the second low-friction-coefficient friction washer 164 and the second friction surface 121b of the flywheel 121 having the friction surface. The second high-friction-coefficient friction washer 165 is formed of a core plate 173 and a friction facing 174 affixed thereto. The core plate 173 is an annular member. The friction facing 174 is formed of a plurality of arc-shaped members affixed to the surface on the engine side of the core plate 173 and is in contact with the second friction surface 121b of the flywheel 121 having the friction surface. The inner diameter of the core plate 173 is substantially equal to the inner diameter of the friction facing 174, and the inner diameter of the core plate 173 is slightly larger than the inner diameter of the friction facing 174. The core plate 173 is provided with a plurality of apertures 173a at its body. The core plate 173 is provided with a plurality of projections 173c at the inner periphery of the body extending radially inward. The friction facing 174 is provided with apertures 174a corresponding to the respective apertures 173a. The projected portions 164a of the second low-friction-coefficient friction washer 164 are inserted into and engaged with these apertures 171b and 172a. Owing to this engagement, the second high-friction-coefficient friction washer 165 and second low-friction-coefficient friction washer 164 rotate together.

Figure 41:
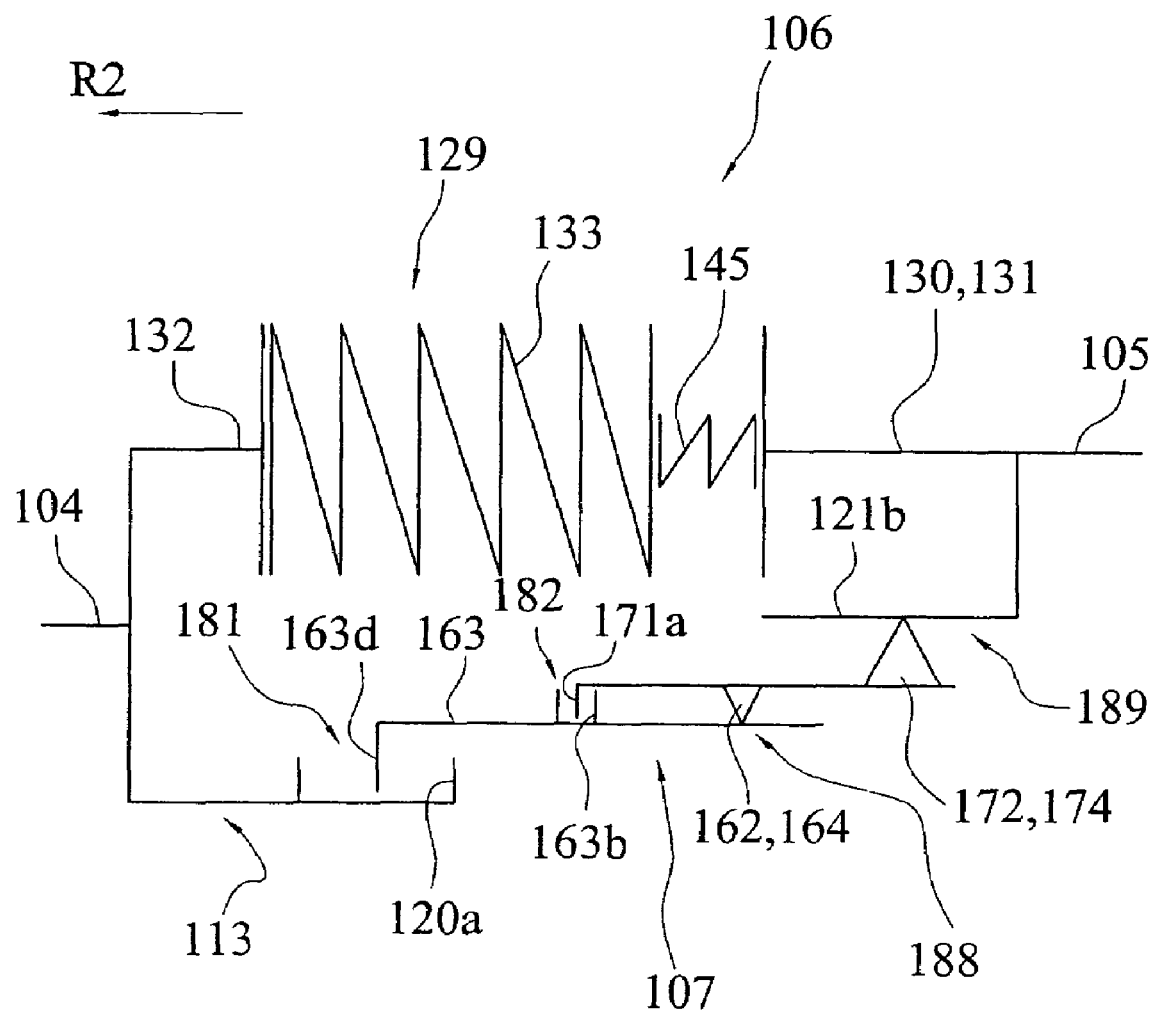
FIG. 41 is a view of a mechanical circuit diagram of a damper mechanism of a clutch device in accordance with the second embodiment.

The core plate 173 is provided with a plurality of circumferentially spaced recesses 173b at its outer periphery. The axially projected portions 171a already described are inserted into and engaged with the recesses 173b, respectively, so that the first high-friction-coefficient friction washer 161 and the second high-friction-coefficient friction washer 165 rotate together. The axially projected portions 171a are inserted into the recesses 163e formed at the outer periphery of the disk-shaped portion 163a of the input friction plate 163, respectively. As described above, the axially projected portions 171a and the recesses 163e form a second rotating-direction engagement portion 182 between the input friction plate 163 and the friction washers 161, 162, 164 and 165, as shown in FIG. 41.

In the second rotating-direction engagement portion 182, the width in the rotational direction of the axially projected portion 171a is shorter than that of the recess 163e so that the axially projected portion 171a can move a predetermined angle within the recess 163e. This means that the input friction plate 163 is movable through a predetermined angle range with respect to the friction washers 161, 162, 164, and 165. More specifically, as shown in FIG. 40, a rotating-direction space 185 of a torsion angle of θ3 is ensured on the forward side, in the rotational direction R1, of the axially projected portion 171a, and a rotating-direction space 186 of a torsion angle of θ4 is formed on the forward side, in the rotational direction R2, of the projected portion 171a. Consequently, the total torsion angle, i.e., the sum of the torsion angles of θ3 and θ4 provides the predetermined angle, by which the input friction plate 163 can rotate relatively to the friction washers 161, 162, 164, and 165. In this embodiment, the total torsion angle is equal to 2° (see FIG. 42).

Figure 38:
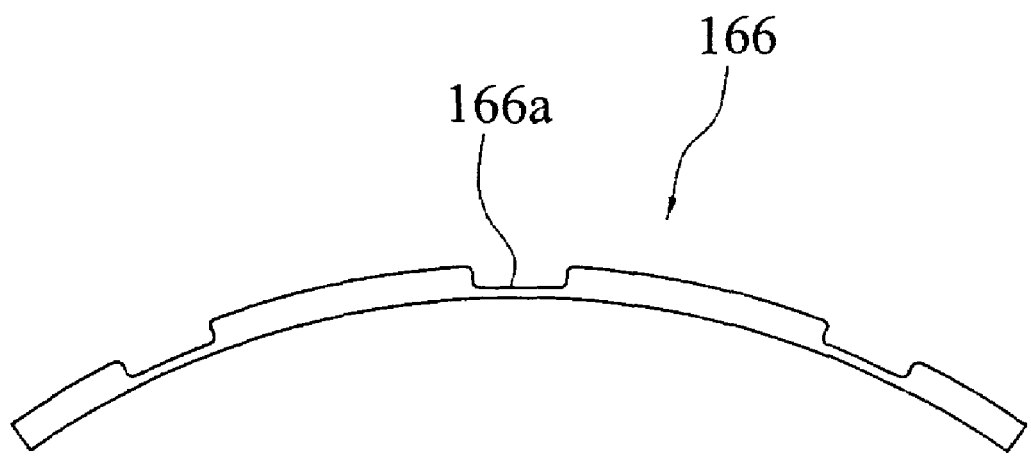
FIG. 38 is an elevational view of a first low-friction-coefficient friction washer of the frictional resistance generating mechanism of the second embodiment.
Figure 38:

Referring again to FIG. 31, the frictional resistance generating mechanism 107 further includes a bushing 166. The bushing 166 is formed of a plurality of members for radially supporting the respective washers with respect to the inner cylindrical portion 128 and is disposed radially between the inner peripheries of the washers and the inner cylindrical portion 128. As seen in FIG. 38, the bushing 166 has a predetermined axial length, and each portion thereof has an arc-shaped form when viewed in the axial direction. The bushing 166 has a smooth inner peripheral surface, which is rotatably supported by an outer peripheral surface 128b of the free end portion of the inner cylindrical portion 128. The inner cylindrical portion 128 is provided with a plurality of concavities 166a at its outer peripheral surface. Each concavity 166a is concaved radially inward, and extends throughout the axial length of the portion 128. Into the concavities 166a, projections of various members are fitted, and specifically, the projections 171c of the first high-friction-coefficient friction washer 161, the projections 162b of the first low-friction-coefficient friction washer 162, projections 164b of the second low-friction-coefficient friction washer 164, the projections 173c of the second high-friction-coefficient friction washer 165, and others are fitted and engaged. A relatively large space in the rotational direction is ensured in the engagement portion, where each washer is engaged with the bushing 166 so that the foregoing function of the second rotating-direction engagement portion 182 may not be impeded.

As seen in FIG. 31, in the frictional resistance generating mechanism 107 described above, the engagement of the disk-shaped portion 163a of the input friction plate 163 with the first and second low-friction-coefficient friction washers 162 and 164 provides a first frictional resistance generating portion 188. Further, a second frictional resistance generating portion 189 is provided by the engagement between the first high-friction-coefficient friction washer 161 and the output friction plate 144 as well as the engagement between the second high-friction-coefficient friction washer 165 and the flywheel 121 having the friction surface.

In the above structure, since the second friction surface 121b of the flywheel 121 with the friction surface forms the friction surface of the frictional resistance generating mechanism 107, this reduces the number of parts and simplifies the structure.

(2) Operation

When the clutch device receives the combustion variations from the engine, the damper mechanism operates to rotate the input disk-shaped plate 132 relatively to the output disk-shaped plates 130 and 131 in the damper mechanism so that the plurality of coil springs 133 and others are compressed between them. Further, the frictional resistance generating mechanism 107 generates a predetermined hysteresis torque. Through the foregoing operations, the torsional vibrations are absorbed and damped. More specifically, the coil springs 133 are compressed between the circumferential ends of the window apertures in the input disk-shaped plate 132 and the circumferential ends of the windows in the output disk-shaped plates 130 and 131.

As seen in FIGS. 30 and 31, in the frictional resistance generating mechanism 107, the first and second high-friction-coefficient friction washers 161 and 165 rotate together with the disk-shaped member 113 via the input friction plate 163 therebetween, and rotates relatively to the output friction plate 144 and the flywheel 121 having the friction surface. Consequently, sliding occurs between the output friction plate 144 and the first high-friction-coefficient friction washer 161, and also occurs between the second high-friction-coefficient friction washer 165 and the flywheel 121 having the friction surface. Thus, the second frictional resistance generating mechanism 189 operates to generate a relatively large frictional resistance.

Figure 42:
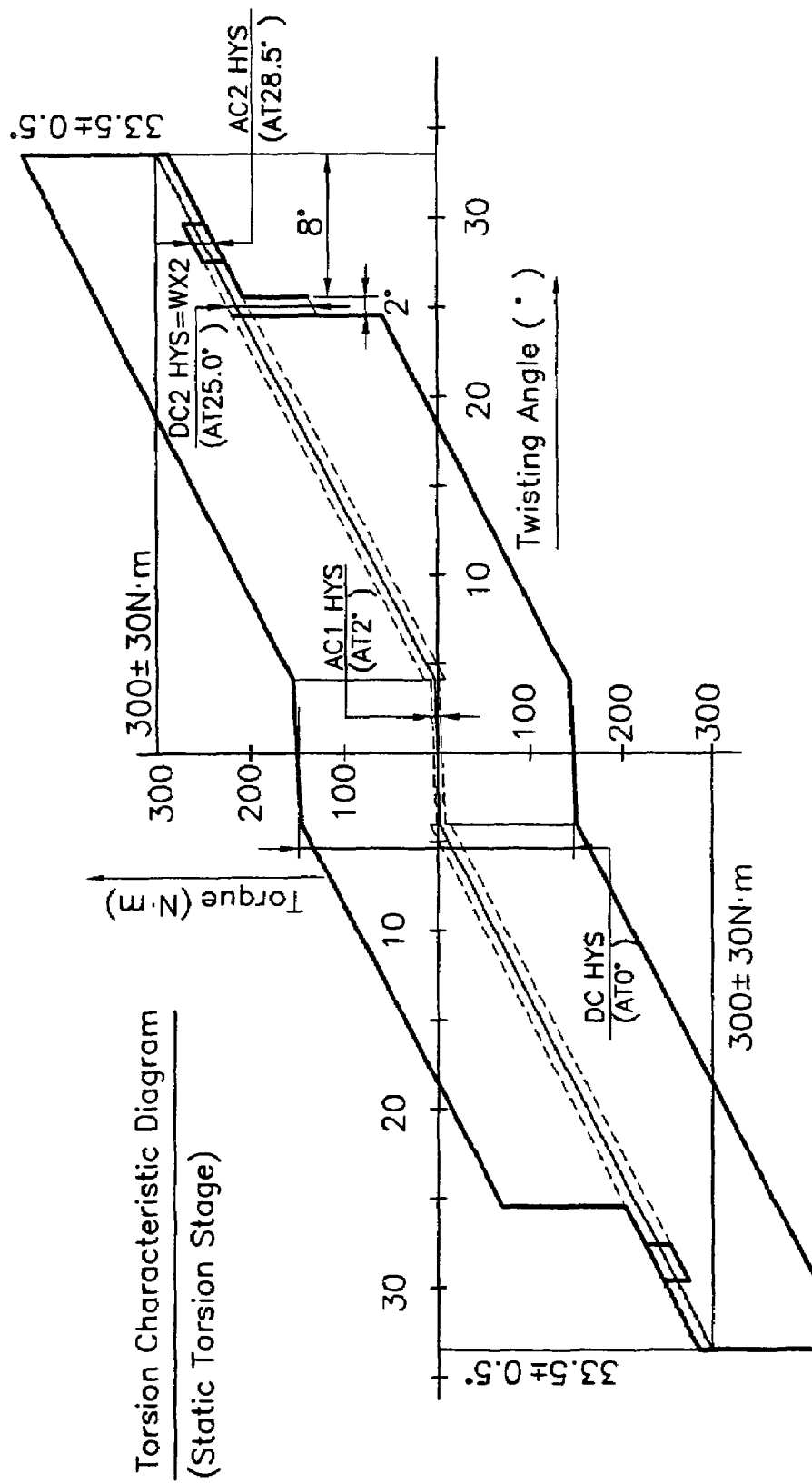
FIG. 42 is a view of a torsion characteristic diagram of the damper mechanism of the second embodiment.
Figure 43:
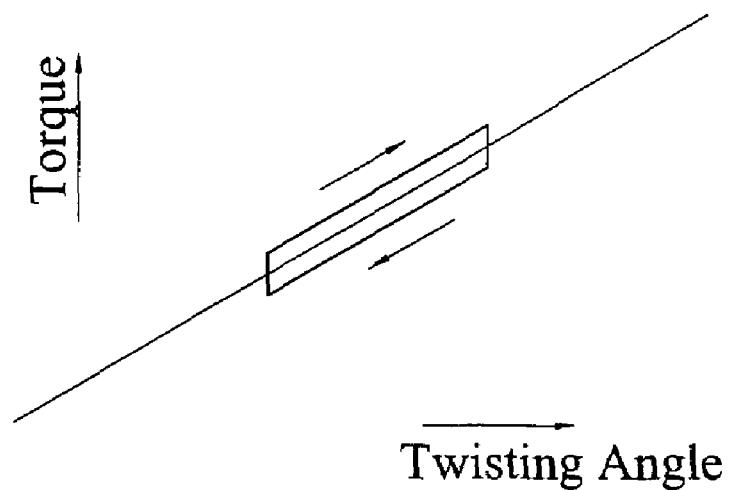
FIG. 43 is a view of a torsion characteristic diagram of the damper mechanism of the second embodiment.
Figure 44:
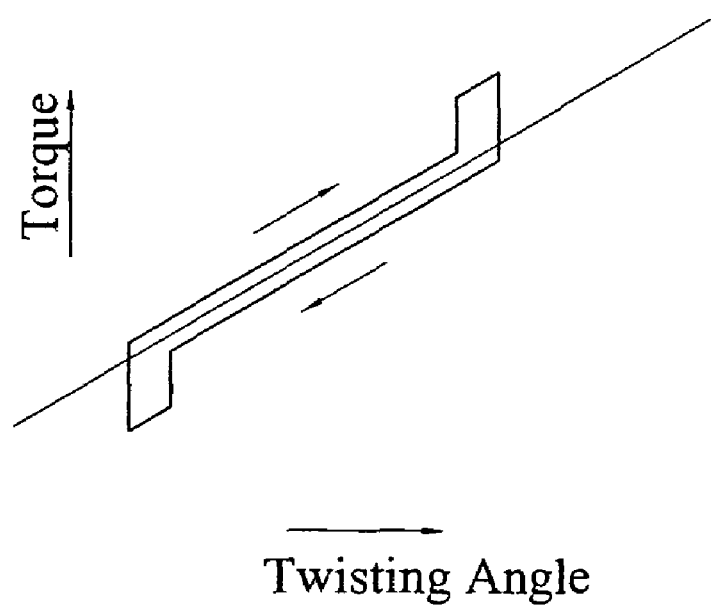
FIG. 44 is a view of a torsion characteristic diagram of the damper mechanism of the second embodiment.
Figure 45:
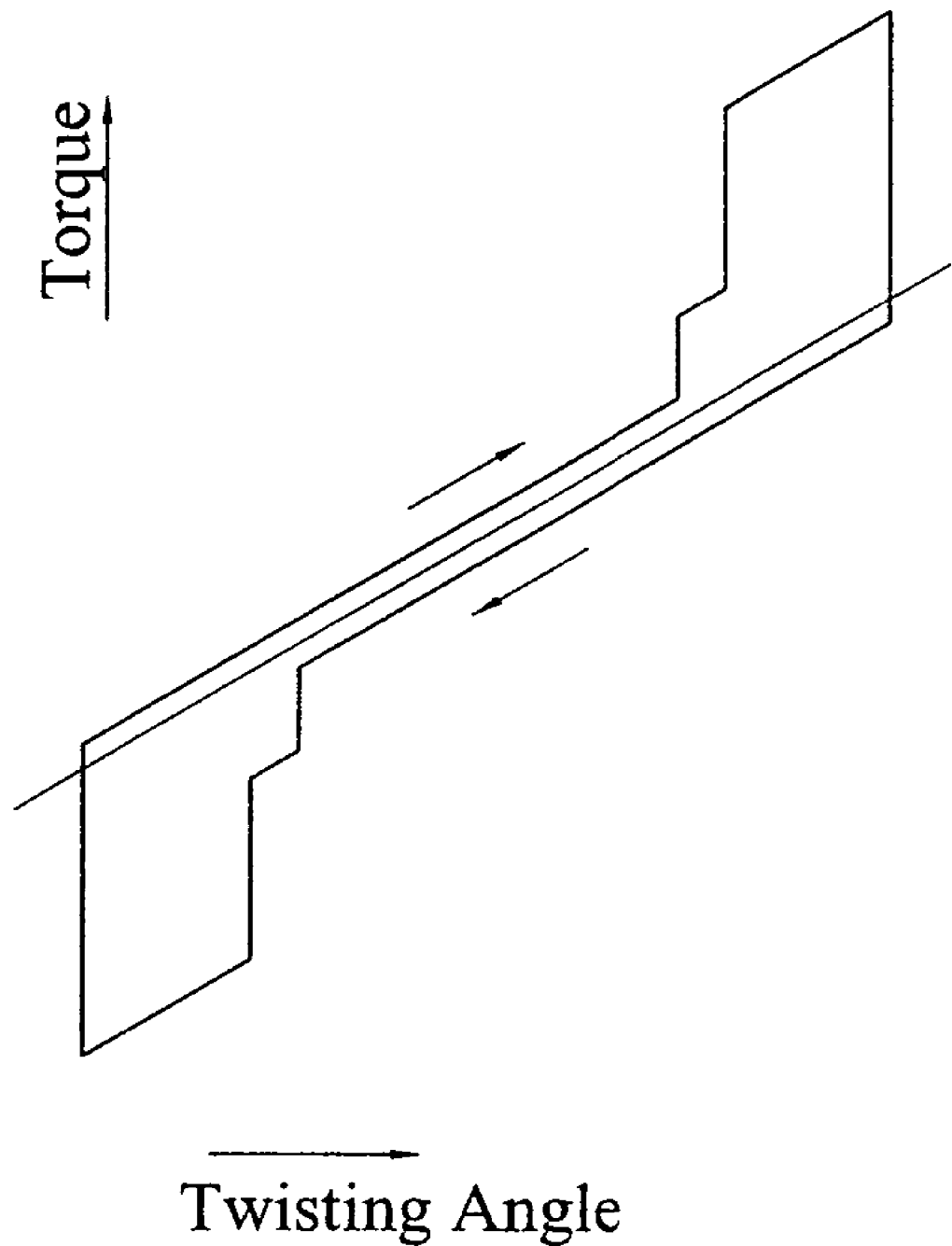
FIG. 45 is a view of a torsion characteristic diagram of the damper mechanism of the second embodiment.

Description will now be given on the operation of the damper mechanism, which is performed when minute torsional vibrations due to the combustion variations of the engine are applied to the clutch device, with reference to a mechanical circuit diagram of FIG. 41 and a torsion characteristic diagram of FIG. 42. When minute torsional vibrations are applied to the damper mechanism, in which the coil springs 133 are in the compressed state, the input friction plate 163 of the frictional resistance generating mechanism 107 rotates in the minute rotating-direction space (146 and 147), which is defined in the recess 120a of the cylindrical portion 120 of the disk-shaped member 113 by the claw 163d, and therefore, relatively rotates the disk-shaped member 113. Thus, the disk-shaped member 113 does not drive the input friction plate 163 and the friction washers 161, 162, 164, and 165. Therefore, neither of the first or second frictional resistance generating portions 188 and 189 generates a frictional resistance (see FIG. 43). Consequently, a high hysteresis torque does not occur in response to the minute torsional vibrations. For example, in "AC2 HYS" illustrated in the torsion characteristic diagram of FIG. 42, the coil springs 133 operate, but no sliding occurs in the frictional resistance generating mechanism 107. In the predetermined torsion angle range, only a hysteresis torque, which is much smaller than an ordinary hysteresis torque, can be obtained. As described above, the structure employs the minute rotating-direction space (146 and 147), which does not operate the frictional resistance generating mechanism 107 within a predetermined angle range in the torsion characteristics. Therefore, the levels of the vibrations and noises can be significantly reduced.

When the torsion angle of the minute torsional vibrations exceeds the angle of the first rotating-direction engagement portion 181, the rotating-direction space (146 and 147) disappears in the first rotating-direction engagement portion 181, and then the disk-shaped member 113 drives the input friction plate 163 in the rotational direction. Consequently, the input friction plate 163 rotates relatively to the first and second low-friction-coefficient friction washers 162 and 164. Thus, the first frictional resistance generating portion 188 operates to generate a relatively small frictional resistance (see FIG. 44).

When the torsion angle of the torsional vibrations further increases, the circumferential space (185 and 186) in the second rotating direction engagement portion 182 disappears and the input friction plate 163 drives the friction washers 161, 162, 164, and 165 in the rotational direction. Thereby, the friction washers 161, 162, 164 and 165 rotate relatively to the output friction plate 144 and the flywheel 121 having the friction surface. Thus, the second frictional resistance generating portion 189 operates to generate a relatively large frictional resistance (see FIG. 45).

(2-2-2) Large-Angle Torsional Vibrations

As already described, when the torsion angle of the torsional vibrations is large sliding occurs between the output friction plate 144 and the first high-friction-coefficient friction washer 161 and sliding also occurs between the second high-friction-coefficient friction washer 165 and the flywheel 121 having the friction surface.

At an end of the torsion angle range (i.e., the position where the direction of the vibration changes), operations are performed as follows. On the right end in the torsion characteristic diagram of FIG. 42, the input friction plate 163 is in the position shifted in the rotational direction R2 to the maximum extent with respect to the disk-shaped member 113 and the friction washers 161, 162, 164, and 165 are in the positions shifted to the maximum extent in the rotational direction R2 with respect to the input friction plate 163. When the disk-shaped member 113 rotates relatively to the flywheel 121 having the friction surface in the rotational direction R2, the disk-shaped member 113 angularly moves throughout the rotating-direction space (146 and 147) of the first rotating-direction engagement portion 181 and rotates relatively to the input friction plate 163. During this operation, neither of the first and second frictional resistance generating portions 188 and 189 generate the frictional resistance. When the rotating-direction space (146 and 147) in the first rotating-direction engagement portion 181 disappears, the disk-shaped member 113 drives the input friction plate 163. Thereby, the input friction plate 163 angularly moves throughout the rotating-direction space (185 and 186) in the second rotating-direction engagement portion 182, and rotates relatively to the first and second low-friction-coefficient friction washers 162 and 164. During this operation, the first frictional resistance generating portion 188 operates to generate a relatively small frictional resistance.

As the rotating-direction space (185 and 186) in the second rotating-direction engagement portion 182 disappears, the input friction plate 163 drives the friction washers 161, 162, 164, and 165. Thereby, the friction washers 161, 162, 164, and 165 rotate relatively to the output friction plate 144 and the flywheel 121 having the friction surface. Thereby, the second frictional resistance generating portion 189 operates to generate a large frictional resistance.

As described above, the first frictional resistance generating portion 188 generates a frictional resistance of an intermediate magnitude within the torsion angle range of the rotating-direction space (185 and 186) in the second rotating-direction engagement portion 182 before the second frictional resistance generating portion 189 operates to generate a large frictional resistance. As described above, the large frictional resistance rises in a multi-step or stepwise fashion so that a wall of a high hysteresis torque does not exist when generating the large frictional resistance. Thereby, hitting or tapping noises of claws, which may occur when a high hysteresis torque occurs, can be reduced in the frictional resistance generating mechanism which is provided with the minute space in the rotational direction for absorbing the minute torsional vibrations.

In the prior art, because the frictional resistance generating mechanism 107 does not have the second rotating-direction engagement portion 182 and the first frictional resistance generating portion 188, the second frictional resistance generating portion 189 starts the operation when the claw 163d in the first rotating-direction engagement portion 181 comes into contact with the recess 120a in the disk-shaped member 113. Thereby, a high hysteresis torque rapidly occurs so that the claws hit the wall to generate the hitting noises.

Third Embodiment (3-1) Structure of Frictional Resistance Generating Mechanism

Figure 46:
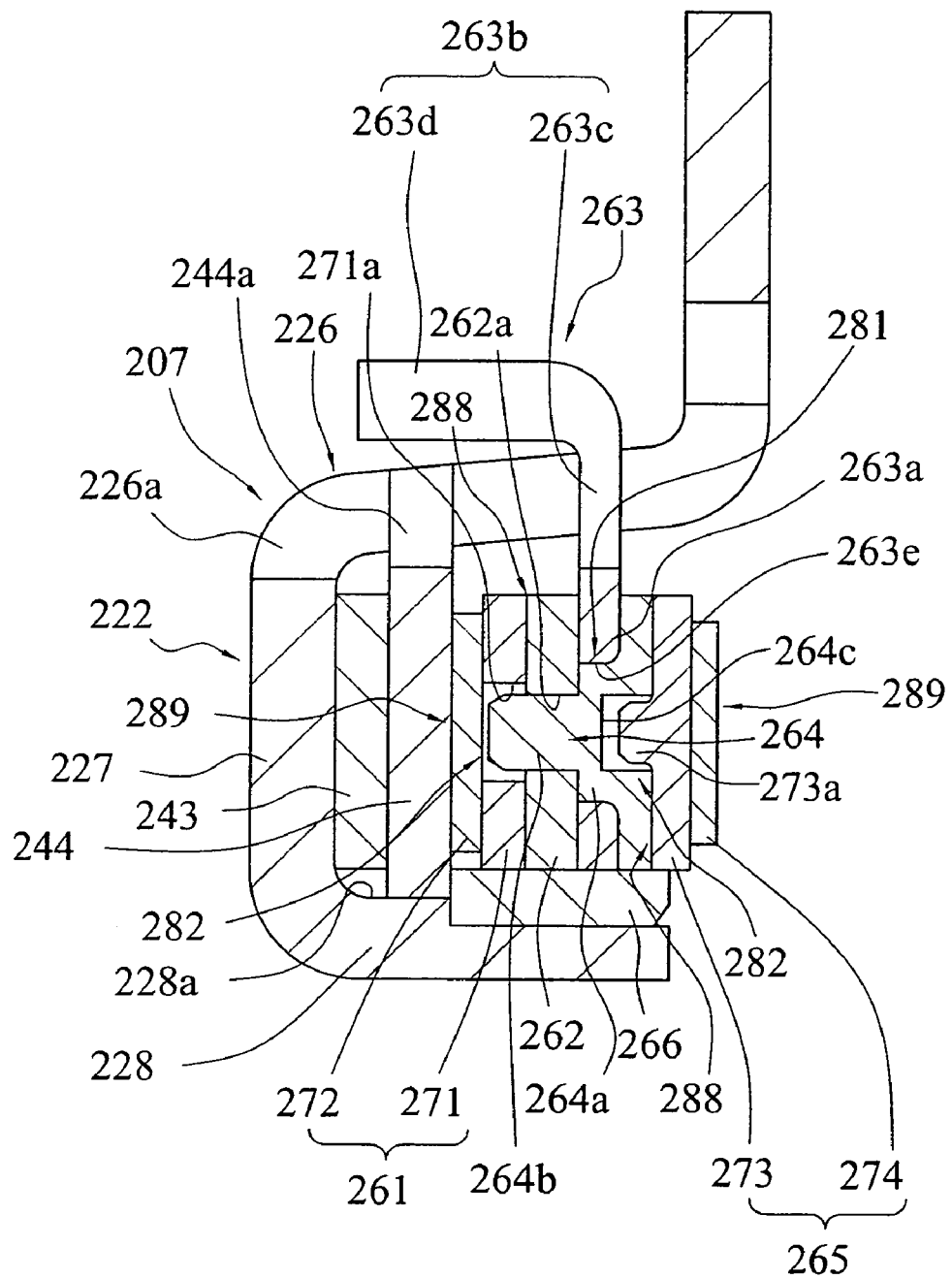
FIG. 46 is a schematic cross-sectional view of a frictional resistance generating mechanism in accordance with a third preferred embodiment of the present invention.

Referring initially to FIG. 46, description will now be given on a frictional resistance generating mechanism 207 according to a third embodiment of the invention. This frictional resistance generating mechanism 207 differs from the frictional resistance generating mechanism 107 of the second embodiment in that the first rotating-direction engagement portion in the second embodiment is arranged outside the washers and others which are axially stacked together, but the first rotating-direction engagement portion in this embodiment is arranged within axially stacked washers and others.

The following description will be primarily given on the frictional resistance generating mechanism 207, and other portions of the clutch device will be omitted. Parts and portions corresponding to those in the preceding embodiments are indicated by reference numbers bearing "2" at the hundred's place.

Figure 47:
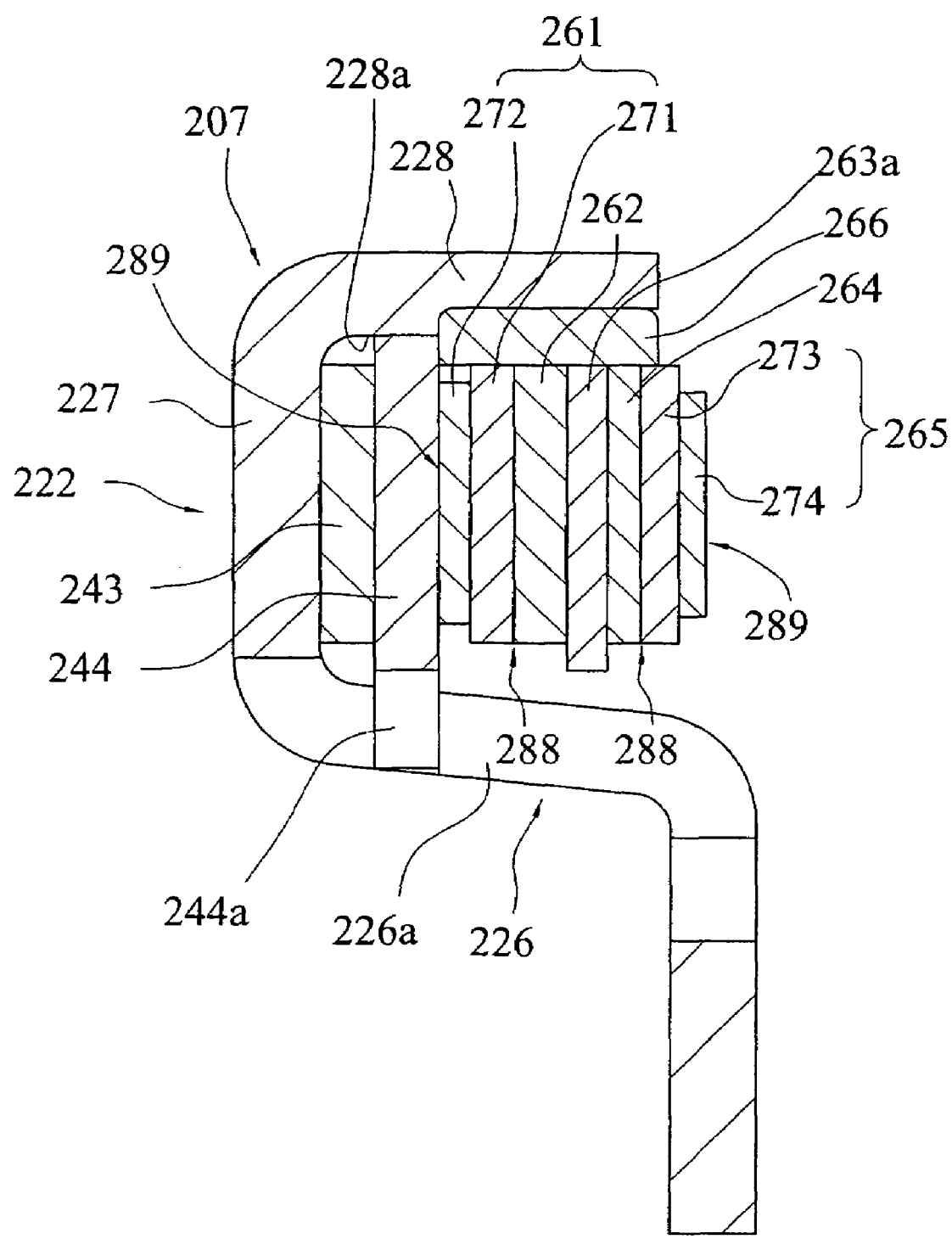
FIG. 47 is an alternate schematic cross-sectional view of the frictional resistance generating mechanism of the third embodiment.

The frictional resistance generating mechanism 207 is configured to operate in the rotational direction between a crankshaft and a flywheel 221 having a friction surface, and in parallel with coil springs 233 and to generate a predetermined frictional resistance (hysteresis torque) when relative rotation occurs between the crankshaft and the flywheel 221 having a friction surface. The frictional resistance generating mechanism 207 is formed of a plurality of washers, which are in contact with each other and are disposed between a second friction surface 221b of the flywheel 221 having the friction surface and a contact portion 227 of the disk-shaped plate 222. As shown in FIGS. 46 and 47, the frictional resistance generating mechanism 207 has a cone spring 243 located near the contact portion 227, an output friction plate 244, a first friction washer 261 having a high friction coefficient, a first friction washer 262 having a low friction coefficient, an input friction plate 263, a second friction washer 264 having a low friction coefficient, and a second friction washer 265 having a high friction coefficient. In this order, these members are located at positions successively shifted toward the flywheel 221 respectively.

The cone spring 243 is provided to apply an axial load to each friction surface and is compressed between the contact portion 227 and the output friction plate 244 so that it applies an axial biasing force to these members. The output friction plate 244 is provided with claws 244a at its outer periphery, which are engaged with the recesses 226a in the disk-shaped plate 222, so that the output friction plate 244 is unrotatable but is axially movable with respect to the disk-shaped plate 222 and the flywheel 221 having the friction surface. The output friction plate 244 has an outer peripheral surface, which is in contact with an inner peripheral surface 228a of the base portion of a cylindrical portion 228 formed at the outer periphery of the disk-shaped plate 222, and thereby is radially positioned.

The first friction washer 261 having a high friction coefficient is an annular member, and is located between the output friction plate 244 and the first friction washer 262 having a low friction coefficient. The first high-friction-coefficient friction washer 261 is formed of a core plate 271 and a friction facing 272 affixed thereto. The core plate 271 is an annular member. The friction facing 272 is formed of a plurality of arc-shaped members affixed to the radial surface on the engine side of the core plate 271, and is in contact with the output friction plate 244. The core plate 271 is provided with a plurality of apertures 271a extending in the rotational direction.

The first low-friction-coefficient friction washer 262 is formed of a plurality of arc-shaped members, and is located between the first high-friction-coefficient friction washer 261 and the input friction plate 263. The first low-friction-coefficient friction washer 262 is preferably made of plastics. The first low-friction-coefficient friction washer 262 has apertures 262a corresponding to the apertures 271a. Each aperture 271a is longer in the rotational direction than the aperture 262a, and has the opposite ends located circumferentially (i.e., in the rotational direction) outside the aperture 262a.

The input friction plate 263 has a disk-shaped portion 263a located axially between the first low-friction-coefficient friction washer 262 and the second low-friction-coefficient friction washer 264. The input friction plate 263 is provided with a plurality of projections 263b at its outer periphery as shown in the figure. The projections 263b are formed corresponding to the recesses 226a respectively and each are formed of a projected portion 263c projected radially outward and a claw 263d extending axially toward the engine from the end of the projected portion 263c. The projected portion 263c extends radially through the recess 226a. The claw 263d is located radially outside the cylindrical portion 226 and extends axially through a recess 220a in the cylindrical portion 220 of the disk-shaped member 213 toward the engine. In contrast to the foregoing embodiment, the claw 263d is in contact with the edge of the recess 220a without a space in the rotational direction.

The input friction plate 263 is provided with apertures 263e at the disk-shaped portion 263a corresponding to the apertures 262a respectively.

The second low-friction-coefficient friction washer 264 is formed of a plurality of arc-shaped members similar to the first low-friction-coefficient friction washer 262, and is located between the input friction plate 263 and the second high-friction-coefficient friction washer 265. The second low-friction-coefficient friction washer 264 is preferably made of plastics. The second low-friction-coefficient friction washer 264 is provided with a plurality of first projected portions 264a at its surface on the transmission side. Each first projected portion 264a is circumferentially long, and has rounded opposite ends. The first projected portion 264a is inserted into the aperture 263e in the disk-shaped portion 263a, and the end thereof is in contact with the first low-friction-coefficient friction washer 262. The second low-friction-coefficient friction washer 264 has second projected portions 264b, which extend axially toward the transmission from the first projected portions 264a, respectively. Each second projected portion 264b is circumferentially long and has rounded opposite ends. The second projected portion 264b is smaller in the radial and circumferential directions than the first projected portion 264a. The second projected portions 264b are inserted into the apertures 262a in the first low-friction-coefficient friction washer 262 respectively and are engaged therewith in the rotational direction. Owing to this engagement, the first low-friction coefficient friction washer 262 rotates together with the second low-friction-coefficient friction washer 264. Further, the second projected portions 264b are inserted into the apertures 271a in the first high-friction-coefficient friction washer 261, respectively.

The second high-friction-coefficient friction washer 265 is an annular member, and is located between the second low-friction-coefficient friction washer 264 and the second friction surface 221b of the flywheel 221 having the friction surface. The second high-friction-coefficient friction washer 265 is formed of a core plate 273 and a friction facing 274 affixed thereto. The core plate 273 is an annular member. The friction facing 274 is formed of a plurality of arc-shaped members affixed to the surface on the engine side of the core plate 273, and is in contact with the second friction surface 221b of the flywheel 221 having the friction surface. The core plate 273 is provided with projected portions 273a at its body extending axially toward the transmission. The projected portions 273a are inserted into concavities 264c in the second low-friction-coefficient friction washer 264.

Figure 48:
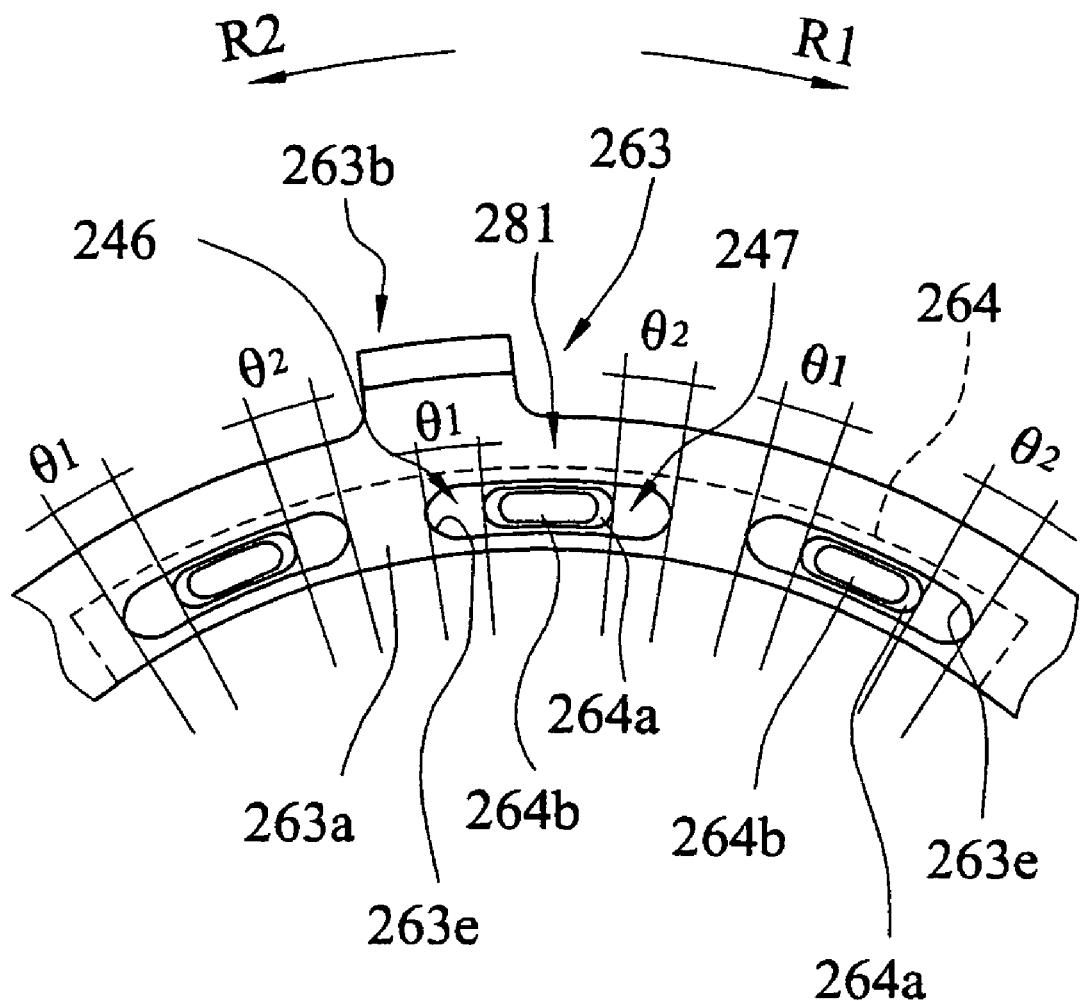
FIG. 48 is a fragmentary elevational view illustrating a first rotating-direction engagement portion of the frictional resistance generating mechanism of the third embodiment.
Figure 48:

As shown in FIG. 48, the first projected portions 264a of the second low-friction-coefficient friction washer 264 and the apertures 263e in the input friction plate 263 form a first rotating-direction engagement portion 281. In the first rotating-direction engagement portion 281, the circumferential width of the first projected portion 264a is shorter than that of the aperture 263e. Therefore, the first projected portion 264a can move through a predetermined angle range within the aperture 263e. This means that the input friction plate 263 is movable through a predetermined angle range with respect to the first and second low-friction-coefficient friction washers 262 and 264. More specifically, a rotating-direction space 246 of a torsion angle of θ1 is ensured on the forward side, in the rotational direction R2, of the first projected portion 264a, and a rotating-direction space 247 of a torsion angle of θ2 is formed on the forward side, in the rotational direction R1, of the first projected portion 264a. Consequently, the total torsion angle, i.e., the sum of the torsion angles of θ1 and θ2 provides the predetermined angle, by which the first and second low-friction-coefficient friction washers 262 and 264 can rotate relatively to the input friction plate 263. In this embodiment, the total torsion angle is equal to 8° (see FIG. 42). This total torsion angle is preferably in a range slightly exceeding a damper operation angle, which is caused by minute torsional vibrations due to combustion variations of the engine.

Figure 49:
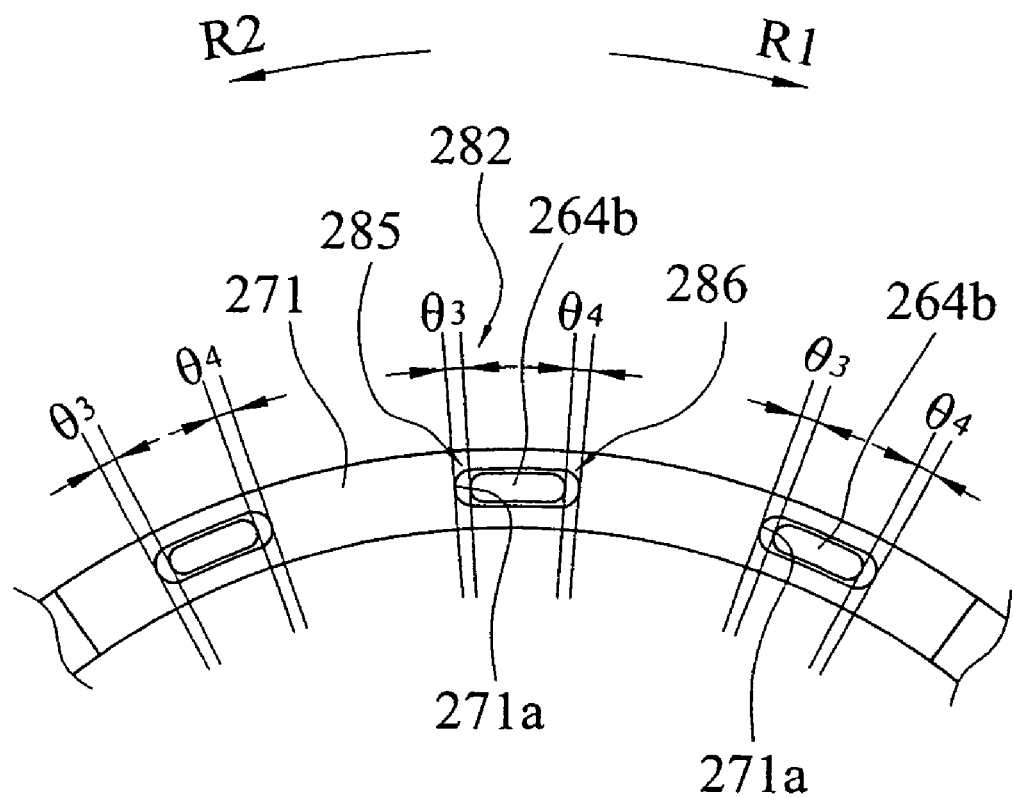
FIG. 49 is a fragmentary elevational view illustrating a second rotating-direction engagement portion of the frictional resistance generating mechanism of the third embodiment.
Figure 49:
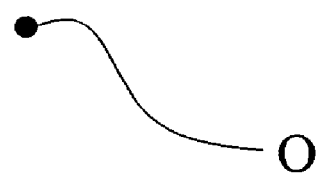
Figure 50:
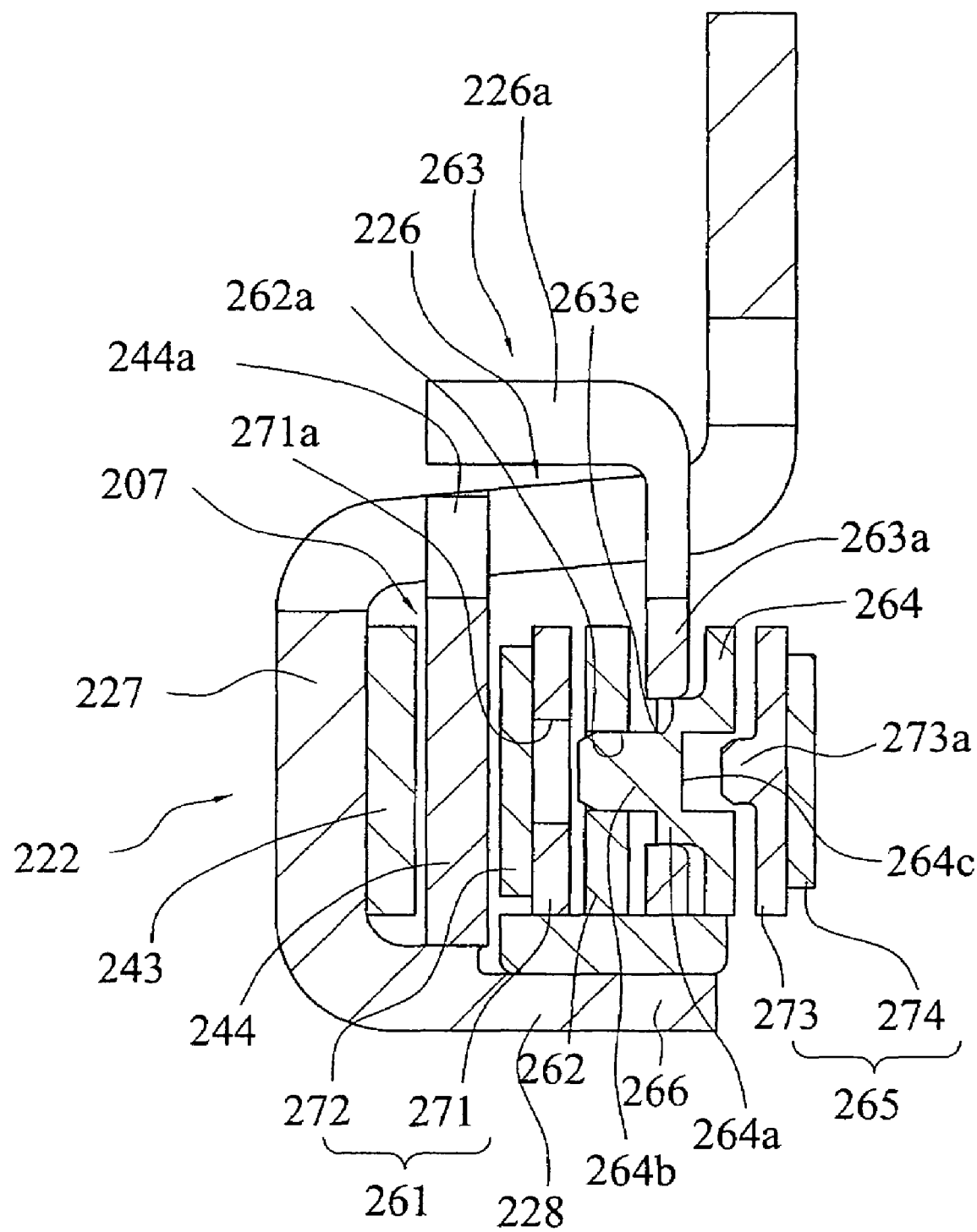
FIG. 50 is a schematic cross-sectional view illustrating assembly of the frictional resistance generating mechanism of the third embodiment.

As seen in FIG. 49, the engagement between the second projected portions 264b of the second low-friction-coefficient friction washer 264 and the apertures 271a in the first high-friction-coefficient friction washer 261 as well as the engagement between the projected portions 273a of the second high-friction-coefficient friction washer 265 and the concavities 264c in the second low-friction-coefficient friction washer 264 form a second rotating-direction engagement portion 282. The relationship between the projected portions and the concavities forming the former engagement is the same or substantially the same as that in the latter engagement, therefore, the following description will be given on only the engagement between the second projected portions 264b of the second low-friction-coefficient friction washer 264 and the apertures 271a in the first high-friction-coefficient friction washer 261 for the sake of simplifying.

In the second rotating-direction engagement portion 282, the circumferential width of the second projected portion 264b is shorter than that of the aperture 271a, therefore, the second projected portion 264b can move through a predetermined angle range within the aperture 271a. This means that the first and second low-friction-coefficient friction washers 262 and 264 are movable through a predetermined angle range with respect to the first and second high-friction-coefficient friction washers 261 and 265. More specifically, a rotating-direction space 285 of a torsion angle of θ3 is ensured on the forward side, in the rotational direction R2, of the second projected portion 264b, and a rotating-direction space 286 of a torsion angle of θ4 is formed on the forward side, in the rotational direction R1, of the second projected portion 264b. Consequently, the total torsion angle, i.e., the sum of the torsion angles of θ3 and θ4 provides the predetermined angle, by which the first and second low-friction-coefficient friction washers 262 and 264 can rotate relatively to the first and second high-friction-coefficient friction washers 261 and 265. In this embodiment, the total torsion angle is equal to 2° (see FIG. 42).

As seen in FIGS. 46 and 47, the frictional resistance generating mechanism 207 further includes a bushing 266. The bushing 266 is formed of a plurality of members to support radially the respective washers with respect to the inner cylindrical portion 228, and is disposed radially between the inner peripheries of the washers and the inner cylindrical portion 228. The bushing 266 has a predetermined axial length, and each portion thereof has an arc-shaped form when viewed in the axial direction. The bushing 266 has a smooth peripheral surface, which is rotatably supported by an outer peripheral surface 228b of the free end portion of the inner cylindrical portion 228.

In the frictional resistance generating mechanism 207 described above, the engagement between the first low-friction-coefficient friction washer 262 and the core plate 271 of the first high-friction-coefficient friction washer 261 as well as the engagement between the second low-friction-coefficient friction washer 264 and the core plate 273 of the second high-friction-coefficient friction washer 265 provides a first frictional resistance generating portion 288. Further, a second frictional resistance generating portion 289 is provided by the engagement between the first high-friction-coefficient friction washer 261 and the output friction plate 244 as well as the engagement between the second high-friction-coefficient friction washer 265 and the flywheel 221 having the friction surface.

(3-2) Operation of Frictional Resistance Generating Mechanism

Figure 51:
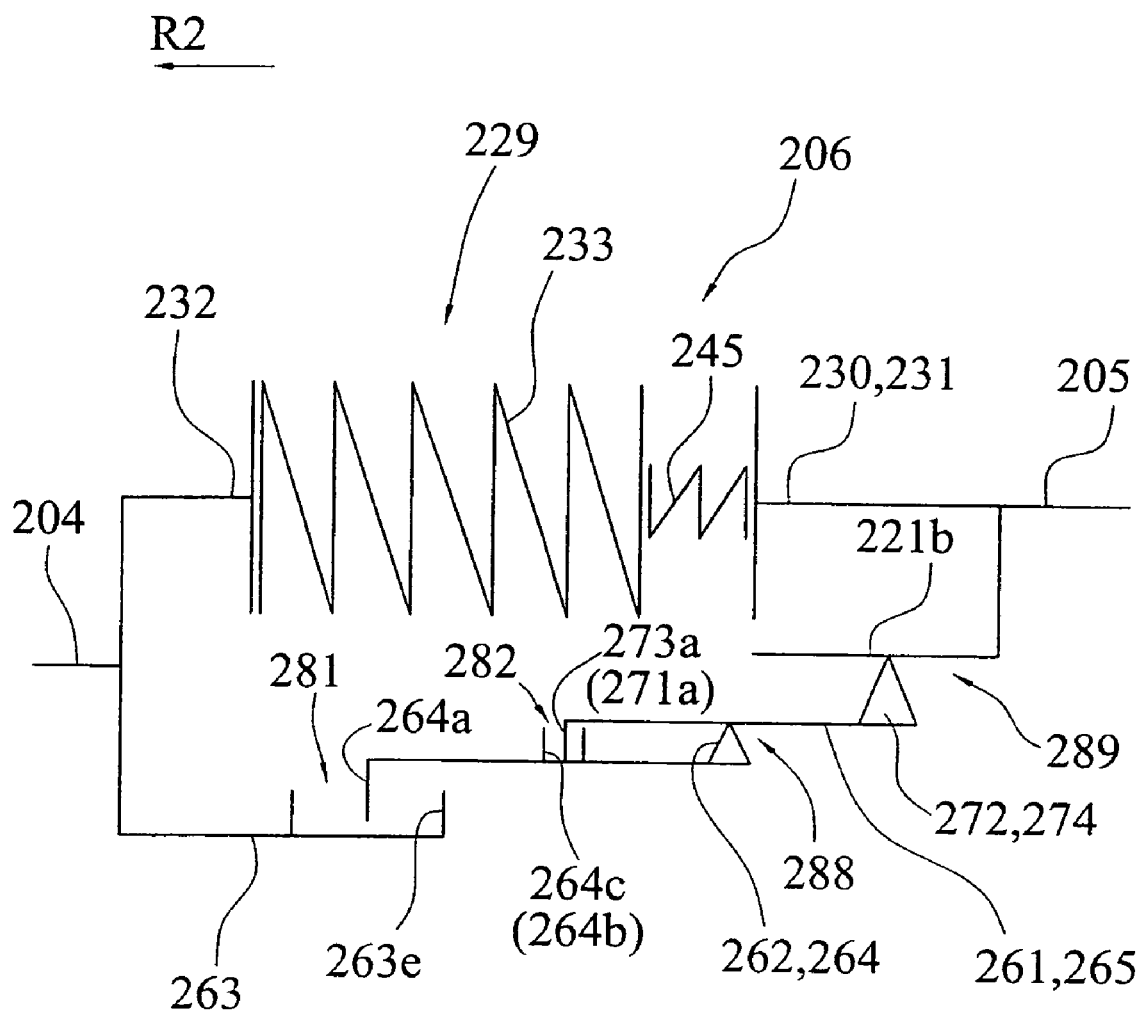
FIG. 51 is a view of a mechanical circuit diagram of a damper mechanism of a clutch device in accordance with the third embodiment.

As seen in FIG. 51, when the clutch device 1 receives the combustion variations from the engine, the damper mechanism 206 operates to rotate the input disk-shaped plate 232 relatively to the output disk-shaped plates 230 and 231 so that the plurality of coil springs 233 and others are compressed are compressed between them. Further, the frictional resistance generating mechanism 207 generates a predetermined hysteresis torque. Through the foregoing operations, the torsional vibrations are absorbed and damped. More specifically, the coil springs 233 are compressed between the circumferential ends of the window apertures in the input disk-shaped plate 232 and the circumferential ends of the windows in the output disk-shaped plates 230 and 231.

In the frictional resistance generating mechanism 207, the first and second high-friction-coefficient friction washers 261 and 265 rotate together with input friction plate 263 with the first and second low-friction-coefficient friction washers 262 and 264 therebetween, and rotate relatively to the output friction plate 244 and the flywheel 221 having the friction surface. Consequently, sliding occurs between the output friction plate 244 and the first high-friction-coefficient friction washer 261, and also occurs between the second high-friction-coefficient friction washer 265 and the flywheel 221 having the friction surface. Thus, the second frictional resistance generating mechanism 289 operates to generate a relatively large frictional resistance.

(3-2-1) Minute Torsional Vibrations

Description will now be given on the operation of the damper mechanism 206, which is performed when minute torsional vibrations due to the combustion variations of the engine are applied to the clutch device 1, with reference to a mechanical circuit diagram of FIG. 51 and a torsion characteristic diagram of FIG. 42. When minute torsional vibrations are applied to the damper mechanism 206, in which the coil springs 233 are in the compressed state, the first and second low-friction-coefficient friction washers 262 and 264 of the frictional resistance generating mechanism 207 rotate in the minute rotating-direction space (246 and 247), which is defined in the aperture 263*e* of the input friction plate 263 by the first projected portion 264*a* of the second low-friction-coefficient friction washer 264, and thus rotates relatively the input friction plate 263. Thus, input friction plate 263 does not drive the first and second low-friction-coefficient friction washers 262 and 264, therefore, neither of the first and second frictional resistance generating portions 288 and 289 generate a frictional resistance (see FIG. 43). Consequently, a high hysteresis torque does not occur in response to the minute torsional vibrations. For example, in "AC2 HYS" illustrated in the torsion characteristic diagram of FIG. 42, the coil springs 233 operate, but no sliding occurs in the frictional resistance generating mechanism 207. In the predetermined torsion angle range, only a hysteresis torque, which is much smaller than an ordinary hysteresis torque, can be obtained. As described above, the structure employs the minute rotating-direction space (246 and 247), which does not operate the frictional resistance generating mechanism 207 within a predetermined angle range in the torsion characteristics. Therefore, the levels of the vibrations and noises can be significantly reduced.

When the torsion angle of the minute torsional vibrations exceeds the angle of the first rotating-direction engagement portion 281, the rotating-direction space (246 and 247) disappears in the first rotating-direction engagement portion 281 and the input friction plate 263 drives the first and second low-friction-coefficient friction washers 262 and 264 in the rotational direction. Consequently, the first and second low-friction-coefficient friction washers 262 and 264 rotate relatively to the first and second high-friction-coefficient friction washers 261 and 265. Thus, the first frictional resistance generating portion 288 operates to generate a relatively small frictional resistance (see FIG. 44).

When the torsion angle of the torsional vibrations further increases, the circumferential space (285 and 286) in the second rotating-direction engagement portion 282 disappears, and then the first and second low-friction-coefficient friction washers 262 and 264 drive the first and second high-friction-coefficient friction washers 261 and 265 in the rotational direction. Thereby, the first and second high-friction-coefficient friction washers 261 and 265 rotate relatively to the output friction plate 244 and the flywheel 221 having the friction surface. Thus, the second frictional resistance generating portion 289 operates to generate a relatively large frictional resistance (see FIG. 45).

(3-2-2) Large-Angle Torsional Vibrations

As already described, when the torsion angle of the torsional vibrations is large, sliding occurs between the output friction plate 244 and the first high-friction-coefficient friction washer 261 and sliding also occurs between the second high-friction-coefficient friction washer 265 and the flywheel 221 having the friction surface.

At an end of the torsion angle range (i.e., the position where the direction of the vibration changes), operations are performed as follows. On the right end in the torsion characteristic diagram of FIG. 42, the first and second low-friction-coefficient friction washers 262 and 264 are in the positions shifted in the rotational direction R2 to the maximum extent with respect to the input friction plate 263, and the first and second high-friction-coefficient friction washers 261 and 265 are in the positions shifted in the rotational direction R2 to the maximum extent with respect to the first and second low-friction-coefficient friction washers 262 and 264. When the input friction plate 263 rotates relatively to the flywheel 221 having the friction surface in the rotational direction R2, the input friction plate 263 angularly moves throughout the rotating-direction space (246 and 247) of the first rotating-direction engagement portion 281 and rotates relatively to the first and second low-friction-coefficient friction washers 262 and 264. During this operation, neither of the first and second frictional resistance generating portions 288 and 289 generates the frictional resistance. When the rotating-direction space (246 and 247) in the first rotating-direction engagement portion 281 disappears, the first and second low-friction-coefficient friction washers 262 and 264 drive the first and second high-friction-coefficient friction washers 261 and 265. Thereby, the first and second low-friction-coefficient friction washers 262 and 264 angularly move throughout the rotating-direction space (285 and 286) in the second rotating-direction engagement portion 282, and rotate relatively to the first and second high-friction-coefficient friction washers 261 and 265. During this operation, the first frictional resistance generating portion 288 operates to generate a relatively small frictional resistance.

When the rotating-direction space (285 and 286) in the second rotating-direction engagement portion 282 disappears, the first and second low-friction-coefficient friction washers 262 and 264 drive the first and second high-friction-coefficient friction washers 261 and 265. Thereby, the first and second high-friction-coefficient friction washers 261 and 265 rotate relatively to the output friction plate 244 and the flywheel 221 having the friction surface. Thereby, the second frictional resistance generating portion 289 operates to generate a large frictional resistance.

As described above, the first frictional resistance generating portion 288 generates a frictional resistance of an intermediate magnitude within the torsion angle range of the rotating-direction space (285 and 286) in the second rotating-direction engagement portion 282 before the second frictional resistance generating portion 289 operates to generate a large frictional resistance. As described above, the large frictional resistance rises in a multi-step or stepwise fashion so that a wall of a high hysteresis torque does not exist when generating the large frictional resistance. Thereby, hitting or tapping noises of claws, which may occur when a high hysteresis torque occurs, can be reduced in the frictional resistance generating mechanism, which is provided with the minute space in the rotational direction for absorbing the minute torsional vibrations.

In the frictional resistance generating mechanism 207, the rotating-direction space (246 and 247) in the first rotating-direction engagement portion 281 is not located radially outside an area, in which the first and second low-friction-coefficient friction washers 262 and 264 axially overlap with the first and second high-friction-coefficient friction washers 261 and 265. Therefore, the whole structure can be relatively compact.

In this frictional resistance generating mechanism 207, the rotating-direction space (246 and 247) in the first rotating-direction engagement portion 281 is formed between the second low-friction-coefficient friction washer 264 and the disk-shaped portion 263a of the input friction plate 263. Therefore, the structure providing the rotating-direction space (246 and 247) becomes simpler. This improves the accuracy of the rotating-direction space.

Fourth Embodiment

Figure 52:
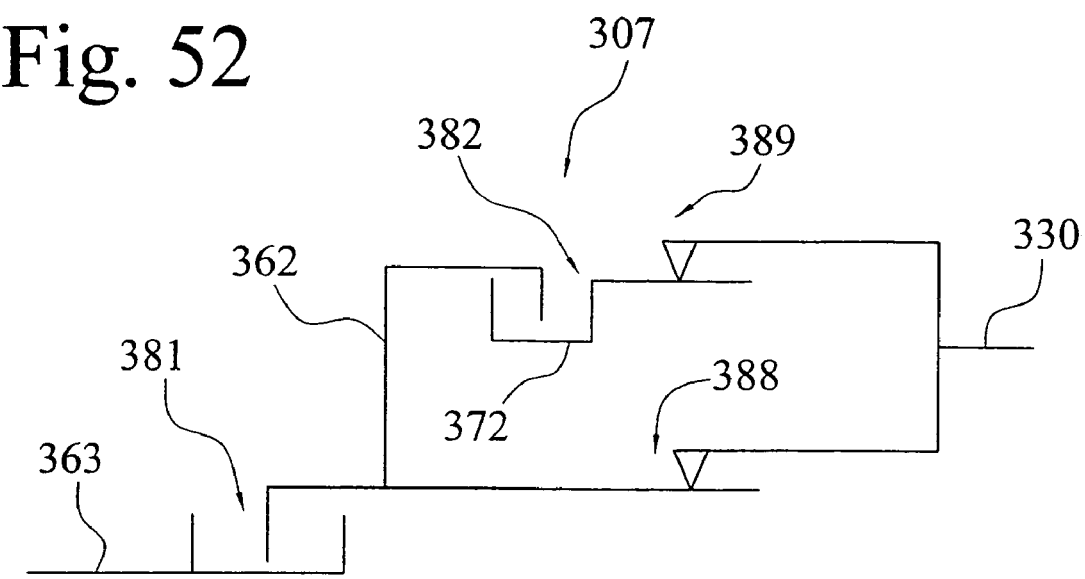
FIG. 52 is a view of a mechanical circuit diagram of a damper mechanism in accordance with a fourth preferred embodiment of the present invention.

Referring to a mechanical circuit diagram of FIG. 52, description will now be given on a frictional resistance generating mechanism 307 in the fourth embodiment.

The frictional resistance generating mechanism 307 includes a first rotary member 363, a second rotary member 330, a first intermediate member 362, and a second intermediate member 372. The first and second rotary members 363 and 330 are rotatable relatively to each other, and are coupled together in the rotational direction by elastic members (not shown). The first and second intermediate members 362 and 372 are disposed between the first and second rotary members 363 and 330 to operate in series in the rotational direction. The first intermediate member 362 is engaged with the first rotary member 363 via a first rotating-direction space forming portion 381 and is further engaged with the second intermediate member 372 via a second rotating-direction space forming portion 382. The first intermediate member 362 is frictionally engaged with the second rotary member 330 via a first friction generating portion 388. The second intermediate member 372 is frictionally engaged with the second rotary member 330 via a second friction generating portion 389. As described above, the first and second friction generating portions 388 and 389 are disposed circumferentially between the first and second rotary members 363 and 330 to operate in parallel with each other.

Figure 53:
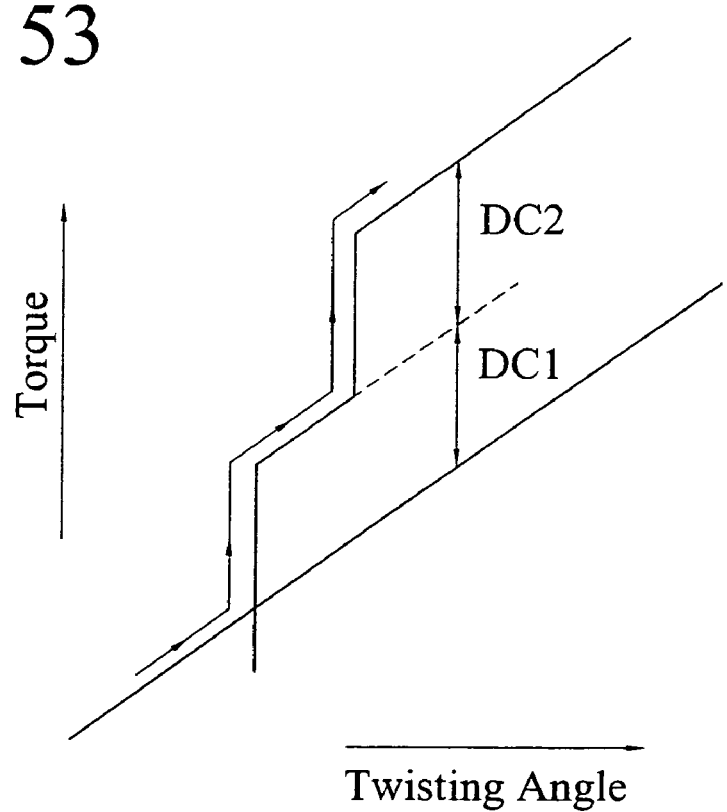
FIG. 53 is a view of a torsion characteristic diagram of a damper mechanism of the fourth embodiment.

Referring to the mechanical circuit diagram of FIG. 52 and a torsion characteristic diagram of FIG. 53, description will now be given on an operation of this frictional resistance generating mechanism 307, in which the first rotary member 363 rotates relatively to the second rotary member 330.

In an initial torsion stage, neither of the first and second friction generating portions 388 and 389 operates owing to the rotating-direction space in the first rotating-direction space forming portion 381. This provides a region, where a hysteresis torque hardly occurs.

When the rotating-direction space in the first rotating-direction space forming portion 381 disappears, the first rotary member 363 starts to drive the first intermediate member 362 in the rotational direction. In this operation, the first friction generating portion 388 operates to generate a predetermined frictional resistance (DC1 in FIG. 53). In this operation, the second friction generating portion 389 does not operate owing to the second rotating direction space forming portion 382.

When the rotating-direction space in the second rotating-direction space forming portion 382 disappears, the first intermediate member 362 drives the second intermediate member 372 in the rotational direction. In this operation, the second friction generating portion 389 operates to generate a predetermined frictional resistance (DC2 in FIG. 53). During this operation, the first friction generating portion 388 is also operating so that a frictional resistance produced in this state is larger than that produced when only the first friction generating portion 388 is operating.

As described above, the large frictional resistance rises in a multi-step or stepwise fashion so that a wall of a high hysteresis torque does not exist when generating the large frictional resistance. Thereby, hitting or tapping noises of claws, which may occur when a high hysteresis torque occurs, can be reduced in the frictional resistance generating mechanism.

Fifth Embodiment

Figure 54:
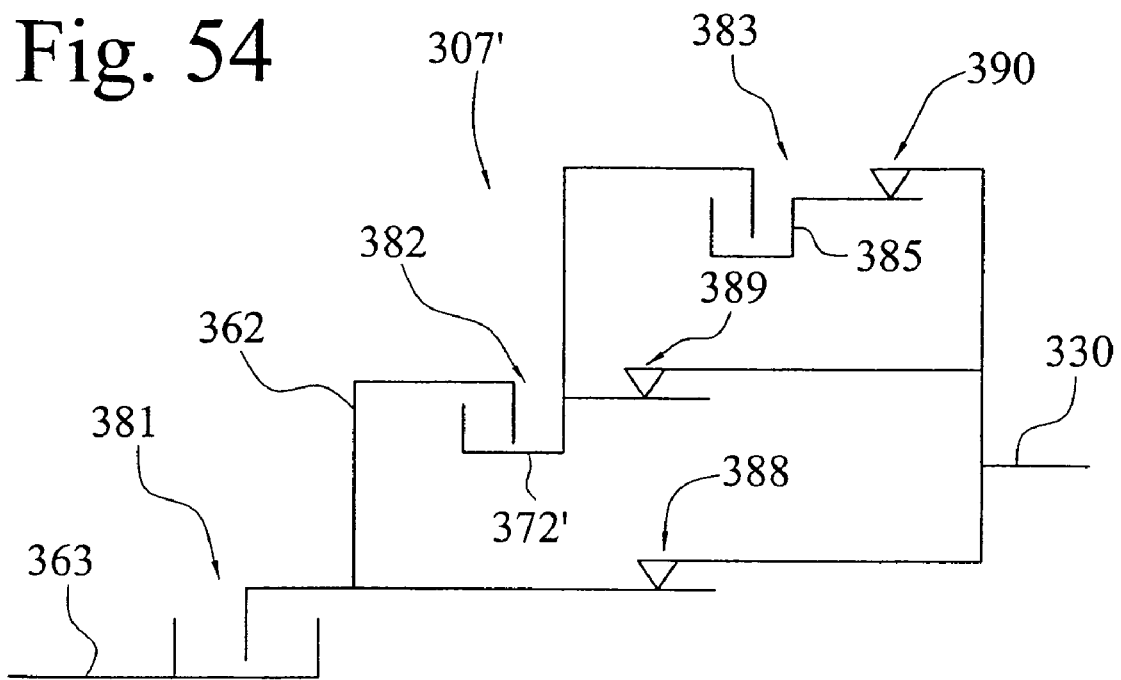
FIG. 54 is a view of a mechanical circuit diagram of a damper mechanism in accordance with a fifth preferred embodiment of the present invention.

Referring to a mechanical circuit diagram of FIG. 54, description will now be given on a frictional resistance generating mechanism 307' in a fifth embodiment.

The frictional resistance generating mechanism 307' includes the first rotary member 363, the second rotary member 330, the first intermediate member 362, a second intermediate member 372', and a third intermediate member 385. The first and second rotary members 363 and 330 are rotatable relatively to each other and are coupled together in the rotational direction by elastic members (not shown). The first, second and third intermediate members 362, 372', and 385 are disposed between the first and second rotary members 363 and 330 to operate in series in the rotational direction. The first intermediate member 362 is engaged with the first rotary member 363 via the first rotating-direction space forming portion 381, and is engaged with the second intermediate member 372' via the second rotating-direction space forming portion 382. The second intermediate member 372' is engaged with the third intermediate member 385 via a third rotating-direction space forming portion 383. The first intermediate member 362 is frictionally engaged with the second rotary member 330 via the first friction generating portion 388. The second intermediate member 372' is frictionally engaged with the second rotary member 330 via the second friction generating portion 389. The third intermediate member 385 is frictionally engaged with the second rotary member 330 via a third friction generating portion 390. As described above, the first, second and third friction generating portions 388, 389, and 390 are disposed circumferentially between the first and second rotary members 363 and 330 to operate in parallel with each other.

Figure 55:
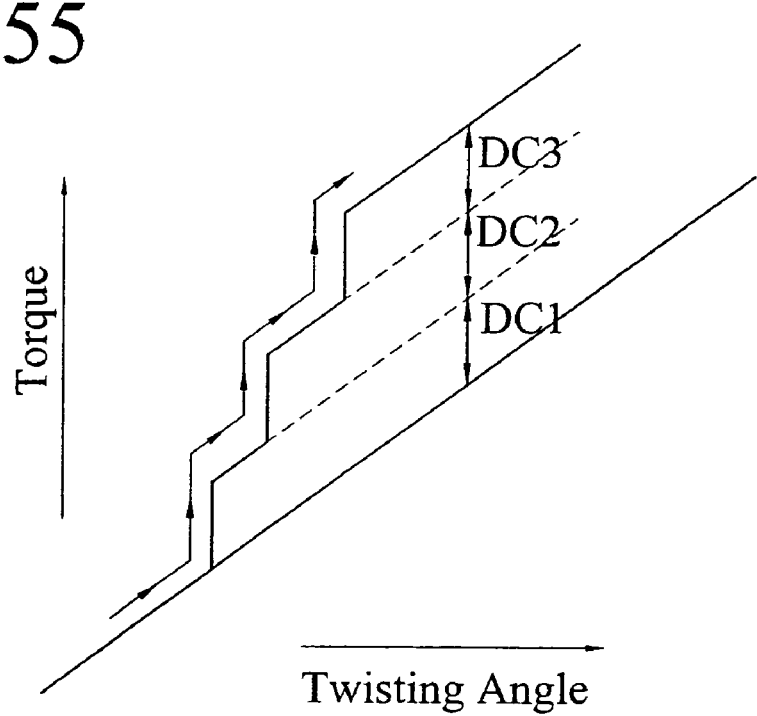
FIG. 55 is a view of a torsion characteristic diagram of the damper mechanism of the fifth embodiment.

Referring to the mechanical circuit diagram of FIG. 54 and a torsion characteristic diagram of FIG. 55, description will now be given on an operation of this frictional resistance generating mechanism 307', in which the first rotary member 363 rotates relatively to the second rotary member 330.

In an initial torsion stage, any one of the first, second and third friction generating portions 388, 389, and 390 does not operate owing to the rotating-direction space in the first rotating-direction space forming portion 381. This provides a region, where a hysteresis torque hardly occurs.

When the rotating-direction space in the first rotating-direction space forming portion 381 disappears, the first rotary member 363 starts to drive the first intermediate member 362 in the rotational direction. In this operation, the first friction generating portion 388 operates to generate a predetermined frictional resistance (DC1 in FIG. 55). In this operation, the second friction generating portion 389 does not operate owing to the second rotating-direction space forming portion 382, and the third friction generating portion 390 does not operate owing to the third rotating-direction space forming portion 383.

When the rotating-direction space in the second rotating-direction space forming portion 382 disappears, the first intermediate member 362 drives the second intermediate member 372' in the rotational direction. In this operation, the second friction generating portion 389 operates to generate a predetermined frictional resistance (DC2 in FIG. 55). During this operation, the first friction generating portion 388 is also operating so that both the friction generating portions produce a frictional resistance larger than that, which is produced when only the first friction generating portion 388 is operating. In this operation, the third friction generating portion 390 does not operate owing to the third rotating-direction space forming portion 383.

When the rotating-direction space in the third rotating-direction space forming portion 383 disappears, the second intermediate member 372' drives the third intermediate member 385 in the rotational direction. In this operation, the third friction generating portion 390 operates to generate a predetermined frictional resistance (DC3 in FIG. 55). During this operation, the first and second friction generating portions 388 and 389 are also operating so that the friction generating portions produce a frictional resistance larger than that which is produced when only the first and second friction generating portions 388 and 389 are operating.

In this embodiment, since the large frictional resistance occurs through three stages, the wall of the large hysteresis torque, which may occur when generating the large frictional resistance, can be further small so that hitting or tapping noises of claws can be further reduced in the frictional resistance generating mechanism when generating the high hysteresis torque.

The large frictional resistance may be configured to rise through four or more stages.

Sixth Embodiment

Figure 56:
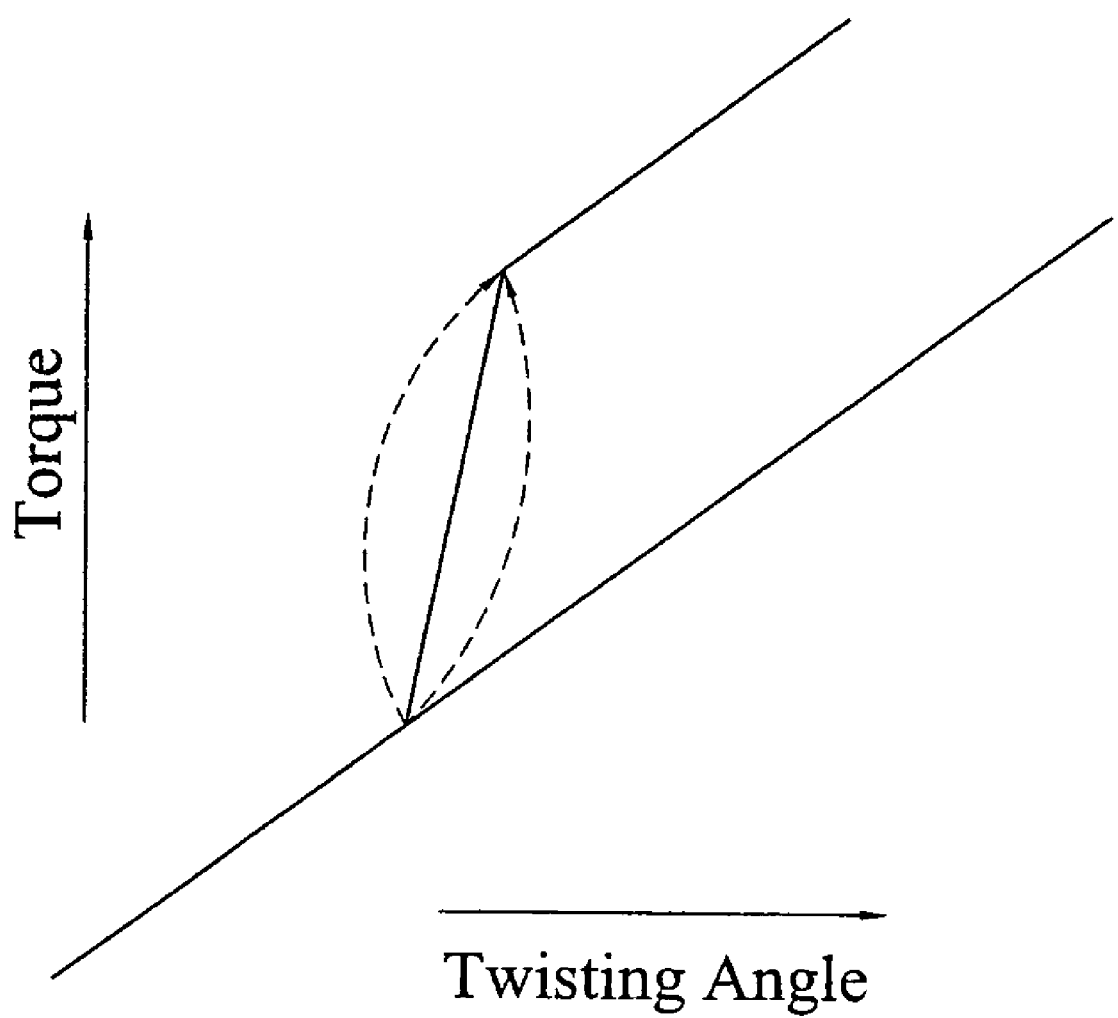
FIG. 56 is a view of a torsion characteristic diagram of the damper mechanism in accordance with a sixth preferred embodiment of the present invention.

As illustrated in FIG. 56, the large frictional resistance may be raised smoothly instead of a multi-step fashion. In other words, an intermediate frictional resistance may be raised gradually before generating a large frictional resistance. In FIG. 56, a solid line represents a linear change in intermediate frictional resistance. Further, broken lines in FIG. 56 represent a manner, in which an increasing rate of the torque with respect to the angle decreases with angle, and a manner, in which the above rate increases with angle.

Other Embodiments

Although the embodiments of the clutch devices according to the present invention have been described and illustrated in detail, the invention is not restricted to such embodiments and can be variously modified or changed without departing from the scope of the invention.

In the damper mechanism according to the invention, the rotating-direction space in the frictional resistance suppressing mechanism prevents the operation of the frictional resistance generating mechanism in both the ranges of small and large torsion angles of minute torsional vibrations. Thus, a large frictional resistance does not occur in response to minute torsional vibrations in the first stage of the torsion characteristics so that torsional vibration damping performances are improved.

EFFECT OF THE INVENTION

In the frictional resistance generating mechanism according to the present invention, when the torsion angle of the torsional vibrations is within the angle range of the first rotating-direction space in the first frictional resistance suppressing portion, the first rotating-direction space prevents the operations of the first and second frictional resistance generating portions so that a large frictional resistance does not occur. When the torsion angle of the torsional vibrations is within the angle range of the second rotating-direction space of the second frictional resistance suppressing portion, the second rotating-direction space operates only the first frictional resistance generating portion to generate a frictional resistance of an intermediate magnitude. When the torsion angle of the torsional vibrations exceeds the angle range of the second rotating-direction space, the second frictional resistance generating portion operates to generate the largest frictional resistance.

As described above, the first frictional resistance generating portion generates the frictional resistance of an intermediate magnitude in the torsion angle range of the second rotating-direction space before the second frictional resistance generating portion operates to generate the large frictional resistance. In this manner, the large frictional resistance rises in a multi-step or stepwise fashion so that a wall of a high hysteresis torque does not exist when the large frictional resistance is generated. Thereby, hitting or tapping noises of claws, which may occur when a high hysteresis torque occurs, can be reduced in the frictional resistance generating mechanism In the flywheel assembly according to the invention, the plate-like coupling portion is radially shorter than the conventional stop pin, and therefore can be arranged in the radially outermost position of the second disk-shaped plate. Accordingly, the plate-like coupling portion does not interfere with the elastic member so that the torsion angle of the damper mechanism can be sufficiently increased.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

Terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2002-307250, 2002-307251, 2002-351589, and 2003-162896. The entire disclosures of Japanese Patent Application Applications Nos. 2002-307250, 2002-307251, 2002-351589, and 2003-162896 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A flywheel assembly for transmitting a torque from a crankshaft of an engine, comprising:
   a flywheel having a friction surface;
   an elastic coupling mechanism being configured to couple elastically said flywheel and the crankshaft in a rotating direction, and having
      a pair of first disk-shaped members being axially spaced from each other and fixed together, said pair of first disk-shaped members being fixedly coupled to said flywheel,
      a second disk-shaped member being arranged between said pair of first disk-shaped members, and
      an elastic member being configured to couple elastically said first disk-shaped members to said second disk-shaped member in said rotating direction; and
   a plate coupling portion extending between outer peripheries of said paired first disk-shaped members, and fixing said pair of first disk-shaped members together.

2. The flywheel assembly according to claim 1, wherein said plate coupling portion is arranged at a plurality of circumferentially shifted positions.

3. The flywheel assembly according to claim 2, wherein said plate coupling portion has main surfaces directed radially inward and outward, respectively.

4. The flywheel assembly according to claim 3, wherein said plate coupling portion extends integrally from one of said pair of first disk-shaped members.

5. The flywheel assembly according to claim 4, wherein said second disk-shaped member is provided with a stop portion that is arranged to collide in the rotational direction with said plate coupling portion when a torsion angle between said pair of first disk-shaped members and said second disk-shaped member increases.

6. The flywheel assembly according to claim 1, wherein said plate coupling portion has main surfaces directed radially inward and outward, respectively.

7. The flywheel assembly according to claim 1, wherein said plate coupling portion extends integrally from one of said pair of first disk-shaped members.

8. The flywheel assembly according to claim 7, wherein said second disk-shaped member is provided with a stop portion that is arranged to collide in the rotational direction with said plate coupling portion when a torsion angle between said pair of first disk-shaped members and said second disk-shaped member increases.

9. The flywheel assembly according to claim 1, wherein said second disk-shaped member is provided with a stop portion that is arranged to collide in the rotational direction with said plate coupling portion when a torsion angle between said pair of first disk-shaped members and said second disk-shaped member increases.

10. The flywheel assembly according to claim 1, wherein said pair of first disk-shaped members is fixedly coupled to said flywheel by a nut and a bolt.

11. The flywheel assembly according to claim 1, wherein at least one of said pair of first disk-shaped members is fixed to said plate coupling portion by a rivet.

12. The flywheel assembly according to claim 11, wherein the other of said pair of first disk-shaped members has a rivet aperture, and said second disk-shaped member has a recess through which said rivet is configured to pass.

* * * * *